United States Patent [19]
Osawa

[11] Patent Number: 5,243,949
[45] Date of Patent: Sep. 14, 1993

[54] DIAGNOSTIC DEVICE FOR EXHAUST GAS RECIRCULATION DEVICE

[75] Inventor: Kouichi Osawa, Susono, Japan

[73] Assignee: Toyota Jidosha Kabushiki Kaisha, Aichi, Japan

[21] Appl. No.: 928,410

[22] Filed: Aug. 12, 1992

[30] Foreign Application Priority Data

| Aug. 22, 1991 | [JP] | Japan | 3-210740 |
| Oct. 18, 1991 | [JP] | Japan | 3-271093 |
| Oct. 18, 1991 | [JP] | Japan | 3-271119 |
| Oct. 19, 1991 | [JP] | Japan | 3-271554 |
| Oct. 22, 1991 | [JP] | Japan | 3-273978 |

[51] Int. Cl.$^5$ .............................................. F02B 47/08
[52] U.S. Cl. ..................................... 123/571; 123/676
[58] Field of Search ................ 123/571, 568, 569, 676

[56] References Cited

U.S. PATENT DOCUMENTS

| 4,834,054 | 5/1989 | Hashimoto et al. | 123/571 |
| 4,870,941 | 10/1989 | Hisatomi | 123/571 |
| 4,967,717 | 11/1990 | Miyazaki et al. | 123/571 |
| 4,974,572 | 12/1990 | Aramaki | 123/571 |
| 5,014,203 | 5/1991 | Miyazaki et al. | 123/571 |

FOREIGN PATENT DOCUMENTS

| 63-38677 | 2/1988 | Japan . |
| 63-105272 | 5/1988 | Japan . |
| 63-90056 | 6/1988 | Japan . |
| 63-263263 | 10/1988 | Japan . |
| 1-35067 | 2/1989 | Japan . |
| 1-125548 | 5/1989 | Japan . |
| 1-142557 | 9/1989 | Japan . |
| 3-138444 | 6/1991 | Japan . |

*Primary Examiner*—Tony M. Argenbright
*Assistant Examiner*—M. Macy
*Attorney, Agent, or Firm*—Oliff & Berridge

[57] ABSTRACT

A diagnostic device for an exhaust gas recirculation device comprising an exhaust gas recirculation control valve. When the temperature of the engine cooling water exceeds a predetermined temperature, vacuum acts on the vacuum chamber of the exhaust gas recirculation control valve and the supply of the exhaust gas recirculation gas is started. A temperature sensor is arranged in the exhaust gas recirculation passage. When the temperature of the engine cooling water is slightly lower than the predetermined temperature, if the temperature of the interior of the exhaust gas recirculation passage exceeds a predetermined temperature, it is determined that the exhaust gas recirculation control device has malfunctioned.

34 Claims, 47 Drawing Sheets

DIAGNOSTIC DEVICE FOR EXHAUST GAS RECIRCULATION DEVICE

BACKGROUND OF THE INVENTION

1. Field of the Invention

The present invention relates to an engine a diagnostic device for an exhaust gas recirculation (EGR) device.

2. Description of the Related Art

There is known an internal combustion engine which has the engine exhaust passage and engine intake passage connected by an exhaust gas recirculation passage and has an exhaust gas recirculation control valve disposed in the exhaust gas recirculation passage. In such an internal combustion engine, usually when the engine cooling water temperature rises above a certain temperature, the exhaust gas recirculation gas is started to be supplied into the intake passage and the amount of the exhaust gas recirculation gas supplied is controlled by the exhaust gas recirculation control valve. In this case, when the exhaust gas recirculation control valve malfunctions and exhaust gas recirculation gas is supplied when it should not be supplied, the combustion efficiency deteriorates. Therefore, it has become necessary to discover at an early period if exhaust gas recirculation gas is being supplied when it should not.

Usually, however, as mentioned above, when the engine cooling water temperature rises above a certain temperature, the exhaust gas recirculation gas starts to be supplied, but at this time the exhaust gas recirculation gas is not continuously supplied. The supply of the exhaust gas recirculation gas is stopped under certain operating conditions. At this time, if the supply of the exhaust gas recirculation gas is completely stopped, then temperature in the exhaust gas recirculation passage falls, but at this time so long as the exhaust gas recirculation gas continues to flow in the exhaust gas recirculation passage, the temperature in the exhaust gas recirculation passage rises. Further, the temperature in the exhaust gas recirculation passage when the supply of the exhaust gas recirculation gas is completely stopped and the temperature in the exhaust gas recirculation passage when exhaust gas recirculation gas flows despite the supply of the exhaust gas recirculation gas supposed to have been stopped change in accordance with the operating state of the engine at that time, for example, the engine load at that time, once the engine cooling water temperature etc. becomes constant such as after completion of engine warm-up.

There is known an internal combustion engine which judges if the exhaust gas recirculation control valve has malfunctioned by judging if exhaust gas recirculation gas continues to flow when the temperature inside the exhaust gas recirculation passage is higher than a set temperature determined by the operating state of the engine when under a specific operating state after completion of engine warm-up when the supply of the exhaust gas recirculation gas should be stopped (Japanese Unexamined Patent Publication No. 3-138444).

However, the temperature in the exhaust gas recirculation passage when the supply of the exhaust gas recirculation gas is stopped and the temperature in the exhaust gas recirculation passage when exhaust gas recirculation gas flows despite the supply of the exhaust gas recirculation gas supposed to have been stopped are more strongly influenced by the past engine operating state before the supply of the exhaust gas recirculation gas was to be stopped than the engine operating state when the supply of the exhaust gas recirculation gas is supposed to be stopped. That is, if a high load operation had continued before the supply of the exhaust gas recirculation gas was supposed to be stopped, the temperature inside the exhaust gas recirculation passage when the supply of the exhaust gas recirculation gas was stopped and the temperature inside the exhaust gas recirculation passage when exhaust gas recirculation gas flows despite that supply of the exhaust gas recirculation gas supposedly being stopped both become higher. If a low load operation continued before the supply of the exhaust gas recirculation gas was supposed to be stopped, then the temperature inside the exhaust gas recirculation passage when the supply of the exhaust gas recirculation gas was stopped and the temperature inside the exhaust gas recirculation passage when exhaust gas recirculation gas flows despite that supply of the exhaust gas recirculation gas supposedly being stopped both become lower.

Therefore, the temperature inside the exhaust gas recirculation passage sometimes becomes higher than the set temperature even when the supply of the exhaust gas recirculation gas has been stopped in cases of an operating state where the supply of the exhaust gas recirculation should be stopped following a continuous high load operation. This leads to the mistaken judgement of the exhaust gas recirculation control valve having malfunctioned at this time. On the other hand, the temperature inside the exhaust gas recirculation passage sometimes becomes lower than the set temperature even when exhaust gas recirculation gas flows in the case of an operating state where the supply of exhaust gas recirculation gas should be stopped following a continuous low load operation. This leads to the mistaken judgement of the exhaust gas recirculation control valve not malfunctioning at this time. That is, it is very difficult to judge if an exhaust gas recirculation control device malfunctions when the supply of the exhaust gas recirculation gas is controlled after the completion of engine warm-up.

SUMMARY OF THE INVENTION

An object of the present invention is to provide an exhaust gas recirculation device capable of correctly judging whether or not an exhaust gas recirculation control device has malfunctioned.

According to the present invention, there is provided an engine comprising an exhaust gas recirculation device arranged in an exhaust gas recirculation passage connecting an exhaust passage to an intake passage of the engine to permit the passage of an exhaust gas when an engine temperature exceeds a predetermined set temperature during a warm-up of the engine, a temperature in the exhaust gas recirculation passage changing during the warm-up of the engine in a normal pattern such that it abruptly changes at the set temperature when the operation of the exhaust gas recirculation device is normal, the temperature of the exhaust gas recirculation passage changing during the warm-up of the engine in an abnormal pattern such that it gradually increases when the operation of the exhaust gas recirculation device is abnormal; temperature detecting means arranged in the exhaust gas recirculation passage to detect the temperature in the exhaust gas recirculation passage; discriminating means for discriminating whether or not a pattern of change in the temperature in the exhaust gas recirculation passage is the normal pattern or the abnormal pattern during the warm-up of the engine on the basis of the temperature detected by the temperature detecting means; and abnormality judgement means for judging that the operation of the exhaust gas recirculation device is abnormal when the pattern of change in the temperature in the exhaust gas recirculation passage is the abnormal pattern during the warm-up of the engine.

BRIEF DESCRIPTION OF THE DRAWINGS

The present invention may be more fully understood from the description of the preferred embodiments of the invention set forth below, together with the accompanying drawings, in which.

DESCRIPTION OF PREFERRED EMBODIMENTS

Figure 1:
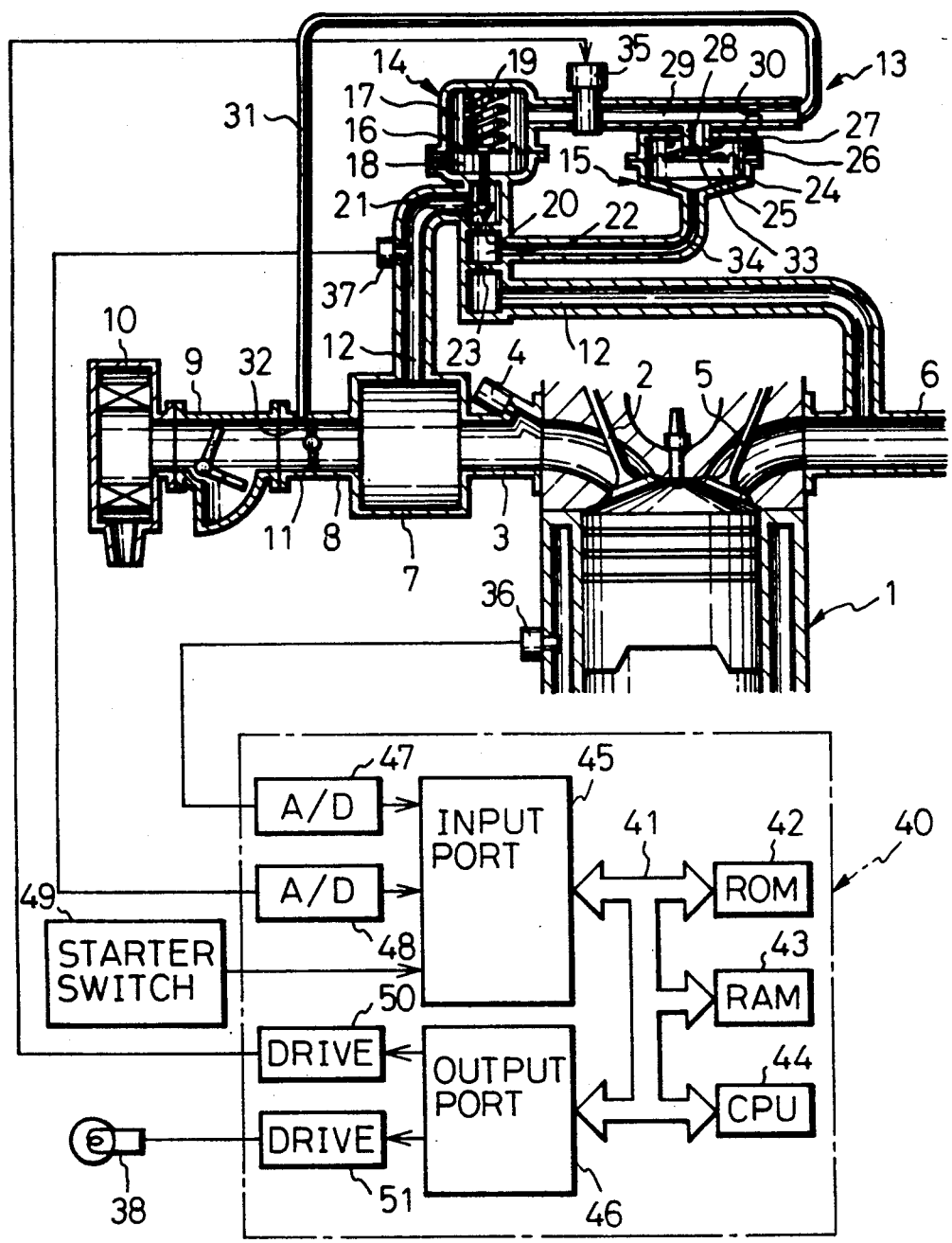
FIG. 1 is an overall view of an internal combustion engine.

Referring to FIG. 1, 1 is an internal combustion engine, 2 an intake valve, 3 intake branching pipes, 4 a fuel injector, 5 an exhaust valve, and 6 an exhaust manifold. The intake branching pipes 3 are connected to a common surge tank 7. The surge tank 7 is connected through an intake duct 8 and an air flow meter 9 to an air cleaner 10. In the intake duct 8 is disposed a throttle valve 11. The inside of the intake manifold 6 and the inside of the surge tank 7 are connected to each other through an exhaust gas recirculation passage 12. In the exhaust gas recirculation passage 12 is disposed an exhaust gas recirculation control device 13.

The exhaust gas recirculation control device 13 is equipped with an exhaust gas recirculation control valve 14 and a modulator 15. The exhaust gas recirculation control valve 14 has a vacuum chamber 17 and an atmospheric pressure chamber 18 separated by a diaphragm 16. In the vacuum chamber 17 is inserted a diaphragm pressing compression spring 19. The valve body 21 which controls the opening and closing of the valve port 20 is connected to the diaphragm 16. The exhaust gas recirculation control valve 14 has a constant pressure chamber 22, which constant pressure chamber 22 is connected on one hand to the inside of the exhaust manifold 6 through a throttle portion 23 and the exhaust gas recirculation passage 12 and is connected on the other hand to the inside of the surge tank 7 through the valve port 20, which is controlled in the amount of opening by the valve body 21, and the exhaust gas recirculation passage 12.

On the other hand, the modulator 15 has a pressure control chamber 25 and an atmospheric pressure chamber 26 separated by a diaphragm 24. Inside the atmospheric pressure chamber 26 is provided a diaphragm pressing compression spring 27 and an air bleed pipe 28. The top portion of the air bleed pipe is connected on the one hand to the vacuum chamber 17 of the exhaust gas recirculation control valve 14 through a vacuum conduit 29 and is connected on the other hand to a vacuum port 32 opening inside the intake duct 8 through a throttle portion 30 and a vacuum conduit 31. The vacuum port 32, as shown in FIG. 1, opens inside the intake duct 8 upstream of the throttle valve 11 when the throttle valve 11 is at an idling position, and opens inside the intake duct 8 downstream of the throttle valve 11 when the throttle valve 11 is opened. At the bottom of the air bleed pipe is formed an opening 3 when is disposed facing the diaphragm 24. The pressure control chamber 25 is connected to the constant pressure chamber 22 through the conduit 34. Further, inside the vacuum conduit 29 is disposed a shut-off valve 35 which can shut the vacuum conduit 29. The shut-off valve is controlled to open and close by an output signal of an electronic control unit 40.

When the shut-off valve opens and the throttle valve 11 is made to open, the exhaust gas in the exhaust manifold 6 is supplied through the exhaust gas recirculation passage 12 to the inside of the surge tank 7. At this time, if the pressure of the exhaust gas sent from the exhaust manifold 6 through the exhaust gas recirculation passage 12 and the throttle portion 23 into the constant pressure chamber 22 becomes slightly higher than the set pressure, which is in itself slightly higher than the atmospheric pressure, the diaphragm 24 of the modulator 15 rises against the force of the compression spring 27. As a result, the air bleed opening 33 is throttled by the diaphragm 24, so the vacuum in the vacuum chamber 17 becomes larger. Therefore, the valve body 21 rises against the force of the compression spring 19 and increases the area of the opening of the valve port 20, whereby the exhaust gas pressure in the constant pressure chamber 22 falls. When the exhaust gas pressure falls slightly lower than the set pressure, the diaphragm 24 descends, so the amount of the air bleed to the inside of the air bleed pipe 28 increases, whereby the vacuum in the vacuum chamber 17 becomes smaller. As a result the valve body 21 descends due to the spring force of the compression spring 19, so the area of the opening of the valve port 20 is reduced and therefore the exhaust gas pressure inside the constant pressure chamber 22 rises once more. In this way, the pressure inside the constant pressure chamber 22 is held at substantially the atmospheric pressure.

If the surge pressure of the exhaust gas inside the exhaust manifold 6 is made $P_e$ and the surge pressure of the exhaust gas inside the constant pressure chamber 22 is made $P_0$, the amount Q of the flow of the exhaust gas flowing from the exhaust manifold 6 through the exhaust gas recirculation passage 12 and the throttle portion 23 into the constant pressure chamber 22 is proportional to the square root of $(P_e - P_0)$. However, the surge pressure Po inside the constant pressure chamber 22 is equal to the above set pressure, which is substantially the atmospheric pressure, so $P_0$ becomes substantially zero and therefore the amount Q of the flow of the exhaust gas becomes proportional to the square root of $P_e$. However, the relationship of $P_e \propto Q_a^2$ stands between the amount $Q_a$ of intake air and the exhaust gas pressure $P_e$, so in the final analysis $Q \propto Q_a$ and therefore the amount Q of the exhaust gas recirculation gas recirculated in the surge tank 7 becomes proportional to the amount $Q_a$ of the intake air. In other words, the exhaust gas recirculation rate is held substantially constant by the exhaust gas recirculation control valve 14 and the modulator 15.

The electronic control unit 40 is comprised of a digital computer and is provided with a read only memory (ROM) 42, a random access memory (RAM) 43, a CPU (microprocessor etc.) 44, an intake port 45, and an output port 46 connected to each other through a bidirectional bus 41. On the engine body 1 is attached a water temperature sensor 36 which generates an output voltage proportional to the temperature of the engine cooling water. The output voltage of the water temperature sensor 36 is input through an AD converter 47 to the input port 45. Further, inside the exhaust gas recirculation passage 12 between the exhaust gas recirculation control valve 14 and the surge tank 7 is disposed a temperature sensor 37 which generates an output voltage proportional to the temperature inside the exhaust gas recirculation passage 12. The output voltage of the temperature sensor 37 is input through an AD converter 48 to the input port 45. Further, at the input port 45, there is input an on-off signal of a starter switch 49 for driving a starter motor. On the other hand, the output port 46 is connected through drive circuits 50 and 51 to the shut-off valve 35 and an alarm lamp, respectively.

Figure 2:
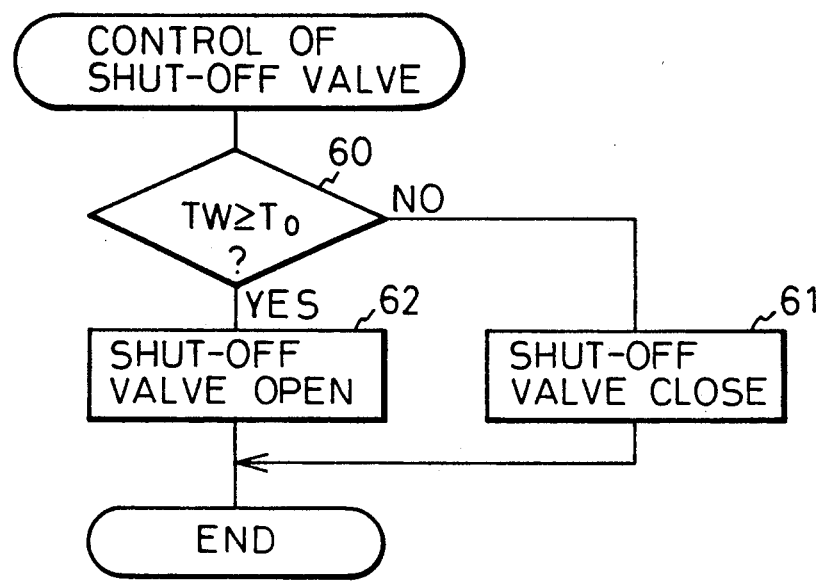
FIG. 2 is a flow chart for the control of a shut-off valve.

FIG. 2 shows a control routine for the shut-off valve 35. This routine is executed in, for example, the main routine.

Referring to FIG. 2, first, at step 60, it is discriminated if the temperature TW of the engine cooling water is higher than a predetermined set temperature $T_0$, for example, 65° C., based on the output signal of the water temperature sensor 36. When the temperature TW of the engine cooling water is lower than the set temperature $T_0$, the routine proceeds to step 61, where the shut-off valve 35 is made to close. When the shut-off valve 35 is made to close, even if the throttle valve 11 is made to open, vacuum is not led into the valve chamber 17 of the exhaust gas recirculation control valve 14, so the valve body 21 continues to close the valve port 20 and therefore the supply of the exhaust gas recirculation gas is made to stop.

On the other hand, when it is discriminated at step 60 that the temperature TW of the engine cooling water has become higher than the set temperature $T_0$, the routine proceeds to step 62, where the shut-off valve 35 is made to open. At this time, if the throttle valve 11 is open, vacuum is led into the valve chamber 17 of the exhaust gas recirculation control valve 14, so the valve body 21 opens the valve port 20 and an amount of exhaust gas recirculation gas proportional to the amount of the intake air is supplied into the surge tank 7, as mentioned earlier. Note that as the opening of the throttle valve 11 becomes larger and the vacuum acting on the valve port 32 becomes smaller, the valve body 21 closes the valve port 20 and therefore the supply of the exhaust gas recirculation gas is stopped at that time.

If, however, for example, a deposit builds up at the valve port 20 of the exhaust gas recirculation control valve 14 and the valve body 21 cannot completely close the valve port 20, exhaust gas recirculation gas will be supplied even when the shut-off valve 35 is closed. Further, even when the shut-off valve 35 is opened, but the operating state is one in which the supply of the exhaust gas recirculation gas should be stopped, that is, even when the throttle valve 11 is open for idling or the opening of the throttle valve 11 is large, exhaust gas recirculation gas will be supplied. Further, the stem of the valve body 21 will bite into the walls of the stem through hole and as a result even when the valve body 21 can no longer completely close the valve port 20, exhaust gas recirculation gas will end up being supplied when the supply of exhaust gas recirculation gas should be stopped, as mentioned earlier. Further, when the shut-off valve 35 should be closed and the supply of the exhaust gas recirculation gas should be stopped, exhaust gas recirculation gas will end up being supplied even when the shut-off valve 35 is not completely closed. If exhaust gas recirculation gas is supplied when the supply of exhaust gas recirculation gas should be stopped, the combustion efficiency will deteriorate, so it is necessary to discover as quickly as possible any malfunction of the exhaust gas recirculation control device 13.

As mentioned earlier, however, it is very hard to judge of the exhaust gas recirculation control device 13 has malfunctioned when controlling the supply of the exhaust gas recirculation gas after completion of engine warm-up. The present inventors, however, discovered that it is possible to reliably judge if an exhaust gas recirculation control device 13 has malfunctioned before the completion of engine warm-up. This will be explained next with reference to FIG. 3.

Figure 3:
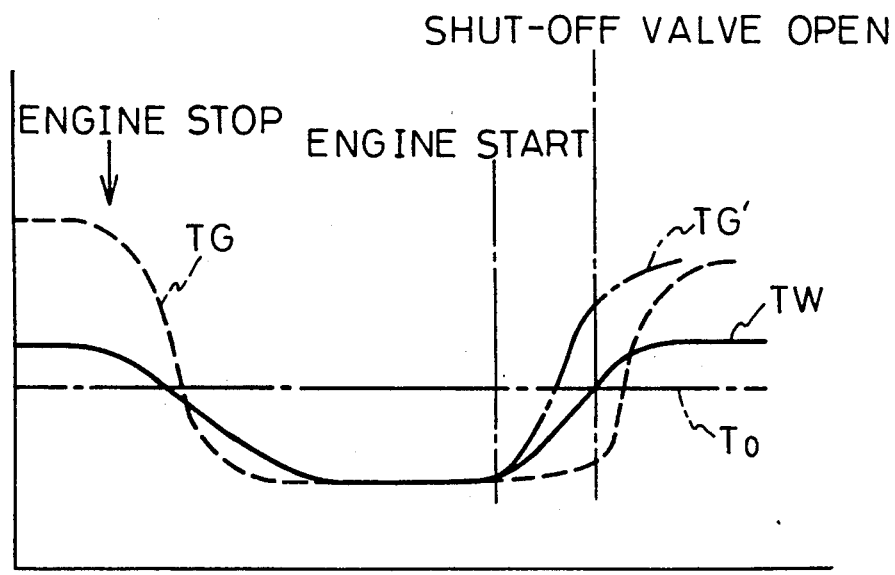
FIG. 3 is a time chart showing the changes in the temperature of the engine cooling water and the temperature in the exhaust gas recirculation passage.

The temperature TG inside the exhaust gas recirculation passage 12, detected by the temperature sensor 37, changes a great deal depending on whether the exhaust gas recirculation gas is being supplied and, further, changes due to the operating state of the engine, so while it is not known what degree of temperature the temperature TG inside the exhaust gas recirculation passage 12 has become, FIG. 3 shows the changes in the temperature TG inside the exhaust gas recirculation passage 12 and the temperature TW of the engine cooling water in the case where the temperature TG inside the exhaust gas recirculation passage 12, detected by the temperature sensor 37 before the engine stops, becomes higher than the temperature TW of the engine cooling water. Since the heat capacity of the engine body 1 is very large, however, even if the engine is stopped, the temperature TW of the engine cooling water does not fall that easily. As opposed to this, the heat capacity of the conduit forming the exhaust gas recirculation passage 12 is small, so the temperature TG inside the exhaust gas recirculation passage 12 falls rapidly when the engine is stopped. Therefore, as shown in FIG. 3, when the engine is stopped, the temperature TG inside the exhaust gas recirculation passage 12 falls rapidly compared with the temperature TW of the engine cooling water. A little while after the engine has stopped, the temperature TW of the engine cooling water becomes the atmospheric temperature and the temperature TG inside the exhaust gas recirculation passage 12 becomes substantially the atmospheric temperature as well. That is, as shown in FIG. 3, a little while after the engine has stopped, the temperature TW of the engine cooling water becomes substantially equal to the temperature TG inside the exhaust gas recirculation passage 12.

Next, when the engine is started, as shown in FIG. 3, the temperature TW of the engine cooling water gradually rises. For a while after the engine is started, however, the temperature TW of the engine cooling water remains lower than the set temperature $T_0$, so the shut-off valve 35 is closed and therefore if the exhaust gas recirculation control device 13 operates normally, the exhaust gas recirculation gas will not flow in the exhaust gas recirculation passage 12, so the temperature in the exhaust gas recirculation passage 12 will be maintained substantially constant. Next, when the temperature TW of the engine cooling water reaches the set temperature $T_0$, the shut-off valve 35 is opened, so if the throttle valve 11 opens at this time, the supply of the exhaust gas recirculation gas will be started and therefore, as shown in FIG. 3, the temperature TG in the exhaust gas recirculation passage 12 will rapidly rise. Next, the temperature TG in the exhaust gas recirculation passage 12 gradually rises until the warm-up of the engine is completed. In this way, when the exhaust gas recirculation control device 13 is operating normally, the temperature TG in the exhaust gas recirculation passage 12 changes in accordance with the normal pattern shown by the broken line in FIG. 3, wherein it rapidly changes when the temperature TW of the engine cooling water reaches the set temperature $T_0$.

As opposed to this, when the exhaust gas recirculation control device 13 malfunctions and, for example, exhaust gas recirculation gas is made able to flow through the valve port 20 despite the shut-off valve 35 being closed, if the engine is started, the temperature inside the exhaust gas recirculation passage 12 will gradually rise in a state higher than the temperature TW of the engine cooling water, as shown by the broken line TG' in FIG. 3. That is, if an abnormality occurs in the exhaust gas recirculation control device 13, the temperature inside the exhaust gas recirculation passage 12 changes in accordance with the abnormal pattern as shown by the broken line TG' of FIG. 3, where it gradually increases.

If the engine is stopped, however, despite the operating state of the engine before the engine was stopped, the temperature TG in the exhaust gas recirculation passage 12 falls to substantially the atmospheric temperature, which is lower than the set temperature $T_0$, and the temperature TW of the engine cooling water also falls to substantially the atmospheric temperature. Next, if the engine is started after having once been stopped, if the exhaust gas recirculation control device 13 operates normally, the temperature inside the exhaust gas recirculation passage 12 rises from the substantially atmospheric temperature by the normal pattern TG, while if there is an abnormality in the exhaust gas recirculation control device 13, the temperature inside the exhaust gas recirculation passage 12 rises from the substantially atmospheric temperature by the abnormal pattern TG'. That is, the normal pattern TG and the abnormal pattern TG' are not affected by the operating state of the engine before the engine was stopped. As will be clear from FIG. 3, however, the normal pattern TG and the abnormal pattern TG' not only deviate from each other in the vertical direction, but also differ in the form of the patterns themselves. Therefore, by using the differences in the patterns to judge if the actual pattern of change of the temperature in the exhaust gas recirculation passage 12 corresponds to the normal pattern TG or corresponds to the abnormal pattern TG', it becomes possible to accurate judge if a malfunction has occurred in the exhaust gas recirculation control device 13 without any effect from the operating state of the engine.

There are two main methods of judging if the actual pattern of change of the temperature in the exhaust gas recirculation passage 12 corresponds to the normal pattern TG or corresponds to the abnormal pattern TG'. The first method is to judge which pattern it corresponds to from the temperature inside the exhaust gas recirculation passage 12. This method takes note of the deviation in the vertical direction between the normal pattern TG and the abnormal pattern TG'. In this case, by judging which of the patterns the temperature inside the exhaust gas recirculation passage 12 corresponds to when the temperature difference between the temperature in the exhaust gas recirculation passage 12 when the temperature changes in accordance with the normal pattern TG and the temperature in the exhaust gas recirculation passage 12 when the temperature changes in accordance with the abnormal pattern TG' becomes larger, preferably when it becomes maximum, it becomes possible to most accurately judge if the exhaust gas recirculation control device 13 has malfunctioned.

As opposed to this, the second method judges which of the patterns is corresponded to from the amount of change of the temperature in the exhaust gas recirculation passage 12. This method takes note of the difference in the form of the patterns of the normal pattern TG and the abnormal pattern TG' themselves. In this case, by judging which of the patterns the amount of change of the temperature in the exhaust gas recirculation passage 12 corresponds to in the period of the engine operation where the difference between the amount of change in the temperature in the exhaust gas recirculation passage 12 when the temperature changes in accordance with the normal pattern TG and the amount of change in the temperature in the exhaust gas recirculation passage 12 when the temperature changes in accordance with the abnormal pattern TG' becomes larger, preferably when it becomes maximum, it becomes possible to most accurately judge if the exhaust gas recirculation control device 13 has malfunctioned.

Next, an explanation will be made of an embodiment of the first method, i.e., the method for judging which of the patterns is corresponded to from the temperature inside the exhaust gas recirculation passage 12.

As shown in FIG. 3, when the temperature inside the exhaust gas recirculation passage 12 changes in accordance with the normal pattern TG, it does not change much at all before the temperature TW of the engine cooling water reaches the set temperature $T_0$. As opposed to this, when the temperature changes in accordance with the abnormal pattern TG', the temperature inside the exhaust gas recirculation passage 12 always becomes higher than when changing in accordance with the normal pattern TG when the temperature TW of the engine cooling water reaches the set temperature $T_0$. Therefore, if the temperature inside the exhaust gas recirculation passage 12 is low when the temperature TW of the engine cooling water reaches the set temperature $T_0$ at which the shut-off valve 12 opens, the exhaust gas recirculation control device 13 is operating normally, while if high at that time, the exhaust gas recirculation control device 13 is malfunctioning. As will be understood from FIG. 3, the temperature difference between the temperature inside the exhaust gas recirculation passage 12 when the temperature changes in accordance with the normal pattern TG and the temperature inside the exhaust gas recirculation passage 12 when the temperature changes in accordance with the abnormal pattern TG' becomes the largest near when the temperature TW of the engine cooling water reaches the set temperature $T_0$ and therefore by judging which pattern the temperature inside the exhaust gas recirculation passage 12 corresponds to when the temperature TW of the engine cooling water reaches the set temperature $T_0$, as mentioned above, it becomes possible to accurately judge if the exhaust gas recirculation control device 13 is malfunctioning.

Note that when the engine is stopped, as mentioned earlier, both the temperature TW of the engine cooling water and the temperature inside the exhaust gas recirculation passage 12 become substantially the atmospheric temperature, which is lower than the set temperature $T_0$, and that the temperature TW of the engine cooling water and the temperature inside the exhaust gas recirculation passage 12 at that time are not affected by the operating state of the engine before it was stopped. Therefore, if the exhaust gas recirculation control device 13 is operating normally, the temperature TW of the engine cooling water definitely becomes higher than the temperature inside the exhaust gas recirculation passage 12 just before the temperature TW of the engine cooling water reaches the set temperature $T_0$ after the engine is started. Therefore, in this embodiment, it is judged that the device is normal if the temperature inside the exhaust gas recirculation passage 12 is lower than the set temperature $T_0$ just before the temperature TW of the engine cooling water reaches the set temperature $T_0$ and that the device is abnormal if it is higher.

Figure 4:
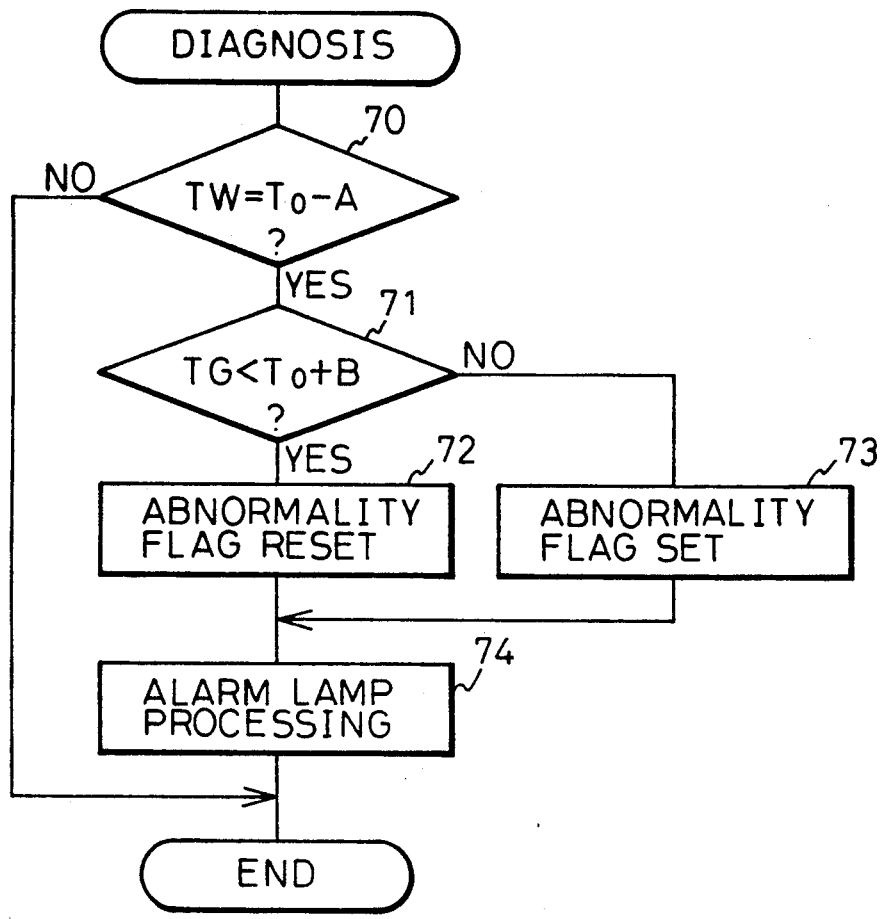
FIG. 4 is a flow chart for diagnosing malfunctions.

FIG. 4 shows the routine for diagnosing a malfunction of the exhaust gas recirculation control device 13. This routine is executed in, for example, the main routine.

Referring to FIG. 4, first, at step 70, it is discriminated if the temperature TW of the engine cooling water is a temperature $(T_0-A)$ of the set temperature $T_0$ minus a certain value A of about 1° to 5°, that is, if it is just before the shut-off valve 35 opens. If TW is not equal to $(T_0-A)$, the processing routine is ended, while if $TW=(T_0-A)$, the routine proceeds to step 71. At step 71, it is discriminated if the temperature TG inside the exhaust gas recirculation passage 12 is lower than the temperature $(T_0+B)$ of the set temperature $T_0$ plus a certain value B. Here, the certain value B is a small positive or negative value. When $TG \geq T_0+B$, it is judged that the exhaust gas recirculation control device 13 is malfunctioning, so the routine proceeds to step 73, where the abnormality flag is set. Next, the routine proceeds to step 74. As opposed to this, when $TG < T_0+B$, it is judged that the exhaust gas recirculation control device 13 is operating normally, so the routine proceeds to step 72, where the abnormality flag is reset. Next, the routine proceeds to step 74. At step 74, if the abnormality flag has been set, the alarm lamp 38 is lit.

Figure 5:
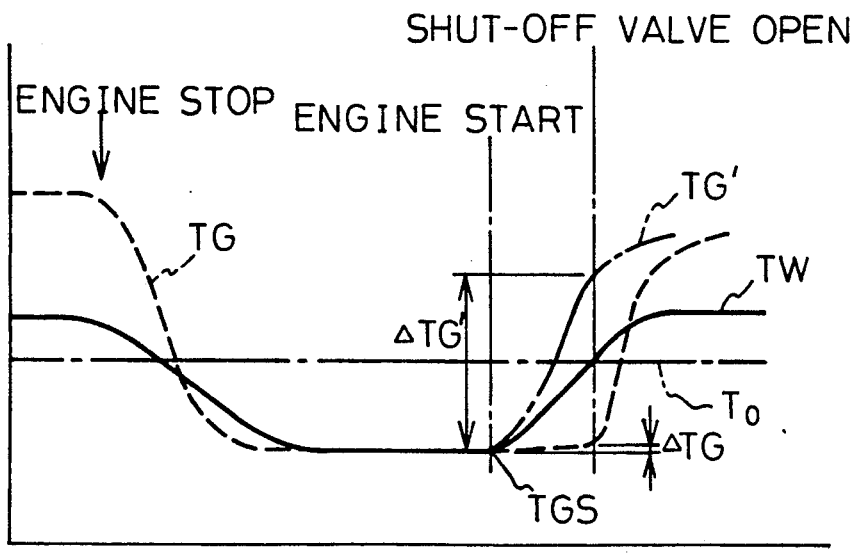
FIG. 5 is a time chart showing the changes in the temperature of the engine cooling water and the temperature in the exhaust gas recirculation passage.
Figure 6:
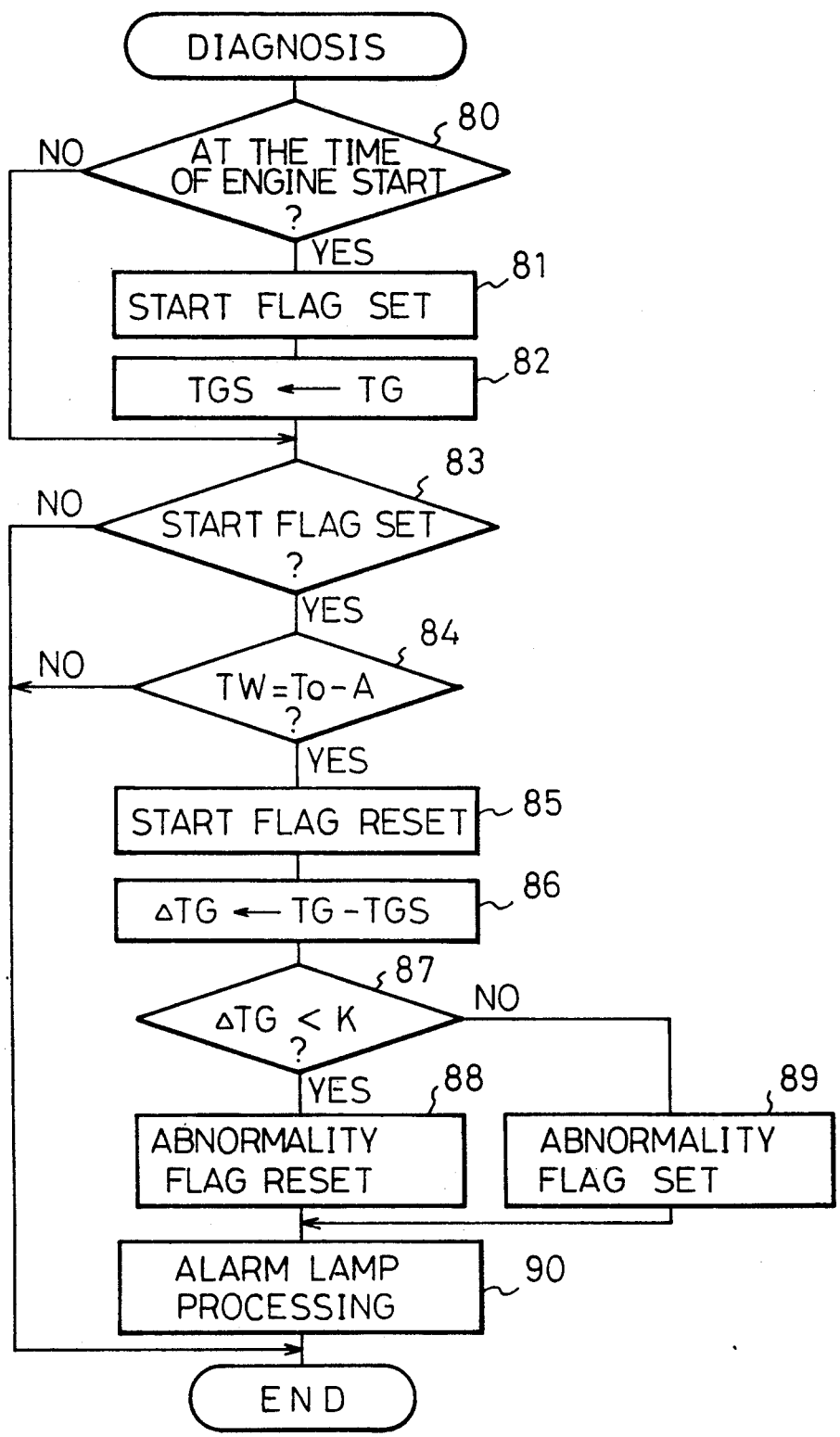
FIG. 6 is a flow chart for diagnosing malfunctions.

FIG. 5 and FIG. 6 show a first embodiment of the second method mentioned above, i.e., the method of judging which of the patterns is corresponded to from the amount of change of the temperature inside the exhaust gas recirculation passage 12.

As shown in FIG. 5, the amount of change $\Delta TG$ of the temperature inside the exhaust gas recirculation passage 12 when the temperature changes in accordance with the normal pattern TG in the period of engine operation from the start of the engine to when the temperature TW of the engine cooling water reaches the set temperature $T_0$ becomes considerably smaller than the amount of change $\Delta TG'$ of the temperature inside the exhaust gas recirculation passage 12 when it changes in accordance with the abnormal pattern TG'. Therefore, in this embodiment, if the amount of change of the temperature in the exhaust gas recirculation passage 12 during the period of the engine operation from the start of the engine to when the temperature TW of the engine cooling water reaches the set temperature $T_0$ is small, it is judged that the device is normal, while if it large, it is judged that it is abnormal.

FIG. 6 shows the routine for diagnosing a malfunction of the exhaust gas recirculation control device 13. The routine is, for example, executed in the main routine.

Referring to FIG. 6, first, at step 80, it is discriminated if the engine is being started up. Whether or not the engine is being started up is discriminated, for example, by whether the starter switch 49 is turned on or not. When the engine is being started up, the routine proceeds to step 81 where the start flag is set, then at step 82, the temperature TG inside the exhaust gas recirculation passage 12 is made the start-up temperature TGS. Next, the routine proceeds to step 83. On the other hand, when not engine start-up, the routine jumps from step 80 to step 83. At step 83, it is discriminated if the start flag has been set. When the start flag has been set, the routine proceeds to step 84, where it is discriminated if the temperature TW of the engine cooling water is the temperature $(T_0-A)$ of the set temperature $T_0$ minus a certain value A of about 1° to 5°, that is, if the time is just before the shut-off valve 35 opens. If TW is not equal to $(T_0-A)$, the processing routine is ended, while if $TW=(T_0-A)$, the routine proceeds to step 85. At step 85, the start flag is reset, then at step 86, the temperature difference $\Delta TG$ between the current temperature TG inside the exhaust gas recirculation passage 12 and the starting temperature TGS is calculated. Next, at step 87, it is discriminated if the temperature difference $\Delta TG$ is lower than a predetermined set value K. When $\Delta TG \geq K$, it is judged that a malfunction has occurred in the exhaust gas recirculation control device 13, whereupon the routine proceeds to step 89, where the abnormality flag is set. Next, the routine proceeds to step 90. As opposed to this, when $\Delta TG < K$, it is judged that the exhaust gas recirculation control device 13 is operating normally, whereupon the routine proceeds to step 88 where the abnormality flag is reset. Next, the routine proceeds to step 90. At step 90, if the abnormality flag is set, the alarm lamp 38 is lit.

Figure 7:
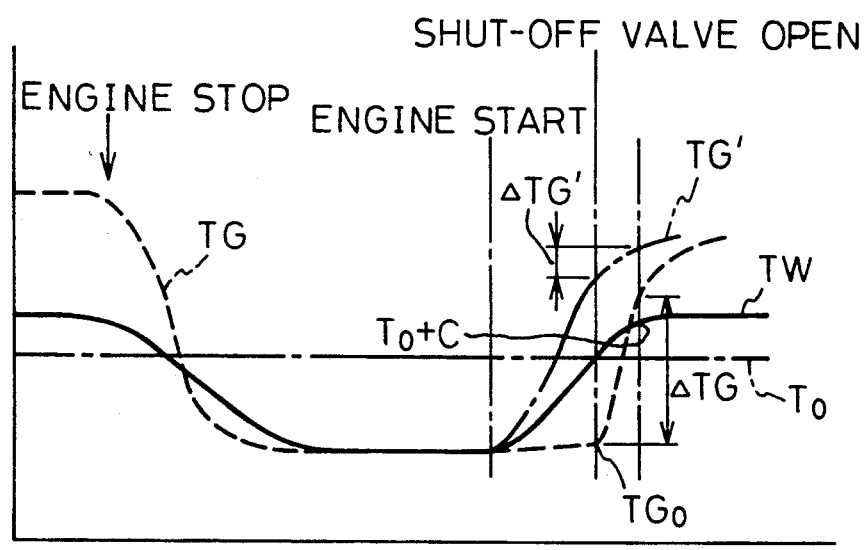
FIG. 7 is a time chart showing the changes in the temperature of the engine cooling water and the temperature in the exhaust gas recirculation passage.
Figure 8A:
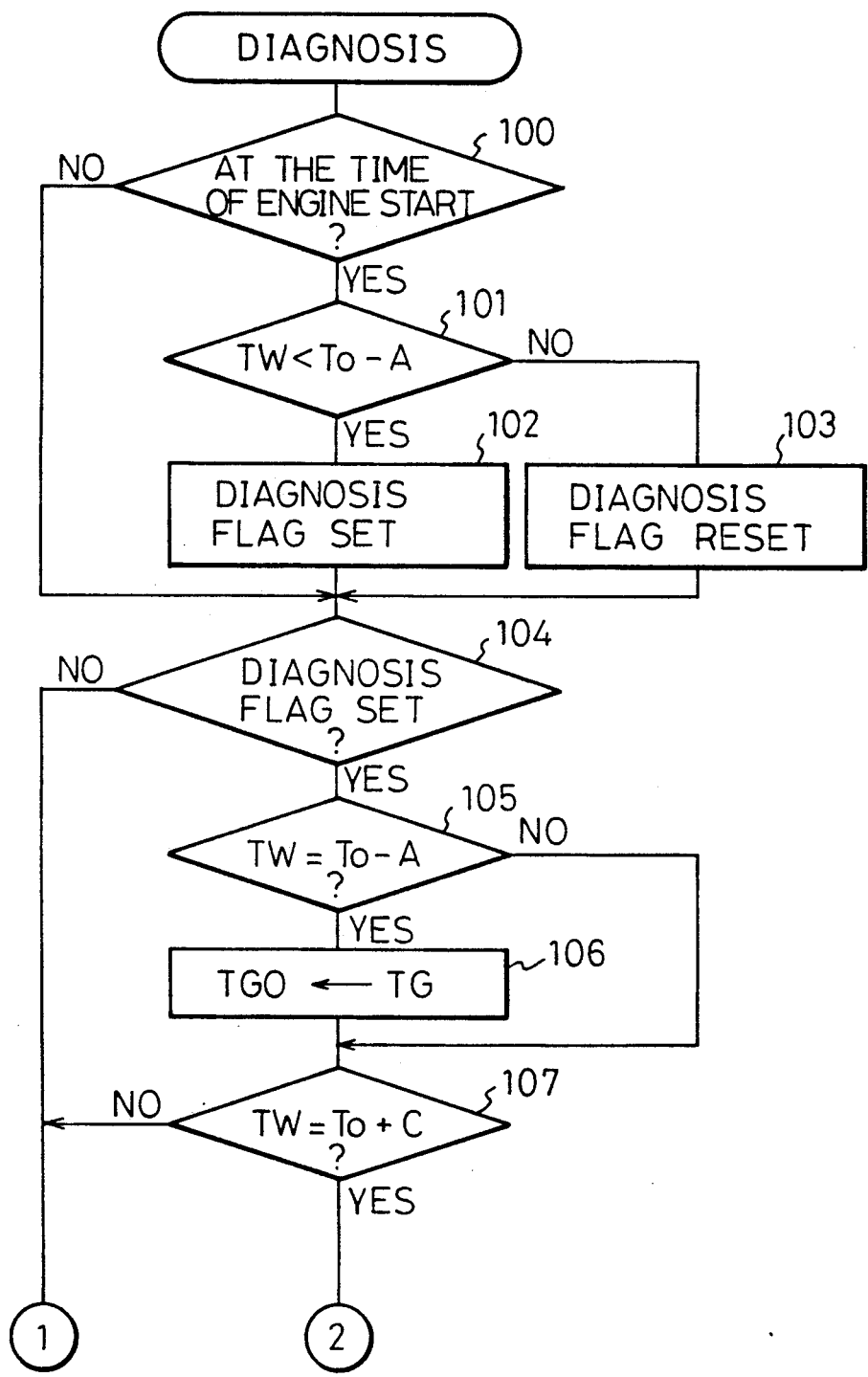
FIGS. 8A and 8B are flow charts for diagnosing malfunctions.
Figure 8B:
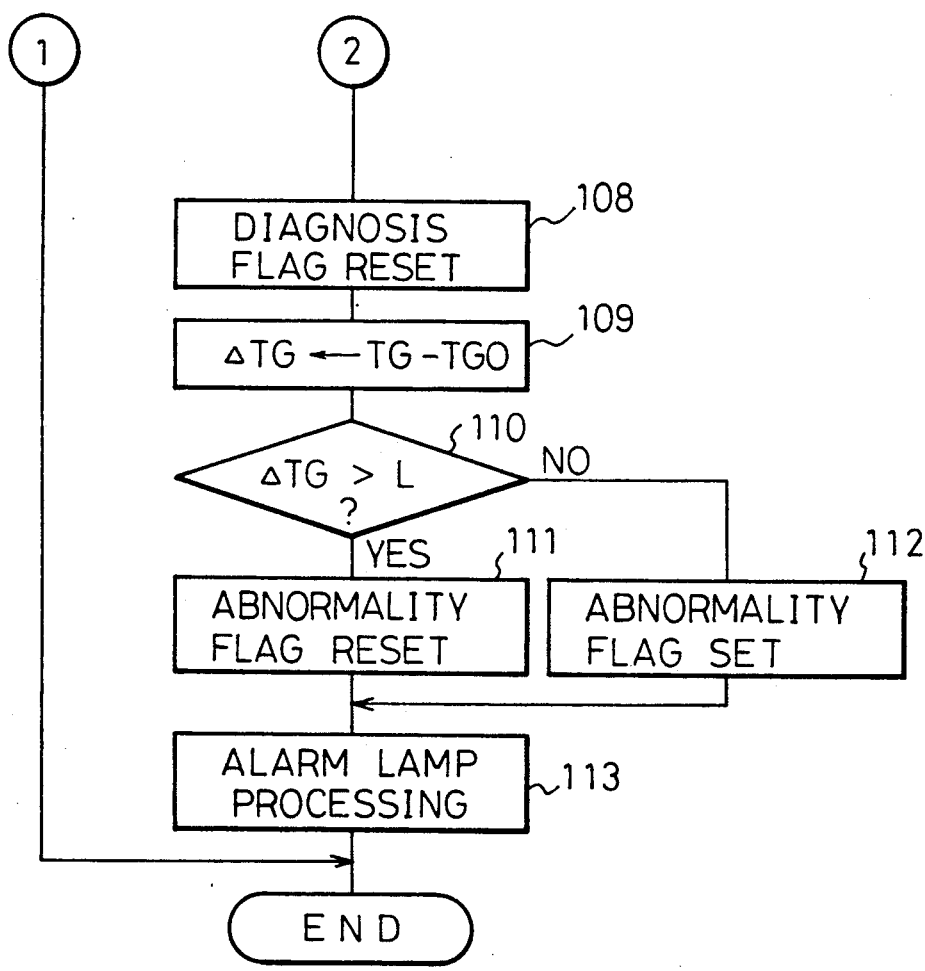

FIG. 7 and FIGS. 8A and 8B show a second embodiment of the second method mentioned above, i.e., the method for judging which pattern is corresponded to from the amount of change of the temperature inside the exhaust gas recirculation passage 12.

As shown in FIG. 7, the amount of change $\Delta TG$ of the temperature inside the exhaust gas recirculation passage 12 when the temperature changes in accordance with the normal pattern TG during the period of engine operation from when the temperature TW of the engine cooling water reaches the set temperature $T_0$ to when the temperature TW of the engine cooling water becomes $(T_0+C)$ becomes considerably larger than the amount of change $\Delta TG'$ of the temperature inside the exhaust gas recirculation passage 12 when the temperature changes in accordance with the abnormal pattern TG'. Therefore, in this embodiment, if the amount of change of the temperature inside the exhaust gas recirculation passage 12 during the period of engine operation from when the temperature TW of the engine cooling water reaches the set temperature $T_0$ to when the temperature TW of the engine cooling water becomes $(T_0+C)$ is large, it is judged that the device is normal, while when it is small, it is judged that it is abnormal.

FIG. 8A and FIG. 8B show a routine for diagnosing a malfunction of the exhaust gas recirculation control device 13. The routine is executed, for example, in the main routine.

Referring to FIG. 8A and FIG. 8B, first, at step 100, it is discriminated if the engine is being started up. Whether the engine is being started up is discriminated, for example, by whether the starter switch 49 is turned on. When the engine is being started up, the routine proceeds to step 101, where it is discriminated if the temperature TW of the engine cooling water is lower than a temperature $(T_0-A)$ of the set temperature $T_0$ minus a certain value A of about 1° to 5°. That is, it is discriminated if diagnosis of a malfunction is possible by the method shown in FIG. 7. Usually, it is possible, so the routine proceeds to step 102, where the diagnosis flag is set, then the routine proceeds to step 104. On the other hand, when diagnosis of the malfunction is not possible, the routine proceeds to step 103, where the diagnosis flag is reset, then the routine proceeds to step 104. On the other hand, when the engine is not just being started up, the routine jumps from step 100 to step 104.

At step 104, it is discriminated if the diagnosis flag is set. When the diagnosis flag has been set, the routine proceeds to step 105, where it is discriminated if the temperature TW of the engine cooling water is $(T_0-A)$, that is, if the time is just before the shut-off valve 35 opens If TW is not equal to $(T_0-A)$, the routine jumps to step 107, while if TW is equal to $(T_0-A)$, the routine proceeds to step 106, where the temperature TG inside the exhaust gas recirculation passage 12 is made the temperature TG0 before opening of the shut-off valve, then the routine proceeds to step 107. At step 107, it is discriminated if the temperature TW of the engine cooling water is equal to $(T_0+C)$. Here, C is a positive certain value. If $TW=(T_0+C)$, the routine proceeds to step 108, where the diagnosis flag is reset, then, at step 109, the temperature difference $\Delta TG$ between the temperature TG inside the exhaust gas recirculation passage 12 and the temperature TG0 before the shut-off valve opens is calculated. Next, at step 110, it is discriminated if the temperature difference $\Delta TG$ is larger than a predetermined set value L. When $\Delta TG \leq L$, it is judged that a malfunction has occurred in the exhaust gas recirculation control device 13, then the routine proceeds to step 112, where the abnormality flag is set. Next, the routine proceeds to step 113. As opposed to this, when $\Delta TG > L$, it is judged that the exhaust gas recirculation control device 13 is operating normally, then the routine proceeds to step 111, where the abnormality flag is reset. Next, the routine proceeds to step 113. At step 113, if the abnormality flag is set, the alarm lamp 38 is lit.

Figure 9:
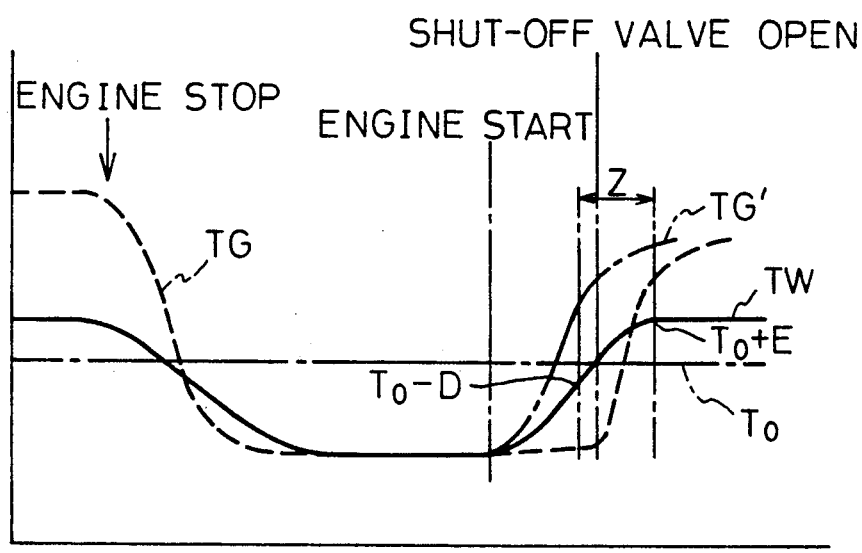
FIG. 9 is a time chart showing the changes in the temperature of the engine cooling water and the temperature in the exhaust gas recirculation passage.
Figure 10:
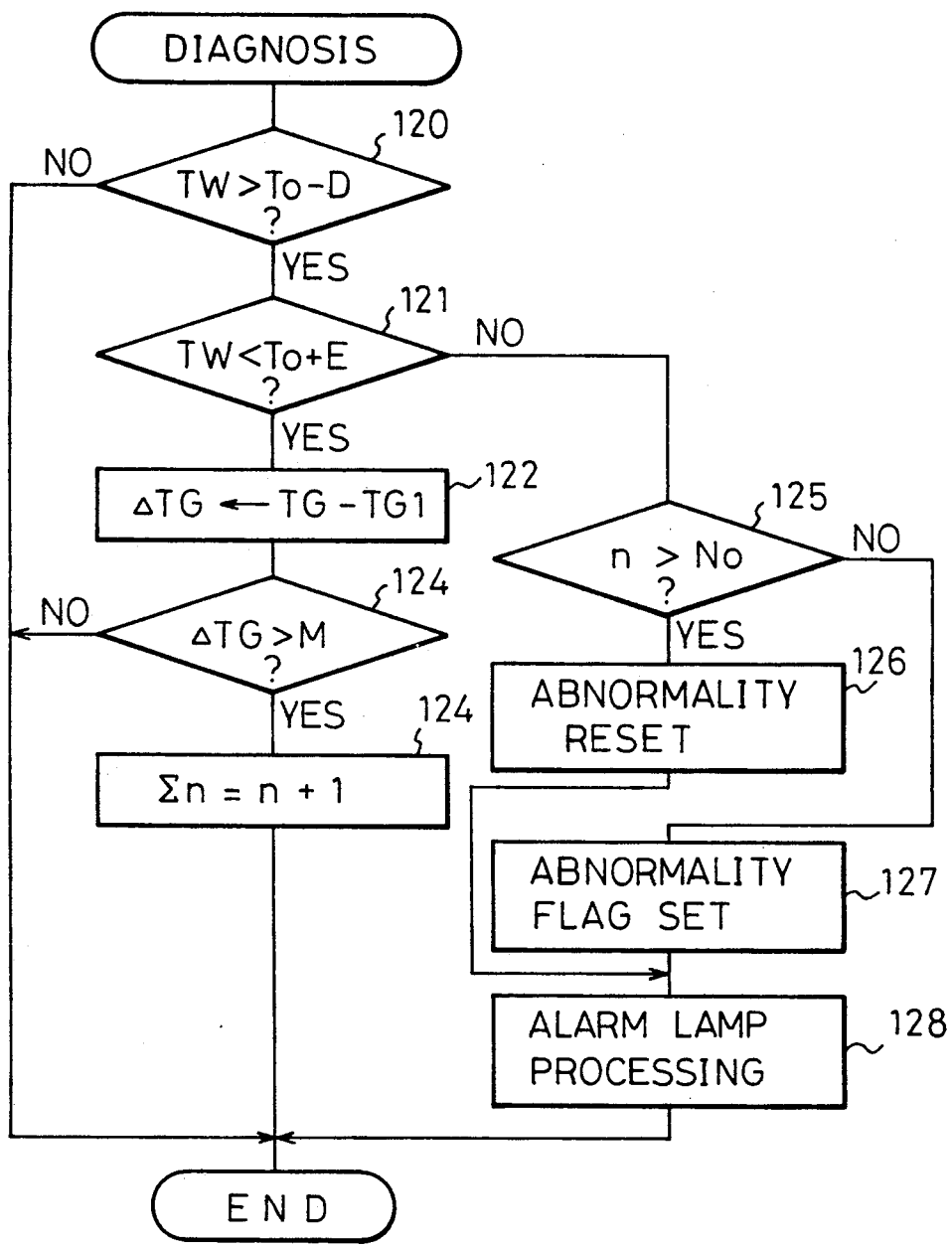
FIG. 10 is a flow chart for diagnosing malfunctions.

FIG. 9 and FIG. 10 show a third embodiment of the second method mentioned above, i.e., the method of judging which pattern is corresponded to from the amount of change of the temperature inside the exhaust gas recirculation passage 12.

As shown in FIG. 9, the amount of change per unit time of the temperature in the exhaust gas recirculation passage 12 when the temperature changes in accordance with the normal pattern TG during the period Z of engine operation after the temperature TW of the engine cooling water reaches the set temperature $T_0$ becomes considerably larger than the amount of change per unit time of the temperature inside the exhaust gas recirculation passage 12 when the temperature changes in accordance with the abnormal pattern TG'. Therefore, in this embodiment, when the amount of change per unit time of the temperature inside the exhaust gas recirculation passage 12 during the period Z of engine operation after the temperature TW of the engine cooling water has reached the set temperature $T_0$ is large, it is judged that the device is normal, while when it is small, it is judged that the device is abnormal. Note that in this embodiment, the device is judged to be normal or abnormal from the amount of change per unit time of the temperature inside the exhaust gas recirculation passage 12 during the period Z of engine operation, but it is also possible to judge if the device is normal or abnormal from the amount of change per unit time of the temperature in the exhaust gas recirculation passage 12 in the entire period of the warm-up operation.

FIG. 10 shows a routine for diagnosing a malfunction in the exhaust gas recirculation control device 13. The routine is executed, for example, by interruption every set time period.

Referring to FIG. 10, first, at step 120, it is discriminated if the temperature TW of the engine cooling water is higher than the temperature $(T_0-D)$ of the set temperature $T_0$ minus a certain value D of about 1° to 5°. When $TW > T_0 - D$, the routine proceeds to step 121, where it is discriminated if the temperature TW of the engine cooling water is lower than a temperature $(T_0+E)$ of the set temperature $T_0$ plus a certain value E of about 10°. When $TW < T_0 + E$, that is, when in the period Z of the engine operation of FIG. 9, the routine proceeds to step 122, where the temperature difference $\Delta TG$ of the current temperature TG inside the exhaust gas recirculation passage 12 and the temperature TG1 inside the exhaust gas recirculation passage 12 at the time of the previous interruption, that is, the amount $\Delta TG$ of change of the temperature per unit time, is calculated. Next, at step 123, it is discriminated if the $\Delta TG$ is larger than a predetermined certain value M. When $\Delta TG > M$, the routine proceeds to step 124, where the count is incremented by exactly 1.

Next, if it is discriminated at step 121 that $TW \geq T_0 + E$, the routine proceeds to step 125, where it is discriminated if the count n is larger than a predetermined certain value $N_0$. When normal, as shown in FIG. 9, the temperature inside the exhaust gas recirculation passage 12 rises rapidly after the opening of the shut-off valve 35, so the count n becomes larger in value. Note that the extent of the increase of the count n at this time depends on the interruption time. If it is discriminated that $n \leq N_0$ at step 125, it is judged that a malfunction has occurred in the exhaust gas recirculation control device 13, so the routine proceeds to step 127, where the abnormality flag is set. Next, the routine proceeds to step 128. As opposed to this, when $n > N_0$, it is judged that the exhaust gas recirculation control device 13 is operating normally, so the routine proceeds to step 126, where the abnormality flag is reset. Next, the routine proceeds to step 128. At step 128, if the abnormality flag has been set, the alarm lamp 38 is lit.

Figure 11:
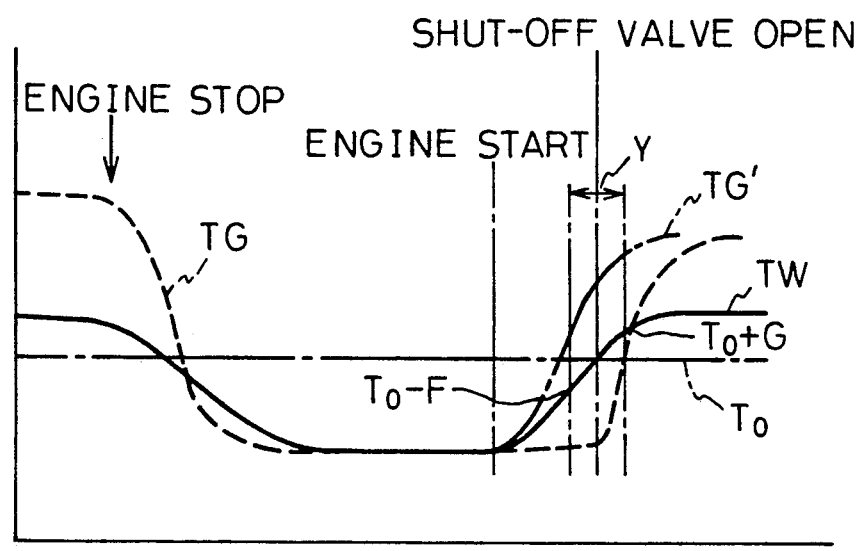
FIG. 11 is a time chart showing the changes in the temperature of the engine cooling water and the temperature in the exhaust gas recirculation passage.
Figure 12:
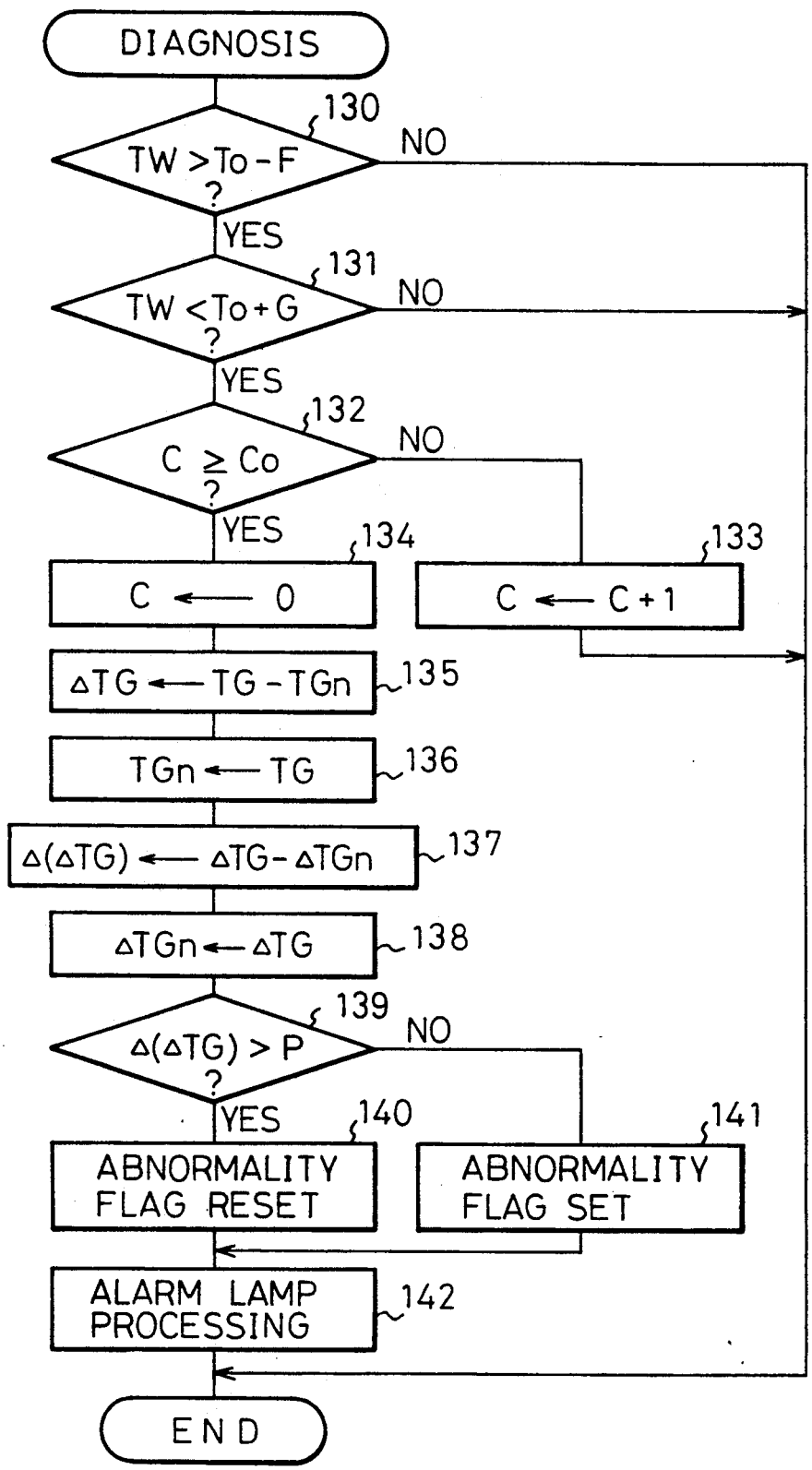
FIG. 12 is a flow chart for diagnosing malfunctions.

FIG. 11 and FIG. 12 show a fourth embodiment of the second method mentioned above, that is, the method of judging which pattern is corresponded to from the amount of change of the temperature inside the exhaust gas recirculation passage 12.

As shown in FIG. 11, when the temperature inside the exhaust gas recirculation passage 12 changes in accordance with the abnormal pattern TG', the temperature inside the exhaust gas recirculation passage 12 changes relatively smoothly overall without any sudden changes. As opposed to this, when the temperature inside the exhaust gas recirculation passage 12 changes in accordance with the normal pattern TG, the temperature inside the exhaust gas recirculation passage 12 changes rapidly when the temperature TW of the engine cooling water reaches the set temperature $T_0$. Therefore, if a sudden change in the temperature of the exhaust gas recirculation passage 12 is detected, it becomes possible to judge if the exhaust gas recirculation control device 13 is normal or abnormal.

If the temperature inside the exhaust gas recirculation passage 12 changes rapidly, however, the amount $\Delta$ ($\Delta TG$) of change of the amount $\Delta TG$ of change per unit time of the temperature inside the exhaust gas recirculation passage 12 becomes larger, while when the temperature inside the exhaust gas recirculation passage 12 changes smoothly without any sudden changes, the amount $\Delta$ ($\Delta TG$) of change of the amount $\Delta TG$ of change per unit time of the temperature inside the exhaust gas recirculation passage 12 becomes smaller. Therefore, in this embodiment, when the amount of change $\Delta$ ($\Delta TG$) of the amount $\Delta TG$ of change per unit time of the temperature inside the exhaust gas recirculation passage 12 during the period Y of engine operation around when the temperature TW of the engine cooling water reaches the set temperature $T_0$ is large, it is judged that the device is normal, while when it is small, it is judged that it is abnormal. Note that in this embodiment, it is judged if the device is normal or abnormal from the amount $\Delta$ ($\Delta TG$) of change of the amount $\Delta TG$ of change per unit time of the temperature inside the exhaust gas recirculation passage 12 during the period Y of engine operation, but it is also possible to judge if the device is normal or abnormal from the amount $\Delta$ ($\Delta TG$) of change of the amount $\Delta TG$ of change per unit time of the temperature inside the exhaust gas recirculation passage 12 in the entire period of the engine warm-up operation.

FIG. 12 shows a routine for diagnosing a malfunction in the exhaust gas recirculation control device 13. This routine is executed by interruption at set time intervals.

Referring to FIG. 12, first, at step 130, it is discriminated if the temperature TW of the engine cooling water is higher than a temperature $(T_0-F)$ of the set temperature $T_0$ minus a certain value F of about 5°. When $TW > T_0 - F$, the routine proceeds to step 131, where it is discriminated if the temperature TW of the engine cooling water is lower than the temperature $(T_0+G)$ of the set temperature $T_0$ plus a certain value G of about 5°. When $TW < T_0 + G$, that is, when in the period Y of the engine operation shown in FIG. 11, the routine proceeds to step 132, where it is discriminated if the count C is larger than a predetermined set value $C_0$. When $C < C_0$, the routine proceeds to step 133, where the count is incremented by exactly 1 and then the processing cycle is ended. As opposed to this, when $C \geq C_0$, the routine proceeds to step 134, where the count C is made zero. Therefore, at step 134, the routine proceeds at set intervals, it will be understood.

Next, at step 135, the difference $(TG - TG_n)$ between the current temperature TG inside the exhaust gas recirculation passage 12 and $TG_n$ is made $\Delta TG$, then at step 136, the current temperature TG inside the exhaust gas recirculation passage 12 is made $TG_n$. Therefore, $\Delta TG$ expresses the amount of change of the temperature $TG_n$ inside the exhaust gas recirculation passage 12 at the previous interruption and the temperature TG inside the exhaust gas recirculation passage 12 at the current interruption. Next, at step 137, the difference $(\Delta TG_\Delta - \Delta TG_n)$ of the $\Delta TG$ and $\Delta TG_n$ calculated at step 135 is made $\Delta(\Delta TG)$, then at step 138, the $\Delta TG$ calculated at step 135 is made $\Delta TG_n$. Therefore, $\Delta(\Delta TG)$ expresses the amount of change of the amount of change of the temperature inside the exhaust gas recirculation passage 12 in the time from the previous interruption to the current interruption.

Next, at step 139, it is discriminated if the $\Delta(\Delta TG)$ is larger than a predetermined set value P. When $\Delta(\Delta TG) \leq P$, it is judged that a malfunction has occurred in the exhaust gas recirculation control device 13, whereupon the routine proceeds to step 141 and the abnormality flag is set. Next, the routine proceeds to step 142. As opposed to this, when $\Delta(\Delta TG) > P$, it is judged that the exhaust gas recirculation control device 13 is operating normally, whereupon the routine proceeds to step 140, where the abnormality flag is reset. Next, the routine proceeds to step 142. At step 142, if the abnormality flag is set, the alarm lamp 38 is lit.

Figure 13A:
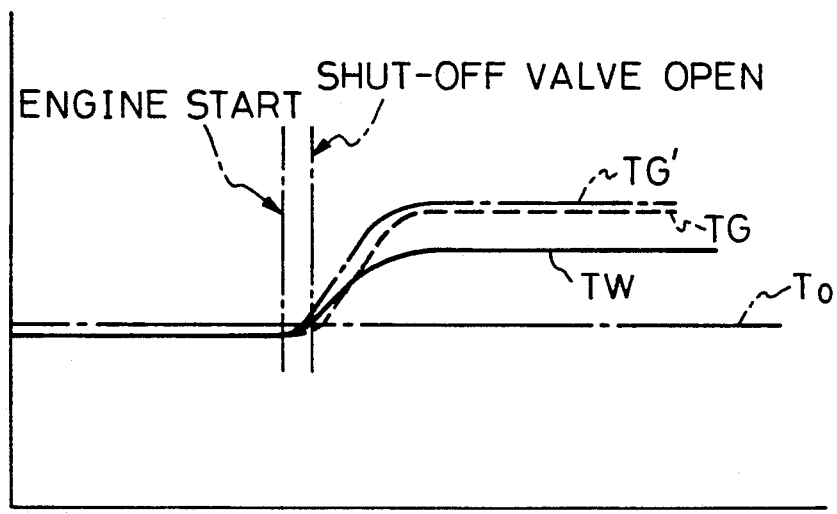
FIGS. 13A and 13B are time charts showing the changes in the temperature of the engine cooling water and the temperature in the exhaust gas recirculation passage.

As mentioned above, the normal pattern TG and the abnormal pattern TG' not only deviate from each other in the vertical direction, but also differ in the form of the patterns themselves. Therefore, by using the difference between the patterns to judge if the actual pattern of change of the temperature in the exhaust gas recirculation passage 12 corresponds to a normal pattern TG or corresponds to an abnormal pattern TG', it is possible to accurately judge if a malfunction has occurred in the exhaust gas recirculation control device 13 without being influenced by the operating state of the engine. When the temperature difference between the temperature inside the exhaust gas recirculation passage 12 when the temperature TW of the engine cooling water has reached the set temperature $T_0$ and temperature TW is small, however, the normal pattern TG and the abnormal pattern TG' deviate from the patterns shown in FIG. 3. For example, as shown in FIG. 13A, when the temperature TW of the engine cooling water at the time of engine start-up and the temperature TG inside the exhaust gas recirculation passage 12 are just slightly lower than the set temperature $T_0$, the temperature difference between the temperature inside the exhaust gas recirculation passage 12 when the temperature TW of the engine cooling water reaches the set temperature $T_0$ and the temperature TW of the engine cooling water becomes considerably small. At this time, the normal pattern TG and the abnormal pattern TG' become substantially the same patterns of change. That is, the normal pattern TG and the abnormal pattern TG' can no longer be discriminated from each other.

Figure 13B:
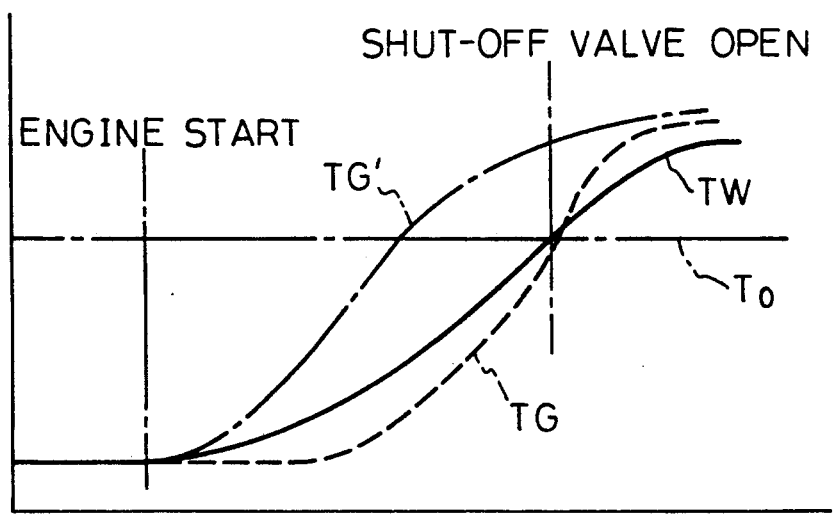

On the other hand, as shown in FIG. 13B, even when the temperature TW of the engine cooling water at the time of engine start-up and the temperature TG inside the exhaust gas recirculation passage 12 are considerably lower than the set temperature $T_0$, the temperature difference between the temperature inside the exhaust gas recirculation passage 12 when the temperature TW of the engine cooling water reaches the set temperature $T_0$ and the temperature TW of the engine cooling water becomes considerably small. That is, the lower the temperature TW of the engine cooling water at the time of engine start-up, the longer the time until the temperature TW of the engine cooling water reaches the set temperature $T_0$. If the time until the temperature TW of the engine cooling water reaches the set temperature $T_0$ becomes longer, the exhaust gas recirculation passage 12 and the temperature sensor 37 are heated by the transfer action from the exhaust manifold 6 and the temperature TG inside the exhaust gas recirculation passage 12 detected by the temperature sensor 37 rises along with the elapse of time as shown in FIG. 13B. As a result, the temperature difference between the temperature inside the exhaust gas recirculation passage 12 when the temperature TW of the engine cooling water reaches the set temperature $T_0$ and the temperature TW of the engine cooling water becomes considerably smaller.

In this case, the normal pattern TG and the abnormal pattern TG' deviate in the vertical direction in the same way as in the case shown in FIG. 3, but the normal pattern TG of the case shown in FIG. 13B does not become a pattern of a quick rise after the set temperature $T_0$ as shown in FIG. 3, therefore in the case shown in FIG. 13B, the normal pattern TG becomes considerably different from the normal pattern TG shown in FIG. 3.

In this way, in the case where both the normal pattern TG and the abnormal pattern TG' become patterns of gradual increases, there is a high possibility of mistakenly judging that there is a malfunction in the exhaust gas recirculation control device 13 from the pattern of change of the temperature inside the exhaust gas recirculation passage 12. Therefore, to accurately judge if a malfunction has occurred in the exhaust gas recirculation control device 13, it is necessary to judge there is a malfunction when, as shown in FIG. 3, the normal pattern TG is a pattern of a sharp change at the set temperature $T_0$ and the abnormal pattern TG' is a pattern of a gradual rise.

Figure 14:
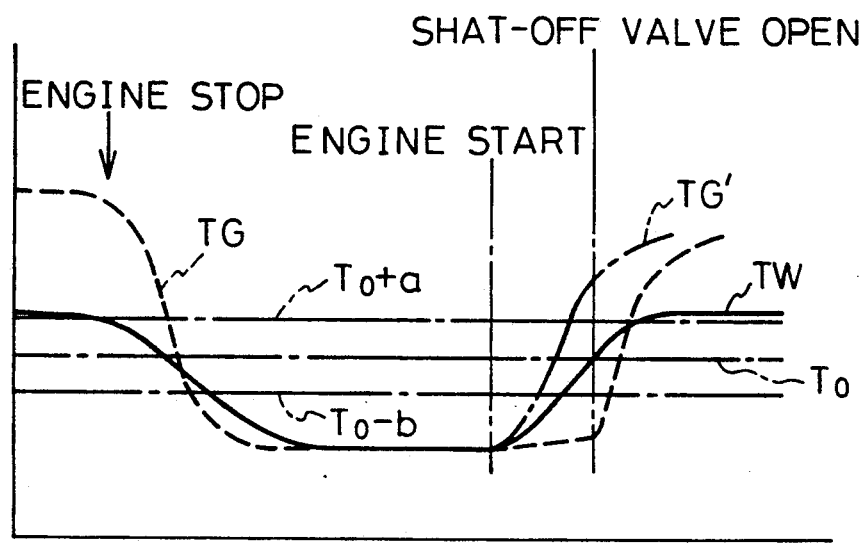
FIG. 14 is a time chart showing the changes in the temperature of the engine cooling water and the temperature in the exhaust gas recirculation passage.

The normal pattern TG becomes a pattern of a sharp change at the set temperature $T_0$ and the abnormal pattern TG' becomes a pattern of a gradual rise when the temperature difference between the temperature inside the exhaust gas recirculation passage 12 when the temperature TW of the engine cooling water reaches the set temperature $T_0$ and the temperature TW of the engine cooling water is over a set value and when, in the example shown in FIG. 14, the temperature inside the exhaust gas recirculation passage 12 is lower than $(T_0 - b)$ or higher than $(T_0 + a)$ when the temperature TW of the engine cooling water reaches the set temperature $T_0$. Therefore, in the embodiment according to the present invention, a malfunction is diagnosed when the temperature inside the exhaust gas recirculation passage 12 at the time when the temperature TW of the engine cooling water reaches the set temperature $T_0$ is lower than $(T_0 - b)$ or higher than $(T_0 + a)$. Diagnosis of a malfunction is prohibited when the temperature inside the exhaust gas recirculation passage 12 is between $(T_0 - b)$ and $(T_0 + a)$.

Figure 15:
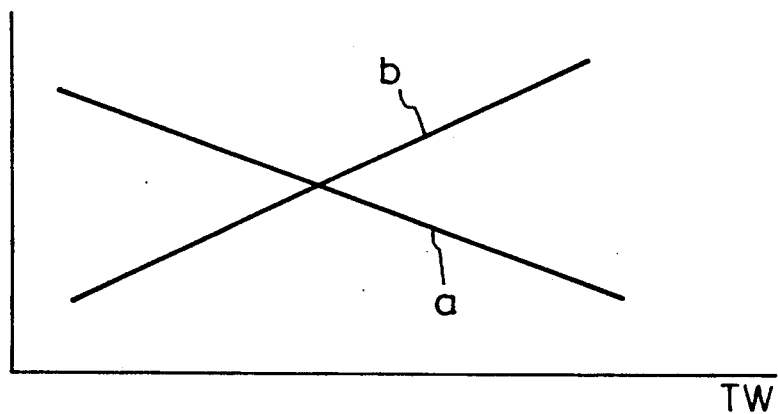
FIG. 15 is a graph showing the coefficients a and b.

Note that the longer the time from the start-up of the engine to when the temperature TW of the engine cooling water reaches the set temperature $T_0$, the higher the temperature inside the exhaust gas recirculation passage 12 when the temperature TW of the engine cooling water reaches the set temperature $T_0$, both at normal times and abnormal times, so the temperature region in which diagnosis of malfunctions is prohibited, that is, $(T_0-b)$ to $(T_0+a)$, is made higher the lower the temperature TW of the engine cooling water at the time of engine start-up. FIG. 15 shows the relationship between the coefficients a and b and the temperature TW of the engine cooling water at the time of engine start-up. This relationship is stored in advance in the ROM 42.

There are two main methods for judging if the actual pattern of change of temperature inside the exhaust gas recirculation passage 12 corresponds to a normal pattern TG or corresponds to an abnormal pattern TG' when the temperature inside the exhaust gas recirculation passage 12 at the time the temperature TW of the engine cooling water reaches the set temperature $T_0$ is between $(T_0-b)$ and $(T_0+a)$. That is, as mentioned earlier, the first method is to judge which pattern it corresponds to from the temperature inside the exhaust gas recirculation passage 12. The second method judges which of the patterns is corresponded to from the amount of change of the temperature in the exhaust gas recirculation passage 12.

Figure 16:
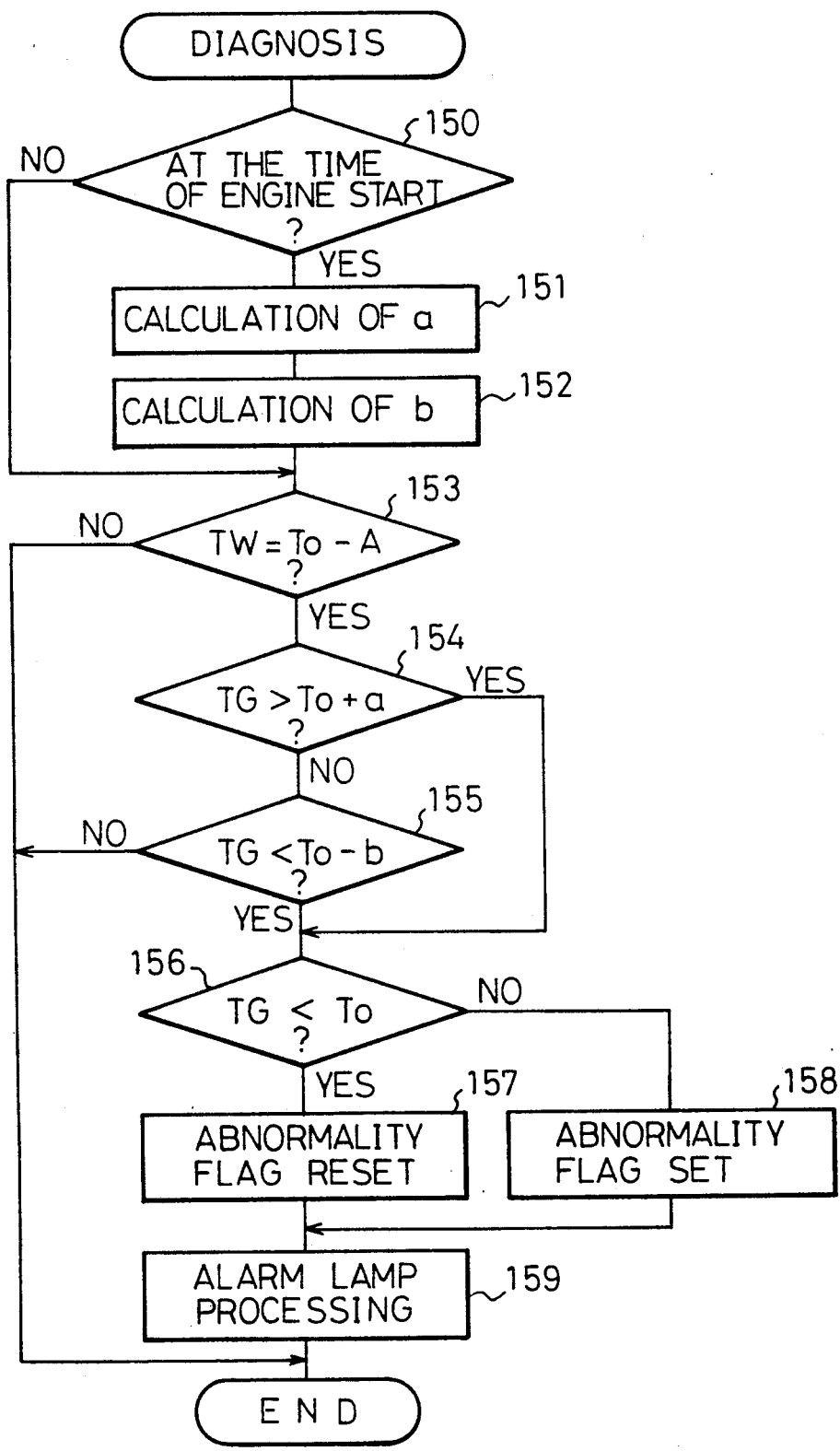
FIG. 16 is a flow chart for diagnosing malfunctions.

FIG. 16 shows the routine for diagnosing a malfunction of the exhaust gas recirculation control device 13 in accordance with the above-mentioned first method. This routine is executed in, for example, the main routine.

Referring to FIG. 16, first, at step 150, it is discriminated if the engine is being started up, for example, if the starter switch 49 is turned on. When the engine is being started up, the routine proceeds to step 151, where the coefficient a is calculated from the relationship shown in FIG. 15 based on the temperature TW of the engine cooling water, then at step 152, the coefficient b is calculated from the relationship shown in FIG. 15 based on the temperature TW of the engine cooling water. Next, the routine proceeds to step 153.

At step 153, it is discriminated if the temperature TW of the engine cooling water is a temperature $(T_0-A)$ of the set temperature $T_0$ minus a certain value A of about 1° to 5°, that is, if it is just before the shut-off valve 35 opens. If TW is not equal to $(T_0-A)$, the processing routine is ended, while if $TW=(T_0-A)$, the routine proceeds to step 154, where it is discriminated if the temperature TG inside the exhaust gas recirculation passage 12 is higher than $(T_0+a)$. When $TG>T_0+a$, the routine proceeds to step 156, while when $TG \leq T_0+a$, the routine proceeds to step 155, where it is discriminated if the temperature TG inside the exhaust gas recirculation passage 12 is lower than $(T_0-b)$. When $TG<T_0-b$, the routine proceeds to step 156.

At step 156, it is discriminated if the temperature TG inside the exhaust gas recirculation passage 12 is lower than the set temperature $T_0$. When $TG \geq T_0$, that is, $TG \geq T_0+a$, it is judged that the exhaust gas recirculation control device 13 is malfunctioning, so the routine proceeds to step 158, where the abnormality flag is set. Next, the routine proceeds to step 159. As opposed to this, when $TG<T_0$, that is, $TG \leq T_0-b$, it is judged that the exhaust gas recirculation control device 13 is operating normally, so the routine proceeds to step 157, where the abnormality flag is reset. Next, the routine proceeds to step 159. At step 159, if the abnormality flag has been set, the alarm lamp 38 is lit.

FIG. 17, FIG. 18, FIG. 19A, and FIG. 19B show a first embodiment of the second method mentioned above, i.e., the method of judging which of the patterns is corresponded to from the amount of change of the temperature inside the exhaust gas recirculation passage 12.

Figure 17:
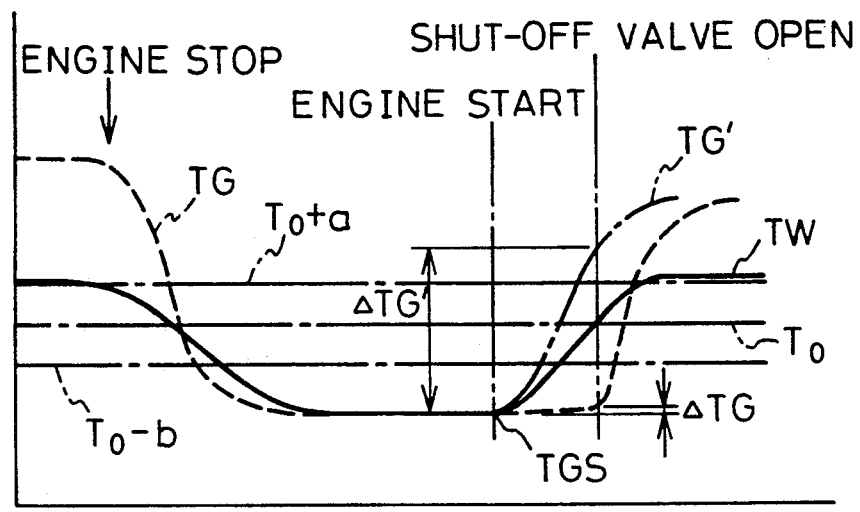
FIG. 17 is a time chart showing the changes in the temperature of the engine cooling water and the temperature in the exhaust gas recirculation passage.

As shown in FIG. 17, the amount of change $\Delta TG$ of the temperature inside the exhaust gas recirculation passage 12 when the temperature changes in accordance with the normal pattern TG in the period of engine operation from the start of the engine to when the temperature TW of the engine cooling water reaches the set temperature $T_0$ becomes considerably smaller than the amount of change $\Delta TG'$ of the temperature inside the exhaust gas recirculation passage 12 when it changes in accordance with the abnormal pattern TG'. Therefore, in this embodiment, if the amount of change of the temperature in the exhaust gas recirculation passage 12 during the period of the engine operation from the start of the engine to when the temperature TW of the engine cooling water reaches the set temperature $T_0$ is small, it is judged that the device is normal, while if it large, it is judged that it is abnormal.

Figure 19A:
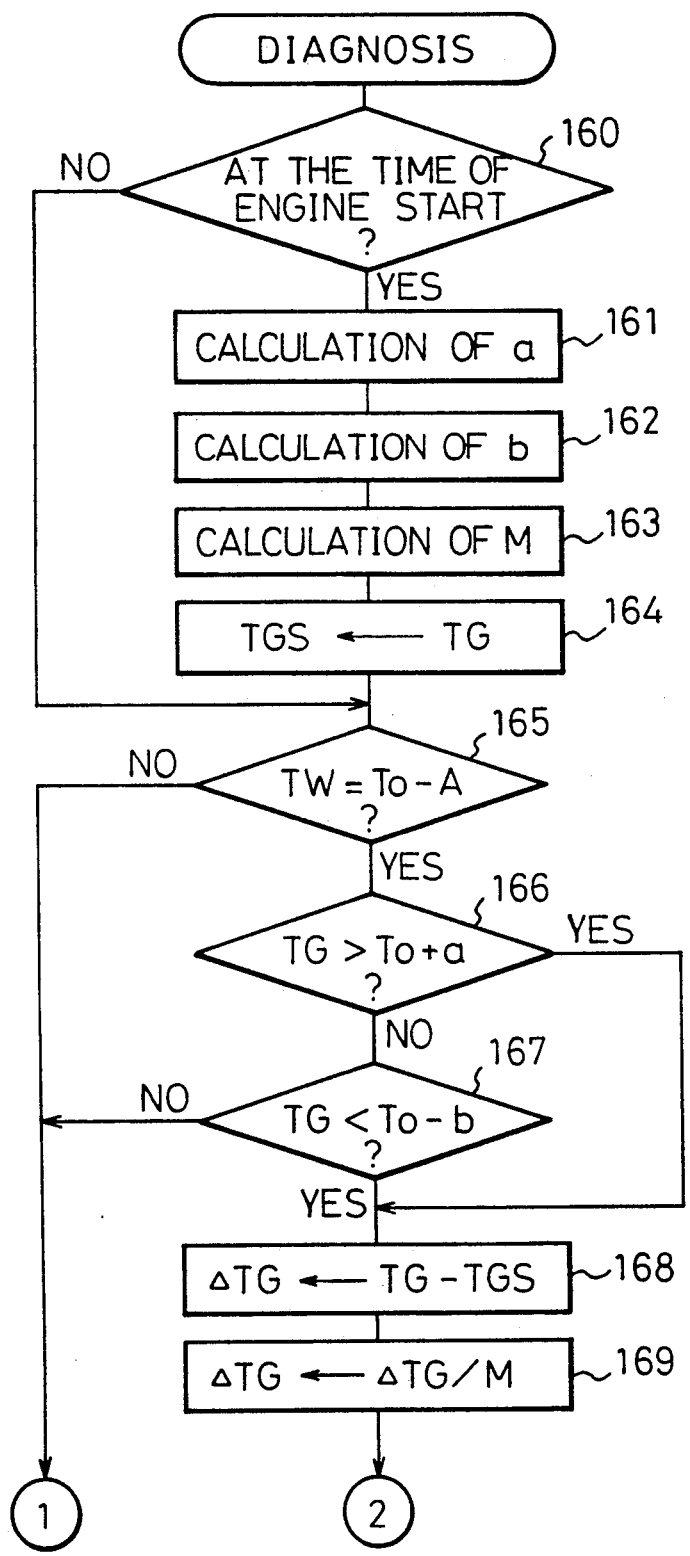
FIGS. 19A and 19B are flow charts for diagnosing malfunctions.
Figure 19B:
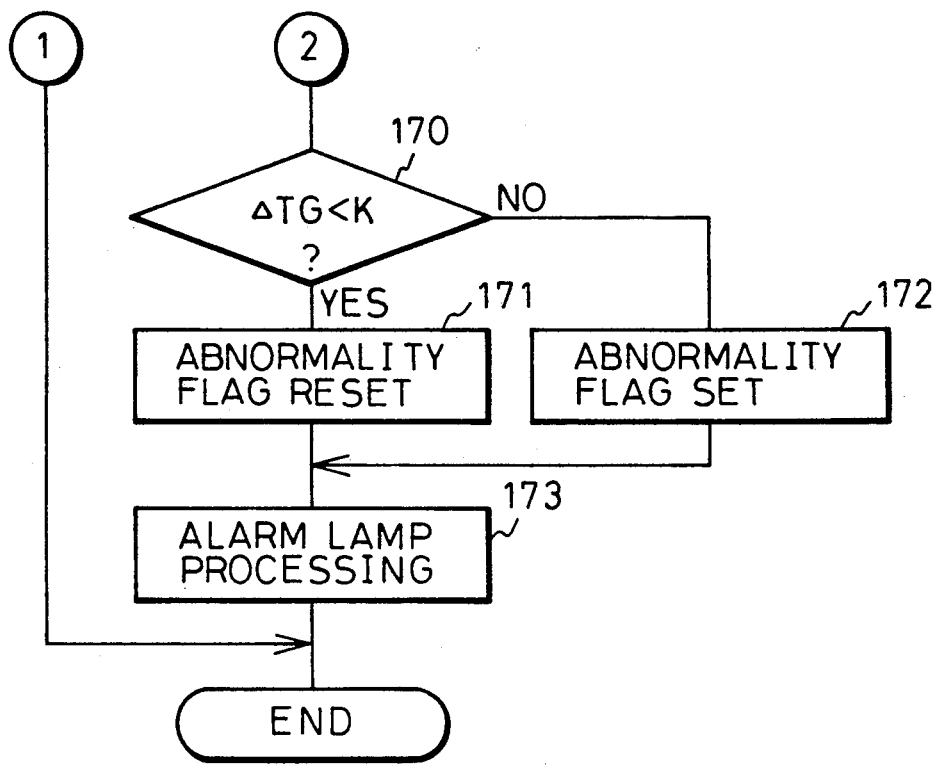

FIG. 19A and FIG. 19B show the routine for diagnosing a malfunction of the exhaust gas recirculation control device 13. The routine is, for example, executed in the main routine.

Referring to FIG. 19A and FIG. 19B, first, at step 160, it is discriminated if the engine is being started up. Whether or not the engine is being started up is discriminated, for example, by whether the starter switch 49 is turned on or not. When the engine is being started up, the routine proceeds to step 161, where the coefficient a is calculated from the relationship shown in FIG. 18 based on the temperature TW of the engine cooling water, then at step 162, the coefficient b is calculated from the relationship shown in FIG. 18 based on the temperature TW of the engine cooling water. Next, at step 163, the coefficient M is calculated from the relationship shown in FIG. 18 based on the temperature TW of the engine cooling water. Next, at step 164, the temperature TG inside the exhaust gas recirculation passage 12 is made TGS, and the routine proceeds to step 165.

Figure 18:
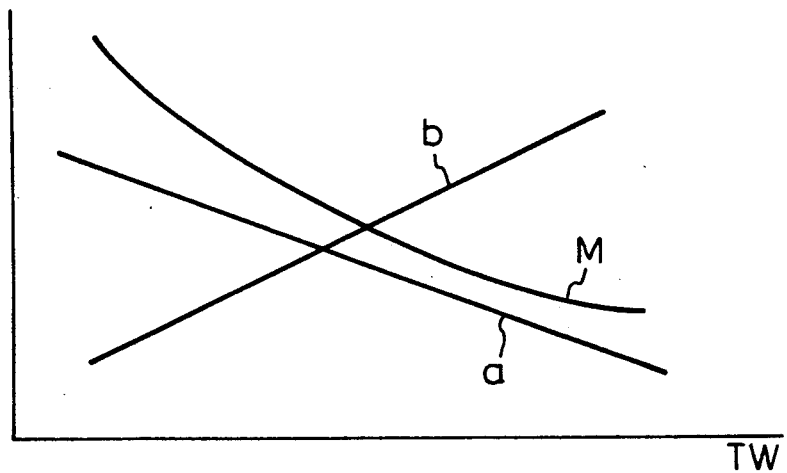
FIG. 18 is a graph showing the coefficients a and b.

At step 165, it is discriminated if the temperature TW of the engine cooling water is the temperature $(T_0-A)$ of the set temperature $T_0$ minus a certain value A of about 1° to 5°, that is, if the time is just before the shut-off valve 35 opens. If TW is not equal to $(T_0-A)$, the processing routine is ended, while if $TW=(T_0-A)$, the routine proceeds to step 166, where it is discriminated if the temperature TG inside the exhaust gas recirculation passage 12 is higher than $(T_0+a)$. When $TG>T_0+a$, the routine proceeds to step 168, while when $TG \leq T_0+a$, the routine proceeds to step 167, where it is discriminated if the temperature TG inside the exhaust gas recirculation passage 12 is lower than $(T_0-b)$. When $TG<T_0-b$, the routine proceeds to step 168, where the temperature difference $\Delta TG$ between the current temperature TG inside the exhaust gas recirculation passage 12 and the starting temperature TGS is calculated. Next, at step 169, the final $\Delta TG$ is calculated by dividing $\Delta TG$ by M. That is, the $\Delta TG$ and $\Delta TG$, shown in FIG. 17 become larger the longer the time elapsing from the engine start-up to when the temperature TW of the engine cooling water reaches the set temperature $T_0$, so to make the $\Delta TG$ and $\Delta TG$, substantially the same values despite the elapsed time, at step 169, as shown in FIG. 18, $\Delta TG$ is divided by a coefficient M which increases along with the lowering of the temperature TW of the engine cooling water at the time of engine start-up.

When the final $\Delta TG$ is calculated at step 169, the routine proceeds to step 170, where it is discriminated if $\Delta TG$ is lower than a predetermined set value K. When $\Delta TG \geq K$, it is judged that a malfunction has occurred in the exhaust gas recirculation control device 13, whereupon the routine proceeds to step 172 and the abnormality flag is set. Next, the routine proceeds to step 173. As opposed to this, when $\Delta TG < K$, it is judged that the exhaust gas recirculation control device 13 is operating normally, so the routine proceeds to step 171, where the abnormality flag is reset. Next, the routine proceeds to step 173. At step 173, if the abnormality flag has been set, the alarm lamp 38 is lit.

As explained above, when the temperature TW of the engine cooling water at the time of engine start-up is just slightly lower than the set temperature $T_0$ as shown in FIG. 13A and when the temperature TW of the engine cooling water at the time of engine start-up is considerably lower than the set temperature $T_0$ as shown in FIG. 13B, the temperature difference between the temperature TW of the engine cooling water and the temperature inside the exhaust gas recirculation passage 12 when the temperature TW of the engine cooling water reaches the set temperature $T_0$ becomes smaller. Therefore, prohibiting the diagnosis of a malfunction when the temperature TW of the engine cooling water at the time of engine start-up is just slightly lower and considerably lower than the set temperature $T_0$ becomes the same thing as prohibiting the diagnosis of a malfunction when the temperature difference is small when the temperature TW of the engine cooling water reaches the set temperature $T_0$. Further, the lower the temperature TW of the engine cooling water at the time of engine start-up, the longer the time until the temperature TW of the engine cooling water reaches the set temperature $T_0$. Therefore, prohibiting diagnosis of a malfunction when the time until the temperature TW of the engine cooling water reaches the set temperature $T_0$ after engine start-up is short and very long becomes the same thing as prohibiting diagnosis of a malfunction when the above-mentioned temperature difference is small when the temperature TW of the engine cooling water reaches the set temperature $T_0$.

Figure 20:
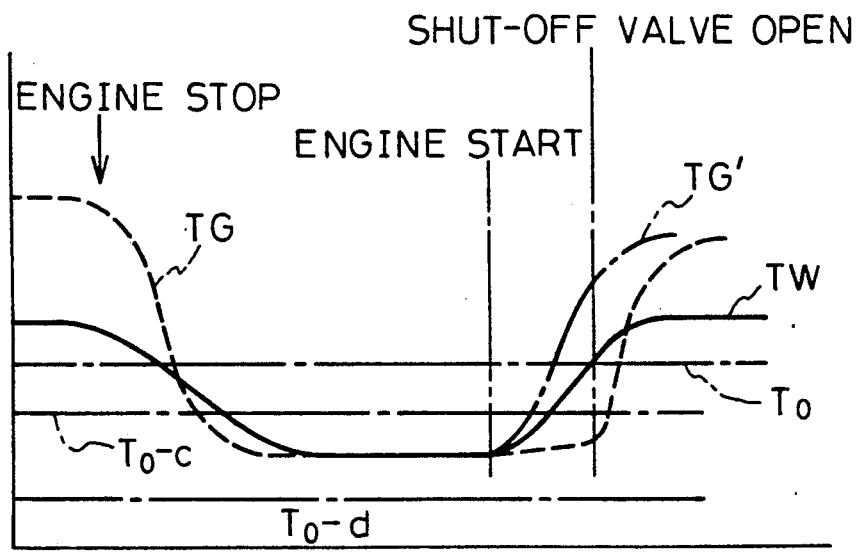
FIG. 20 is a time chart showing the changes in the temperature of the engine cooling water and the temperature in the exhaust gas recirculation passage.
Figure 21A:
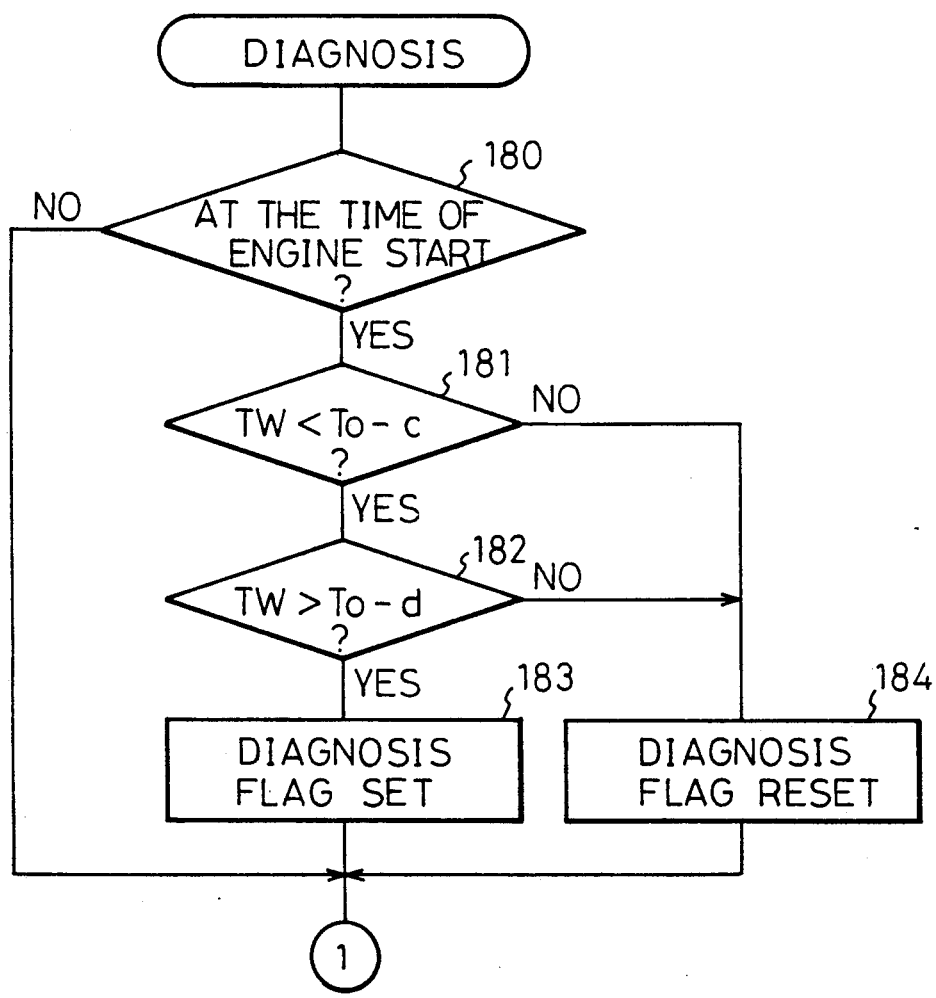
FIGS. 21A and 21B are flow charts for diagnosing malfunctions.
Figure 21B:
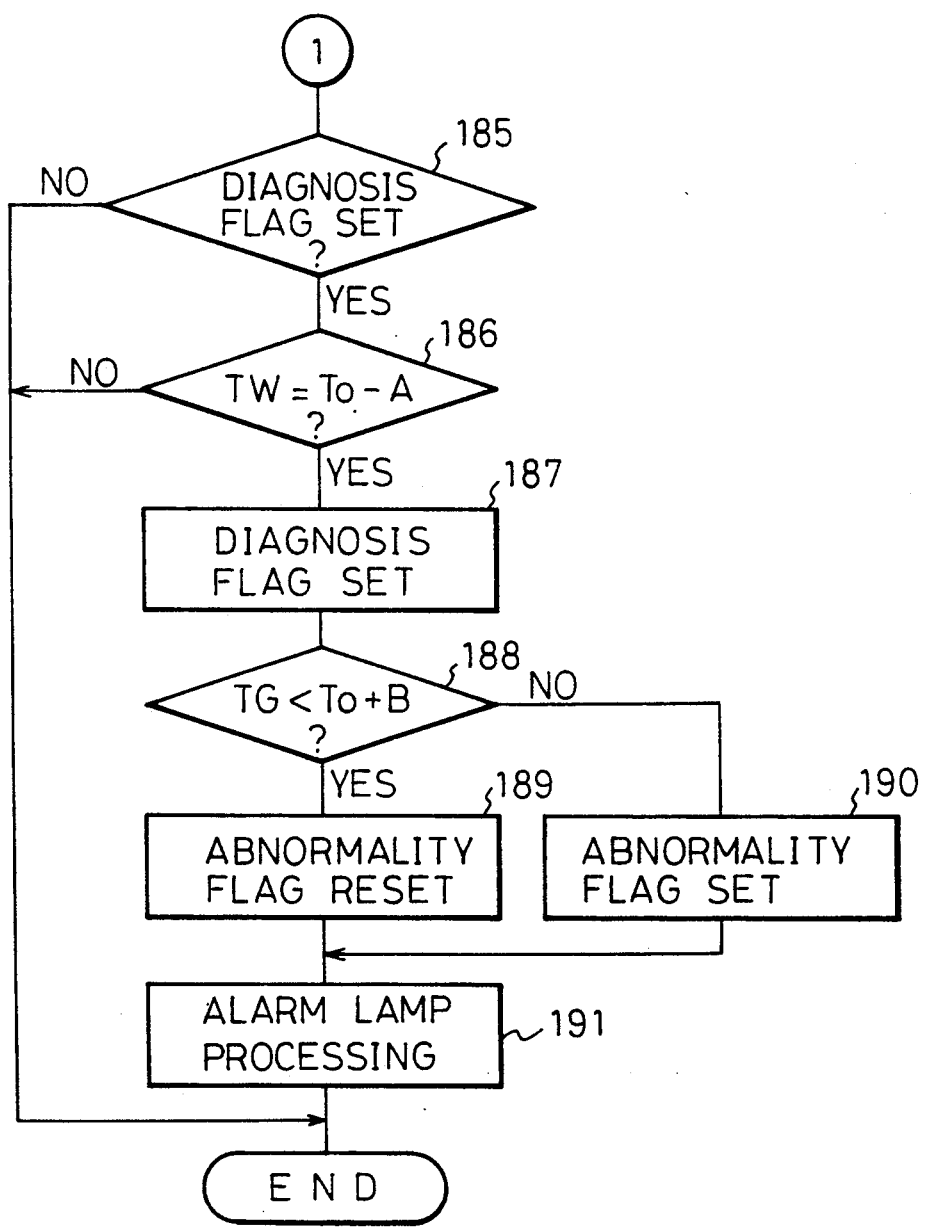

FIG. 20, FIG. 21A, and FIG. 21B show an embodiment where the diagnosis of a malfunction is prohibited when the temperature TW of the engine cooling water at the time of engine start-up is just slightly lower or considerably lower than the set temperature $T_0$. In this embodiment, diagnosis of a malfunction is prohibited when the temperature TW of the engine cooling water at the time of engine start-up is higher than $(T_0-c)$ or lower than $(T_0-d)$.

FIG. 21A and FIG. 21B show a routine for diagnosing a malfunction of the exhaust gas recirculation control device 13. This routine is, for example, executed in the main routine.

Referring to FIG. 21A and FIG. 21B, first, at step 180, it is discriminated if the engine is being started up. Whether or not the engine is being started up is discriminated, for example, by whether the starter switch 49 is turned on or not. When the engine is being started up, the routine proceeds to step 181, where it is discriminated if the temperature TW of the engine cooling water is lower then $(T_0-c)$. When $TW < T_0-c$, the routine proceeds to step 182, where it is discriminated if the temperature TW of the engine cooling water is higher than $(T_0-d)$. When $TW > T_0-d$, the routine proceeds to step 183, where the abnormality flag is set, then the routine proceeds to step 185. On the other hand, when $TW > T_0-c$ or $TW \geq T_0-d$, the routine proceeds to step 184, where the diagnosis flag is reset, then the routine proceeds to step 185.

At step 185, it is discriminated if the diagnosis flag has been set. If the diagnosis flag has been set, the routine proceeds to step 186, where it is discriminated if the temperature TW of the engine cooling water is the temperature $(T_0-A)$ of the set temperature $T_0$ minus a certain value A of about 1° to 5°, that is, if it is just before the shut-off valve 35 opens. If TW is not equal to $(T_0-A)$, the processing routine is ended, while if $TW = (T_0-A)$, the routine proceeds to step 187, where the diagnosis flag is reset. Next, the routine proceeds to step 188. At step 188, it is discriminated if the temperature TG inside the exhaust gas recirculation passage 12 is lower than the temperature $(T_0+B)$ of the set temperature $T_0$ plus a certain value B. Here, the certain value B is a small positive or negative value. When $TG \geq T_0+B$, it is judged that the exhaust gas recirculation control device 13 is malfunctioning, so the routine proceeds to step 190, where the abnormality flag is set. Next, the routine proceeds to step 191. As opposed to this, when $TG < T_0+B$, it is judged that the exhaust gas recirculation control device 13 is operating normally, so the routine proceeds to step 189, where the abnormality flag is reset. Next, the routine proceeds to step 191. At step 191, if the abnormality flag has been set, the alarm lamp 38 is lit.

Figure 22A:
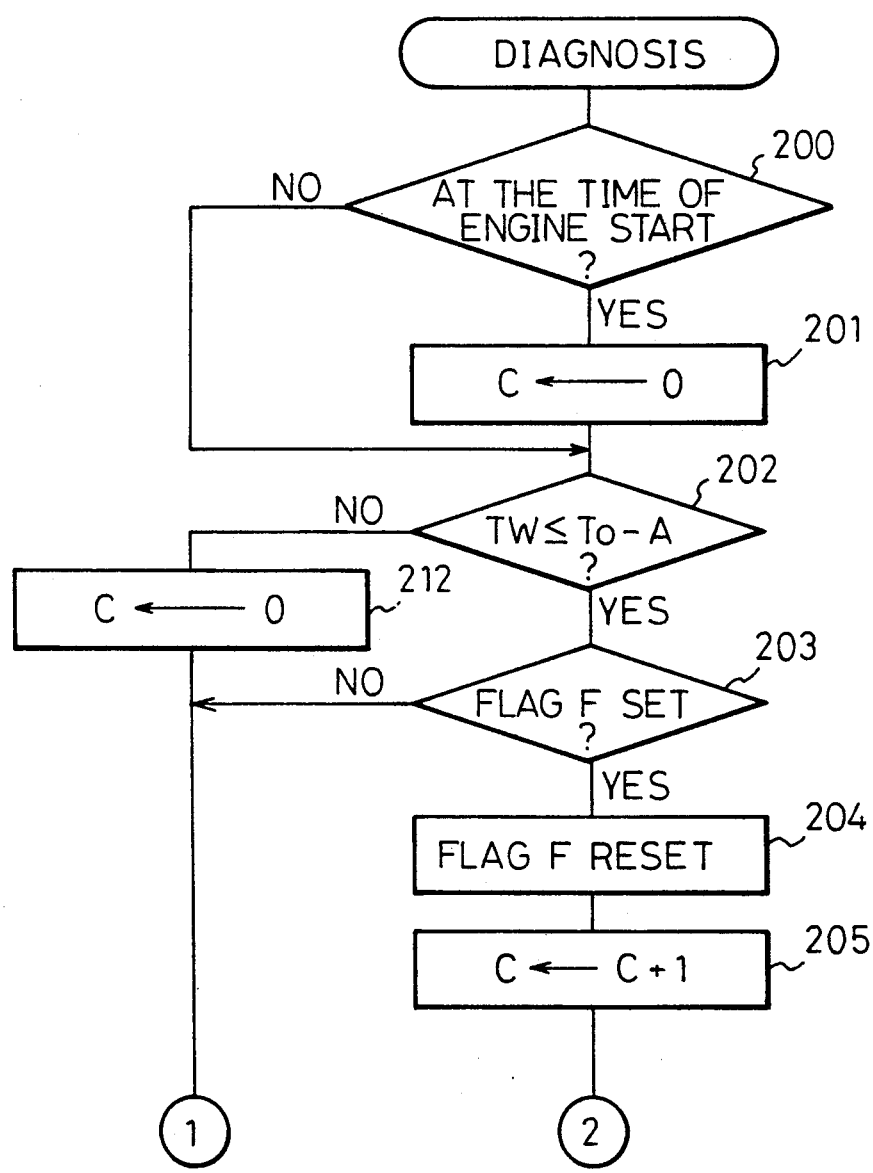
FIGS. 22A and 22B are flow charts for diagnosing malfunctions.
Figure 22B:
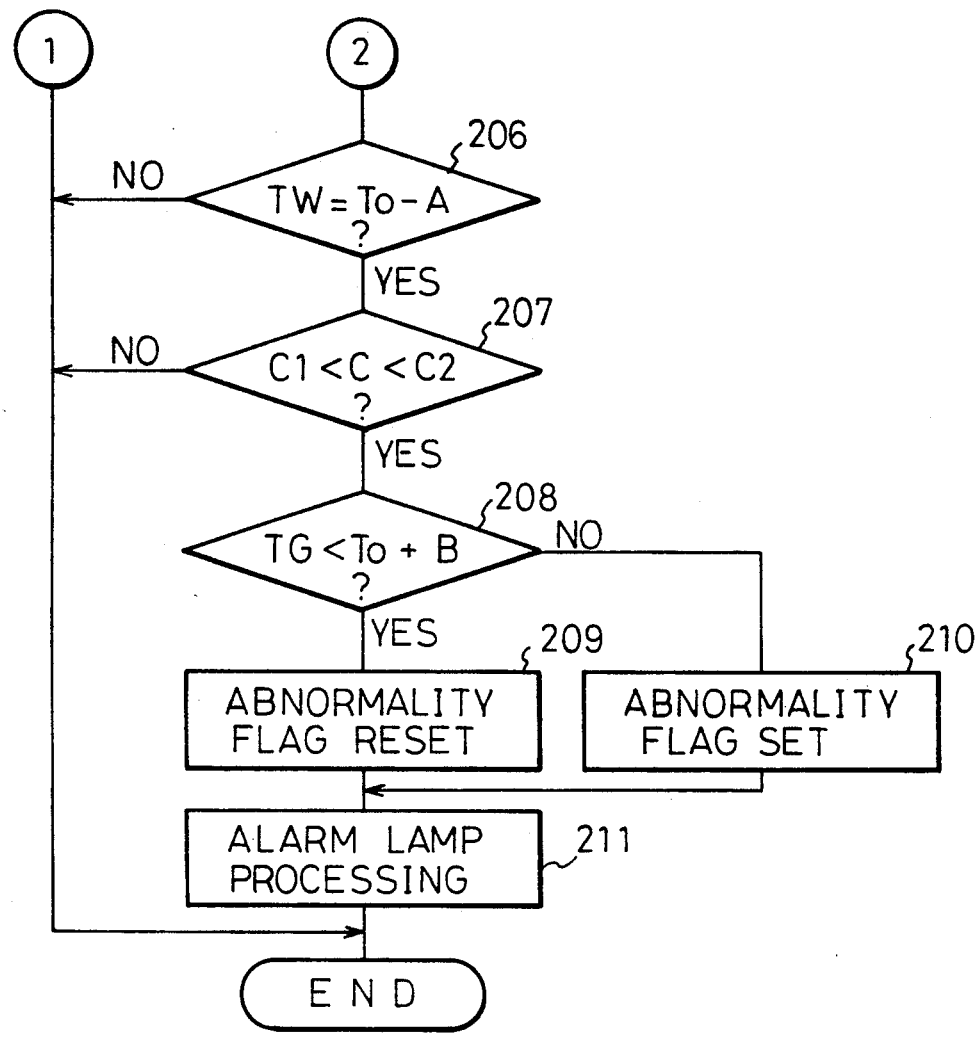
Figure 23:
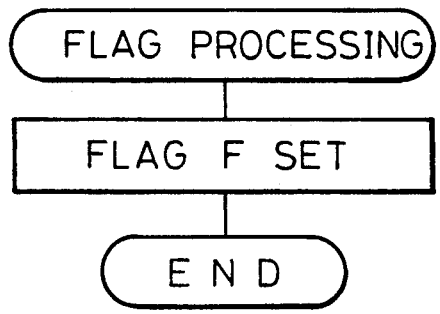
FIG. 23 is a flow chart for setting a flag.

FIGS. 22A, FIG. 22B, and FIG. 23 show an embodiment where the diagnosis of a malfunction is prohibited when the time until the temperature TW of the engine cooling water reaches the set temperature $T_0$ after the engine start-up is short or considerably long. In this embodiment, once the engine is started up, the incrementation of the count C is begun. Diagnosis of a malfunction is prohibited when the count C is less than C1 or more than C2 ($>$C1) when the temperature TW of the engine cooling water has reached the set temperature $T_0$.

FIG. 22A and FIG. 22B show a routine for diagnosing a malfunction of the exhaust gas recirculation control device 13. The routine is, for example, executed in the main routine.

Referring to FIG. 22A and FIG. 22B, first, at step 200, it is discriminated if the engine is being started up. Whether the engine is being started up is discriminated by, for example, whether the starter switch 49 has been turned on. When the engine is being started up, the routine proceeds to step 201, where the count C is cleared, then the routine proceeds to step 202. At step 202, it is discriminated if the temperature TW of the engine cooling water is lower than a temperature $(T_0-A)$ of the set temperature $T_0$ minus a certain value A of about 1° to 5°. When $TW > T_0-A$, the routine proceeds to step 212, where the count C is cleared and then the processing routine is ended. As opposed to this, when $TW \leq T_0-A$, the routine proceeds to step 203.

At step 203, it is discriminated if the flag F has been set. The flag F is set by the flag processing routine shown in FIG. 23. That is, the routine shown in FIG. 23 is executed by interruptions at certain time intervals, for example, every one second, therefore it is learned if the flag F has been set every one second from FIG. 23. At step 203, it is discriminated if the flag F has been set. When the flag F has been set, the routine proceeds to step 204, where the flag F is reset. Next, at step 205, the count C is incremented by exactly 1, then the routine proceeds to step 206. Therefore, if $TW \leq T_0 - A$ after the engine start-up, the count C is incremented every second.

At step 206, it is discriminated if $TW = T_0 - A$, that is, if it is just before the shut-off valve 35 opens. If TW is not equal to $(T_0 - A)$, the processing routine is ended, while if $TW = (T_0 - A)$, the routine proceeds to step 207, where it is discriminated if the count C is between C1 and C2. When $C \leq C1$ or $C \geq C2$, the processing routine is ended, while when $C1 < C < C2$, the routine proceeds to step 208. At step 208, it is discriminated if the temperature TG inside the exhaust gas recirculation passage 12 is lower than the temperature $(T_0 + B)$ of the set temperature $T_0$ plus a certain value B. Here, the certain value B is a small positive or negative value. When $TG \geq T_0 + B$, it is judged that the exhaust gas recirculation control device 13 is malfunctioning, so the routine proceeds to step 210, where the abnormality flag is set. Next, the routine proceeds to step 211. As opposed to this, when $TG < T_0 + B$, it is judged that the exhaust gas recirculation control device 13 is operating normally, so the routine proceeds to step 209, where the abnormality flag is reset. Next, the routine proceeds to step 211. At step 211, if the abnormality flag has been set, the alarm lamp 38 is lit.

As is clear from FIG. 3, however, if the engine is made to stop for more than a certain period, the temperature TG inside the exhaust gas recirculation passage 12 falls to substantially the atmospheric temperature TA, which is lower than the set temperature $T_0$, and the temperature TW of the engine cooling water falls to substantially the atmospheric temperature TA as well, despite the operating state of the engine before the engine was stopped. When the engine is next made to start, in the exhaust gas recirculation control device 13 is operating normally, the temperature inside the exhaust gas recirculation passage 12 rises from substantially the atmospheric temperature TA in accordance with the normal pattern, while if there is an abnormality in the exhaust gas recirculation control device 13, the temperature inside the exhaust gas recirculation passage 12 rises from substantially the atmospheric temperature TA in accordance with the abnormal pattern TG'. That is, if the engine is stopped for more than a certain period, the normal pattern TG and the abnormal pattern TG' are free from any influence of the operating state of the engine before the engine was stopped.

Figure 24A:
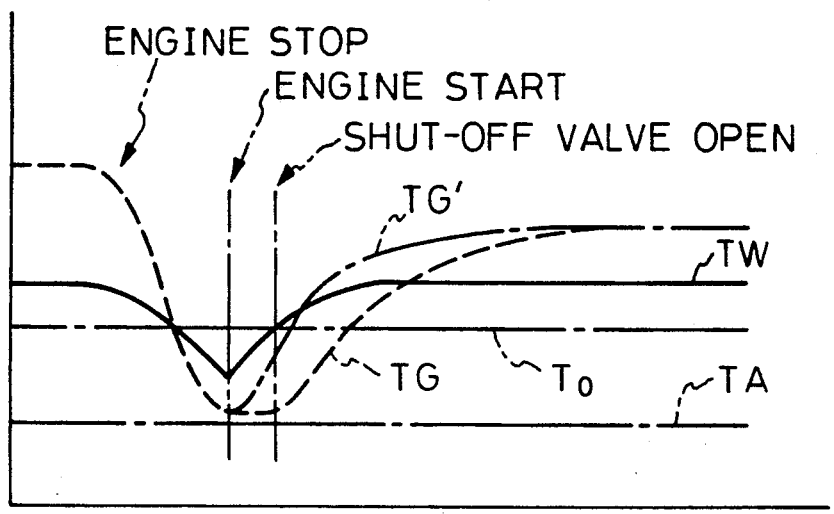
FIGS. 24A and 24B are time charts showing the changes in the temperature of the engine cooling water and the temperature in the exhaust gas recirculation passage.
Figure 24B:
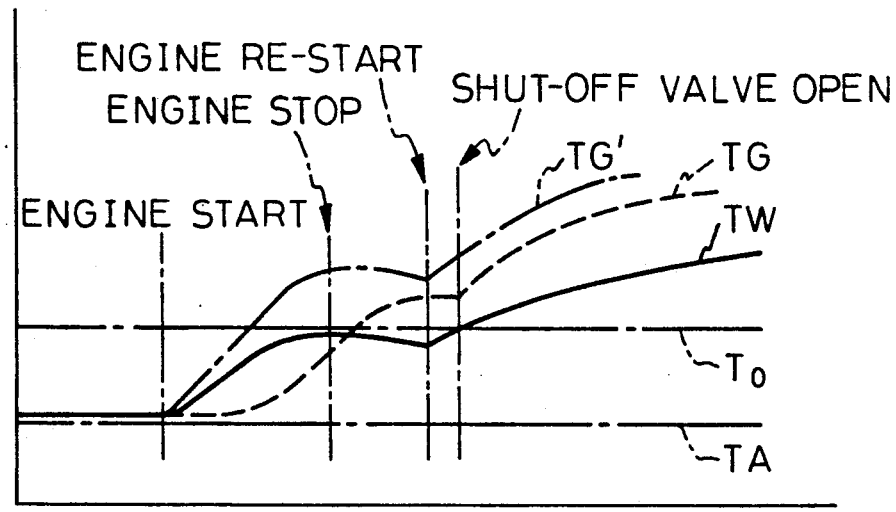

Under certain operating conditions, however, the normal pattern TG and the abnormal pattern TG' are affected by the operating state of the engine before the engine was stopped. If they are affected by the operating state of the engine before it was stopped, in this way, the normal pattern TG and the abnormal pattern TG' for the pattern of change of the temperature TW of the engine cooling water will deviate from the patterns shown in FIG. 3. For example, as shown in FIG. 24A, if the engine is started up again a short time after the engine is stopped, the relationship among the normal pattern TG and abnormal pattern TG' after the engine start-up and the pattern of change of the temperature TW of the engine cooling water will become different from the patterns shown in FIG. 3. Further, as shown in FIG. 24B, if the engage is stopped a short while after the engine is started and then the engine is once again started a short time after the engine was stopped, the relationship of the normal pattern TG and the abnormal pattern TG' after the restart of the engine and the pattern of change of the temperature TW of the engine cooling water becomes different from the patterns shown in FIG. 3. When the normal pattern TG and the abnormal pattern TG' deviate from the patterns shown in FIG. 3 under the influence of the operating state of the engine before the engine was stopped, there is a large chance of a mistaken judgement of a malfunction in the exhaust gas recirculation control device 13 from the pattern of the change of temperature inside the exhaust gas recirculation passage 12. Therefore, to accurately judge if a malfunction has occurred in the exhaust gas recirculation control device 13, it is necessary to judge the malfunction when the normal pattern TG and the abnormal pattern TG' are not affected by the operating state of the engine before the engine stopping.

As will be understood from a comparison of FIG. 3 and FIGS. 24A and 24B, if the effect of the operating state of the engine before engine stopping is felt, then the temperature difference between the temperature inside the exhaust gas recirculation passage 12 and the temperature TW of the engine cooling water becomes larger, while when the effect of the operating state of the engine before engine stopping is not felt, the temperature difference between the temperature inside the exhaust gas recirculation passage 12 and the temperature TW of the engine cooling water becomes small. Therefore, if the temperature difference between the temperature inside the exhaust gas recirculation passage 12 and the temperature TW of the engine cooling water is less than a set value, the normal pattern TG and the abnormal pattern TG' are not affected by the operating state of the engine before engine stopping. Note that, as understood from FIGS. 24A and 24B, even if the temperature difference between the temperature inside the exhaust gas recirculation passage 12 and the temperature TW of the engine cooling water is less than the set value, sometimes the effect of the operating state of the engine before engine stopping is felt, so to judge a malfunction completely free from the effect of the operating state of the engine before engine stopping, it is desirable to judge a malfunction when both the temperature inside the exhaust gas recirculation passage 12 and the temperature TW of the engine cooling water are substantially equal to the atmospheric temperature TA at the time of engine start-up. In the several embodiments of the present invention, diagnosis of malfunctions is made possible only when the temperature inside the exhaust gas recirculation passage 12 and the temperature TW of the engine cooling water are substantially equal to the atmospheric temperature TA at the time of engine start-up. Further, if more than a predetermined time elapses from the engine stopping, the temperature inside the exhaust gas recirculation passage 12 and the temperature TW of the engine cooling water at the time of engine start-up become substantially equal to the atmospheric temperature TA, so in another embodiment diagnosis of a malfunction is made possible only when the engine has been started after the elapse of more than a predetermined time from the engine stopping.

There are two main methods for judging if the actual pattern of change of temperature inside the exhaust gas recirculation passage 12 corresponds to a normal pattern TG or corresponds to an abnormal pattern TG' when the effect of the operating state of the engine before engine stopping is not felt. That is, as mentioned earlier, the first method is to judge which pattern it corresponds to from the temperature inside the exhaust gas recirculation passage 12. The second method judges which of the patterns is corresponded to from the amount of change of the temperature in the exhaust gas recirculation passage 12.

First, an explanation will be made of an embodiment of the first method, that is, the method where it is discriminated which pattern is corresponded to from the temperature inside the exhaust gas recirculation passage 12.

Figure 25:
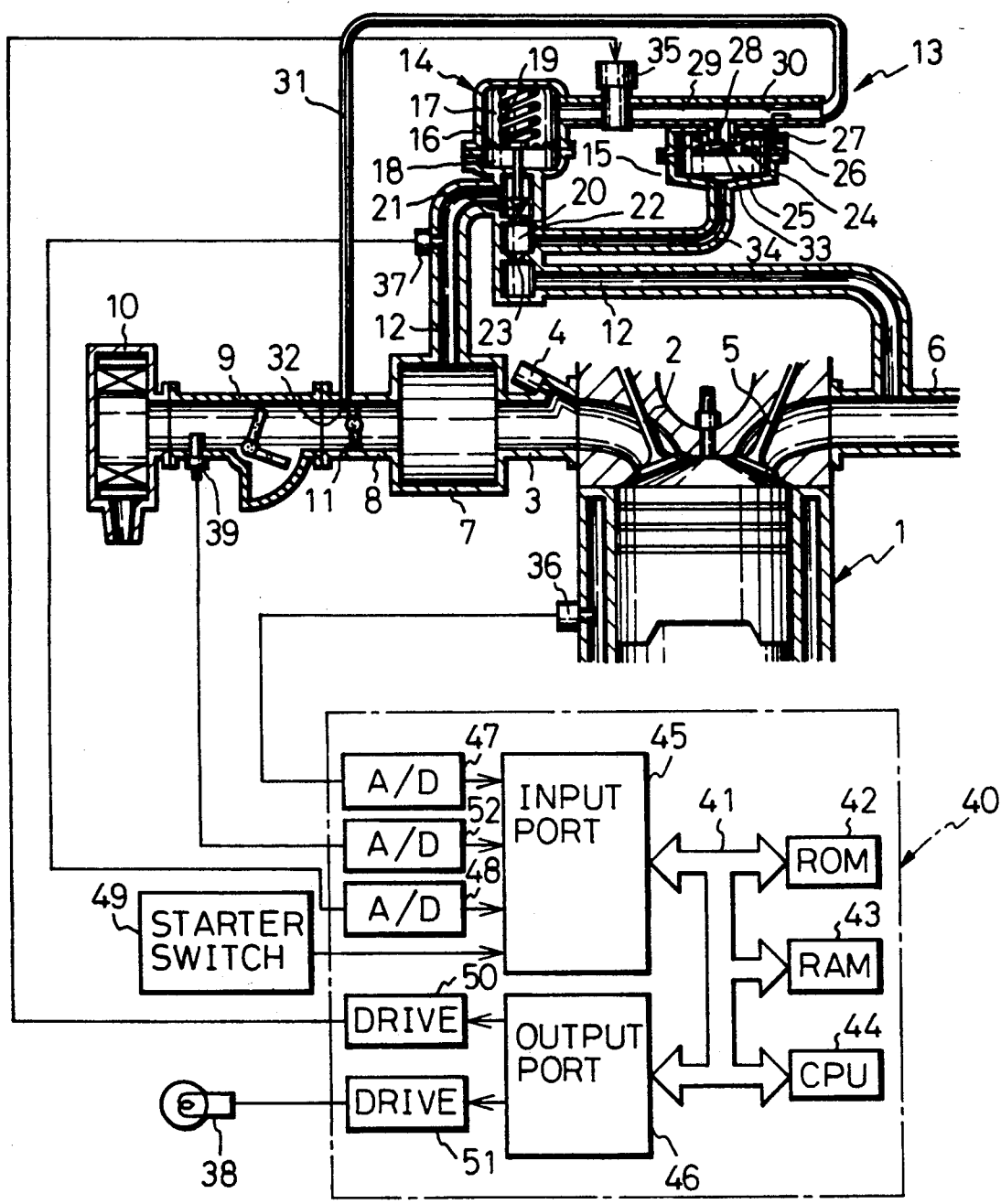
FIG. 25 is an overall view of an internal combustion engine.

FIG. 25 is an overall view of an internal combustion engine used along with the present embodiment. In the internal combustion engine, provision is made of an atmospheric temperature sensor 39 for generating an output voltage proportional to the atmospheric temperature inside the intake passage upstream of the air flow meter 9. The output voltage of the atmospheric temperature sensor 39 is input through an AD converter 52 to an input port 45.

Figure 26:
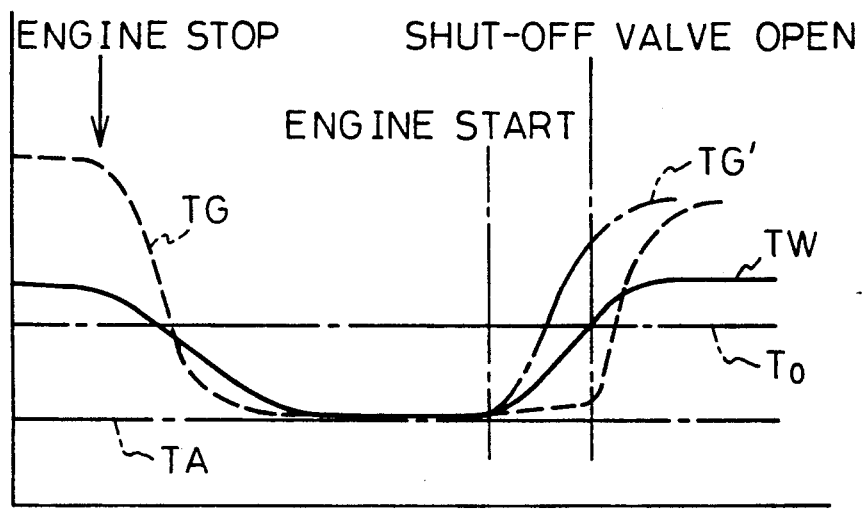
FIG. 26 is a time chart showing the changes in the temperature of the engine cooling water and the temperature in the exhaust gas recirculation passage.

As shown in FIG. 26, when, at engine start-up, the temperature TW of the engine cooling water and the temperature inside the exhaust gas recirculation passage 12 are both substantially the atmospheric temperature TA, which is lower than the set temperature $T_0$, if the exhaust gas recirculation control device 13 is operating normally, the temperature TW of the engine cooling water will definitely be higher than the temperature TG inside the exhaust gas recirculation passage 12 after the engine has been started and just before the temperature TW of the engine cooling water reaches the set temperature $T_0$. Therefore, in this embodiment, if the temperature inside the exhaust gas recirculation passage 12 is lower than the set temperature $T_0$ just before the temperature TW of the engine cooling water reaches the set temperature $T_0$, it is judged that the device is normal, while if it is higher than it, it is judged that the device is abnormal.

Figure 27A:
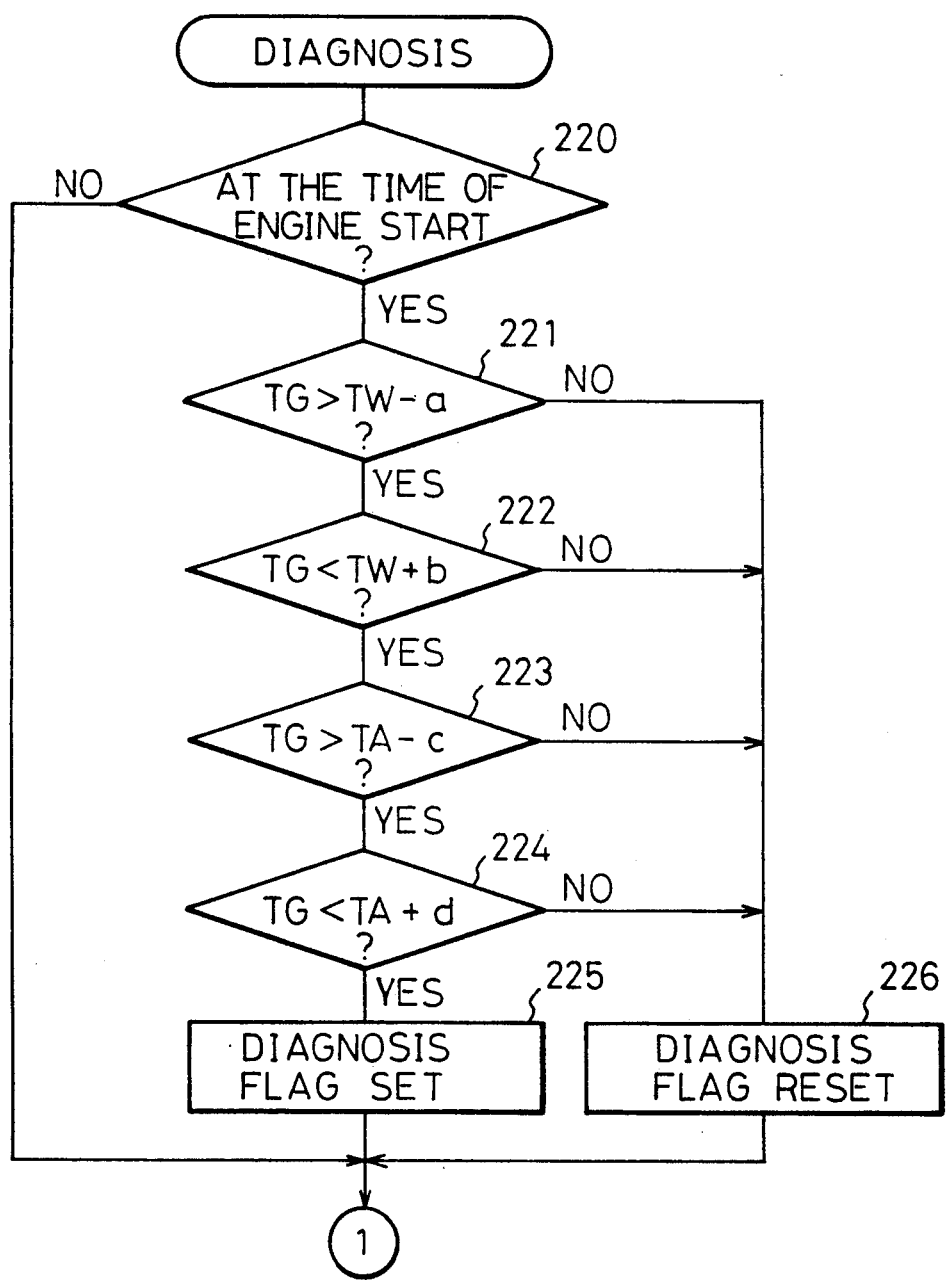
FIGS. 27A and 27B are flow charts for diagnosing malfunctions.
Figure 27B:
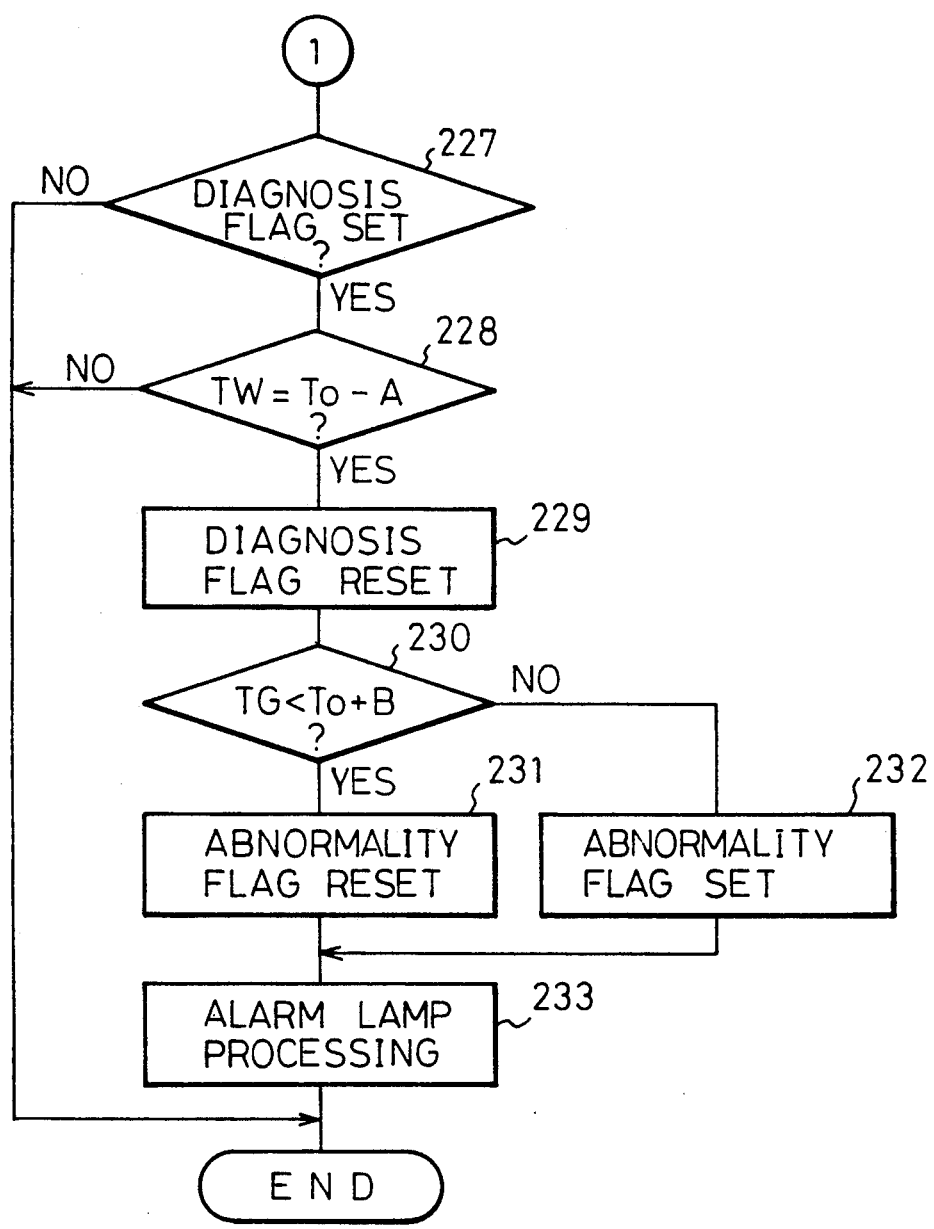

FIG. 27A and FIG. 27B show the routine for diagnosing a malfunction of the exhaust gas recirculation control device 13. This routine is executed in, for example, the main routine.

Referring to FIG. 27A and FIG. 27B, first, at step 220, it is discriminated if the engine is being started up, for example, if the starter switch 49 is turned on. When the engine is being started up, the routine proceeds to step 221, where it is discriminated if the temperature TG inside the exhaust gas recirculation passage 12 is higher than the temperature (TW−a) of the temperature TW of the engine cooling water minus a certain value a. When TG>TW−a, the routine proceeds to step 222, where it is discriminated if the temperature TG inside the exhaust gas recirculation passage 12 is lower than a temperature (TW+b) of the temperature TW of the engine cooling water plus a certain value b. That is, at step 221 and step 222, it is discriminated if the initial condition of the temperature difference between the temperature TG inside the exhaust gas recirculation passage 12 and the temperature TW of the engine cooling water being smaller than the set value a and b is satisfied. When the initial condition is satisfied, the routine proceeds to step 223.

At step 223, it is discriminated if the temperature TG inside the exhaust gas recirculation passage 12 is higher than the temperature (TA−c) of the atmospheric temperature TA minus a certain value c. When TG>TA−c, the routine proceeds to step 224, where it is discriminated if the temperature TG inside the exhaust gas recirculation passage 12 is lower than the temperature (TW+d) of the atmospheric temperature TA plus the certain value d. That is, at step 223 and step 224, it is discriminated if a second initial condition of the temperature difference between the temperature TG inside the exhaust gas recirculation passage 12 and the temperature TW of the engine cooling water being smaller than the set value c or d is satisfied. When the second initial condition is satisfied, the routine proceeds to step 225. That is, when both of the above initial conditions are satisfied, the routine proceeds to step 225, where the diagnosis flag is set, then the routine proceeds to step 227. As opposed to this, when both of the initial conditions are not satisfied, the routine proceeds to step 226, where the diagnosis flag is reset, then the routine proceeds to step 227.

At step 227, it is discriminated if the diagnosis flag has been set. When the diagnosis flag has been set, the routine proceeds to step 228, where it is discriminated if the temperature TW of the engine cooling water is the temperature ($T_0$−A) of the set temperature $T_0$ minus a certain value A of about 1° to 5°, that is, if it is just before the shut-off valve 35 opens. If TW is not equal to ($T_0$−A), the processing routine is ended, while if TW=($T_0$−A), the routine proceeds to step 229, where the diagnosis flag is reset, then the routine proceeds to step 230. At step 230, it is discriminated if the temperature TW inside the exhaust gas recirculation passage 12 is lower than the temperature ($T_0$+B) of the set temperature $T_0$ plus a certain value B. Here, the certain value B is a small positive or negative value. When TG≧$T_0$+B, it is judged that a malfunction has occurred in the exhaust gas recirculation control device 13, whereupon the routine proceeds to step 232, where the abnormality flag is set. Next, the routine proceeds to step 233. As opposed to this, when TG<$T_0$+B, it is judged that the exhaust gas recirculation control device 13 is operating normally, whereupon the routine proceeds to step 231, where the abnormality flag is reset. Next, the routine proceeds to step 233. At step 233, if the abnormality flag has been set, the alarm lamp 38 is lit.

Figure 28:
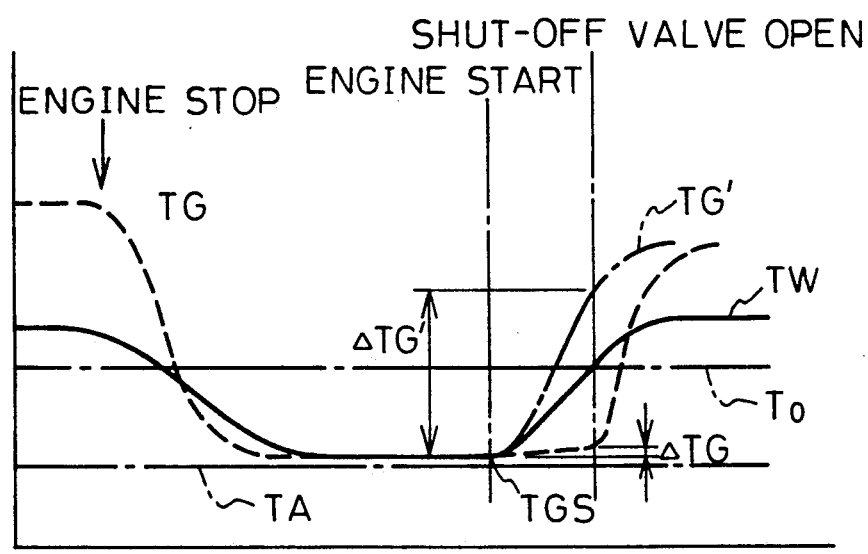
FIG. 28 is a time chart showing the changes in the temperature of the engine cooling water and the temperature in the exhaust gas recirculation passage.
Figure 29A:
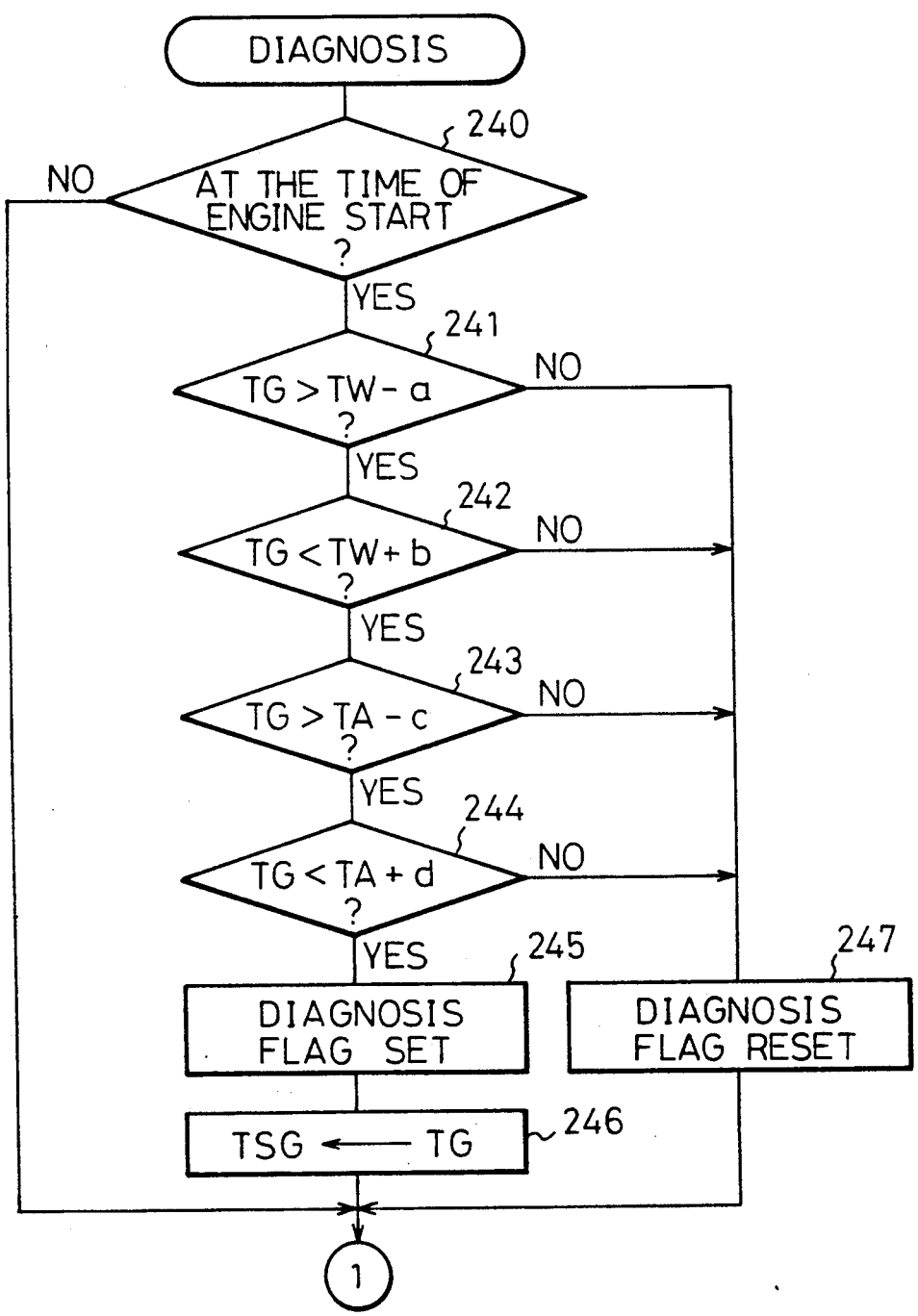
FIGS. 29A and 29B are flow charts for diagnosing malfunctions.
Figure 29B:
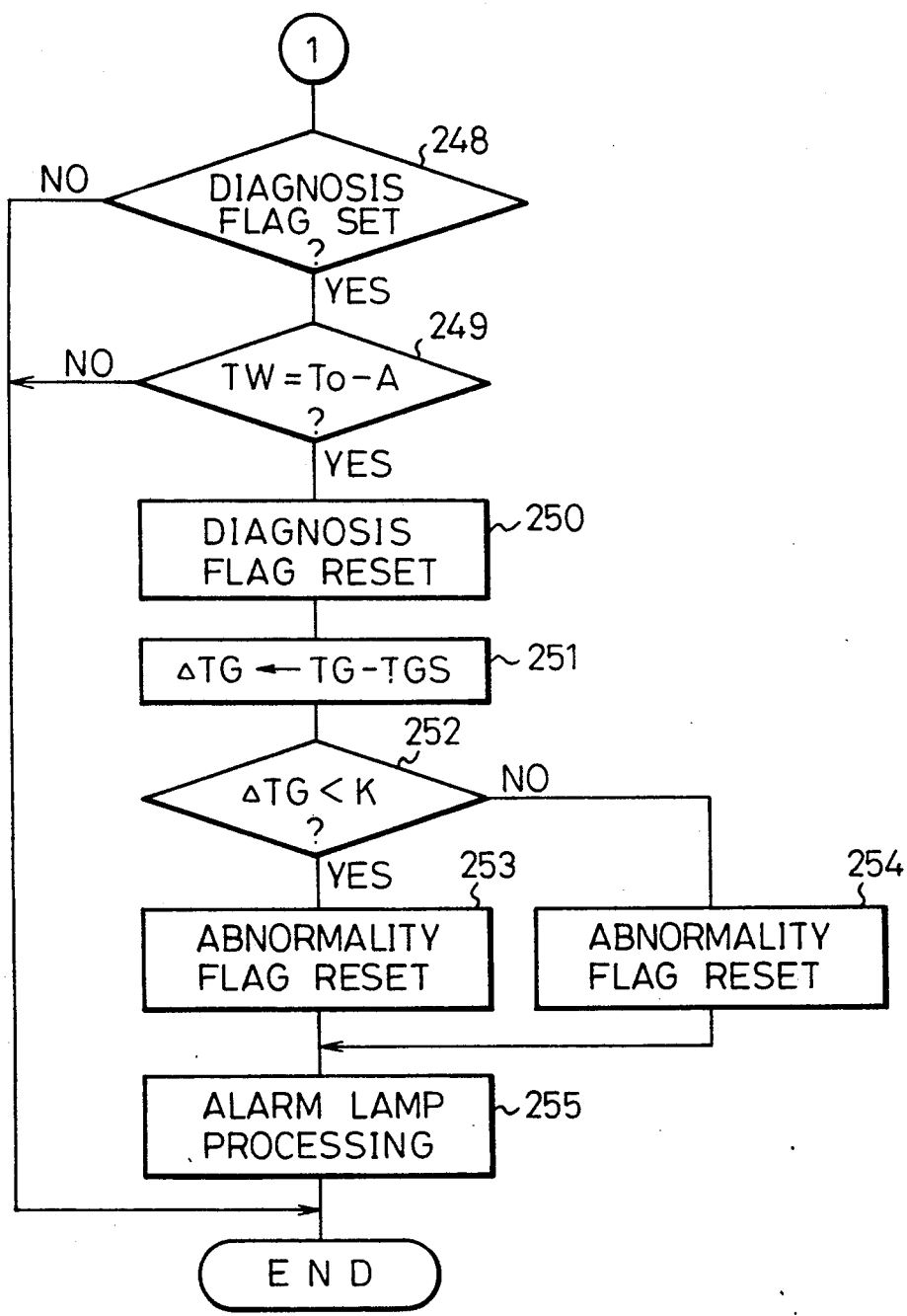

FIGS. 28, 29A, and 29B show an embodiment of the second method mentioned above, the method of judging which of the patterns is corresponded to from the amount of change of the temperature inside the exhaust gas recirculation passage 12.

As shown in FIG. 28, the amount of change ΔTG of the temperature inside the exhaust gas recirculation passage 12 when the temperature changes in accordance with the normal pattern TG in the period of engine operation from the start of the engine to when the temperature TW of the engine cooling water reaches the set temperature $T_0$ becomes considerably smaller than the amount of change ΔTG' of the temperature inside the exhaust gas recirculation passage 12 when it changes in accordance with the abnormal pattern TG'. Therefore, in this embodiment, if the amount of change of the temperature in the exhaust gas recirculation passage 12 during the period of the engine operation from the start of the engine to when the temperature TW of the engine cooling water reaches the set temperature $T_0$ is small, it is judged that the device is normal, while if it large, it is judged that it is abnormal.

FIG. 29A and FIG. 29B show the routine for diagnosing a malfunction of the exhaust gas recirculation control device 13. The routine is, for example, executed in the main routine.

Referring to FIG. 29A and FIG. 29B, first, at step 240, it is discriminated if the engine is being started up. Whether or not the engine is being started up is discriminated, for example, by whether the starter switch 49 is turned on or not. When the engine is being started up, the routine proceeds to step 241, where it is discriminated if the temperature TG inside the exhaust gas recirculation passage 12 is higher than the temperature (TW−a) of the temperature TW of the engine cooling water minus a certain value a. When TG>TW−a, the routine proceeds to step, 242, where it is discriminated if the temperature TG inside the exhaust gas recirculation passage 12 is lower than the temperature (TW+b) of the temperature TW of the engine cooling water minus a certain value b. That is, at step 241 and step 242, it is discriminated if the initial condition of the temperature difference between the temperature TG inside the exhaust gas recirculation passage 12 and the temperature TW of the engine cooling water being smaller than the set value a or b is satisfied. When this initial condition is satisfied, the routine proceeds to step 243.

At step 243, it is discriminated if the temperature TG inside the exhaust gas recirculation passage 12 is higher than the temperature (TA−c) of the atmospheric temperature TA minus a certain value c. When TG>TA−c, the routine proceeds to step 244, where it is discriminated if the temperature TG inside the exhaust gas recirculation passage 12 is lower than the temperature (TW+d) of the atmospheric temperature TA minus a certain value d. That is at step 243 and 244, it is discriminated if the second initial condition of the temperature difference between the temperature TG inside the exhaust gas recirculation passage 12 and the atmospheric temperature TA is smaller than the set value c or d. When the second initial condition is satisfied, the routine proceeds to step 245. That is, when either of the initial conditions is satisfied, the routine proceeds to step 245, where the diagnosis flag is set, then at step 246, the temperature inside the exhaust gas recirculation passage 12 is made the starting temperature TGS. Next, the routine proceeds to step 248. As opposed to this, when both of the initial conditions are not satisfied, the routine proceeds to step 247, where the diagnosis flag is reset, then the routine proceeds to step 248.

At step 248, it is discriminated if the diagnosis flag has been set. When the diagnosis flag has been set, the routine proceeds to step 249, where it is discriminated if the temperature TW of the engine cooling water is the temperature $(T_0-A)$ of the set temperature $T_0$ minus a certain value of about 1° to 5°, that is, if it is just before the shut-off valve 25 opens. If TW is not equal to $(T_0-A)$, the processing routine is ended, while if TW=$(T_0-A)$, the routine proceeds to step 250. At step 250, the diagnosis flag is reset, then at step 251, the temperature difference ΔTG between the current temperature TG inside the exhaust gas recirculation passage 12 and the starting temperature TGS is calculated. Next, at step 252, it is discriminated if the temperature difference ΔTG is lower than a predetermined set value K. When ΔTG≧K, it is judged that a malfunction has occurred in the exhaust gas recirculation control device 13, whereupon the routine proceeds to step 254, where the abnormality flag is set. Next, the routine proceeds to step 255. As opposed to this, when ΔTG<K, it is judged that the exhaust gas recirculation control device 13 is operating normally, whereupon the routine proceeds to step 253, where the abnormality flag is reset. Next, the routine proceeds to step 255. At step 255, if the abnormality flag is set, the alarm lamp 38 is lit.

FIGS. 30, 31, 32A, and 32B show another embodiment.

Figure 30:
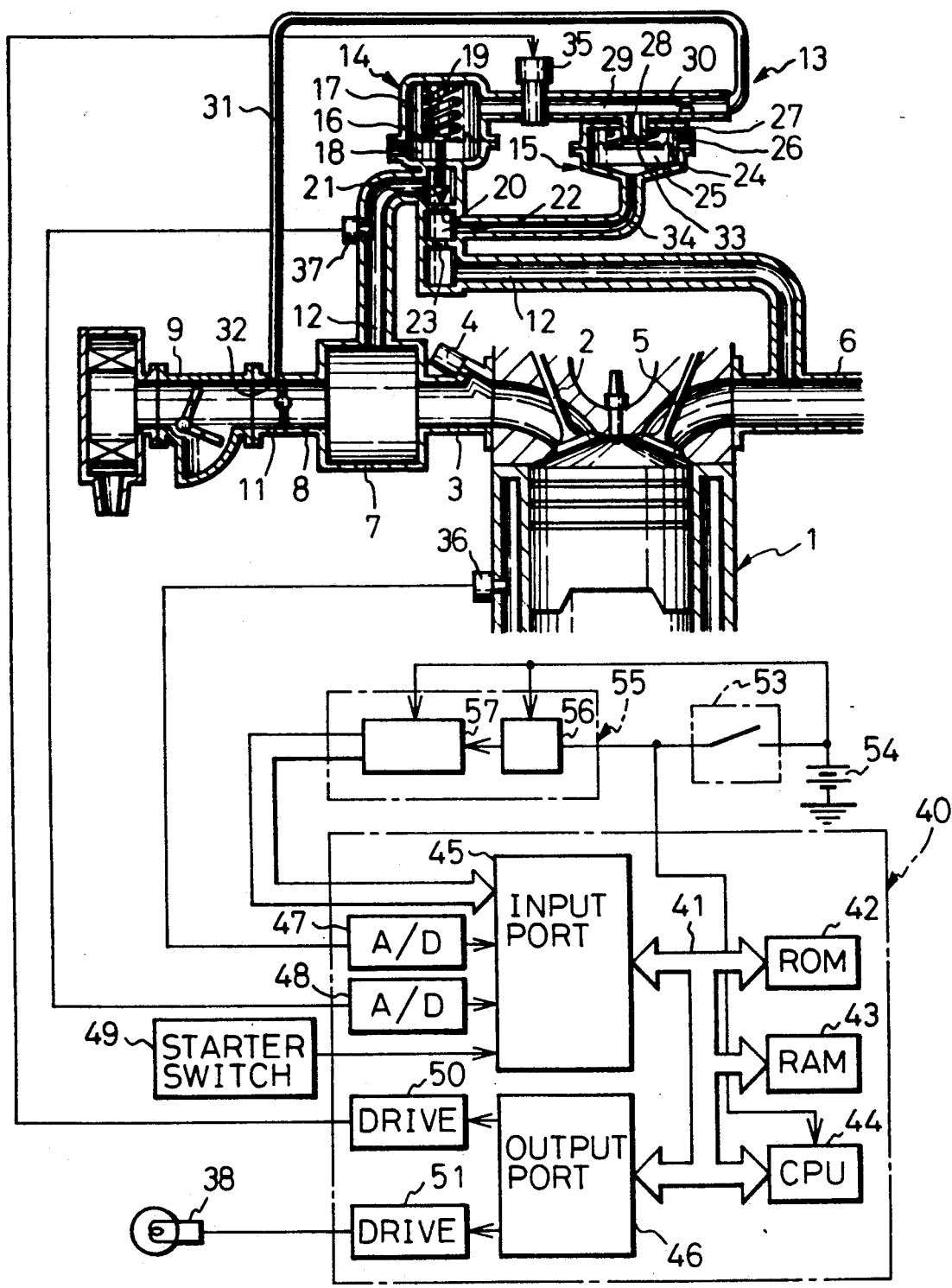
FIG. 30 is an overall view showing another embodiment of the internal combustion engine.

Referring to FIG. 30, the electronic control unit 40 is connected to a power source 54 through an ignition switch 53. When the ignition switch 53 is turned on, power is supplied to the electronic control unit 40. Further, a counter apparatus 55 is connected to the power source 54 through the ignition switch 53. The counter apparatus 55 is comprised of a monostable multivibrator 56 which reacts to the off operation of the ignition switch 53, for example, to generate an output pulse when the ignition switch 53 is turned off and a counter 57 which is reset when the monostable multivibrator 56 generates the output pulse and then starts the count operation once again. The count C of the counter 57 is input to the input port 45.

Figure 31:
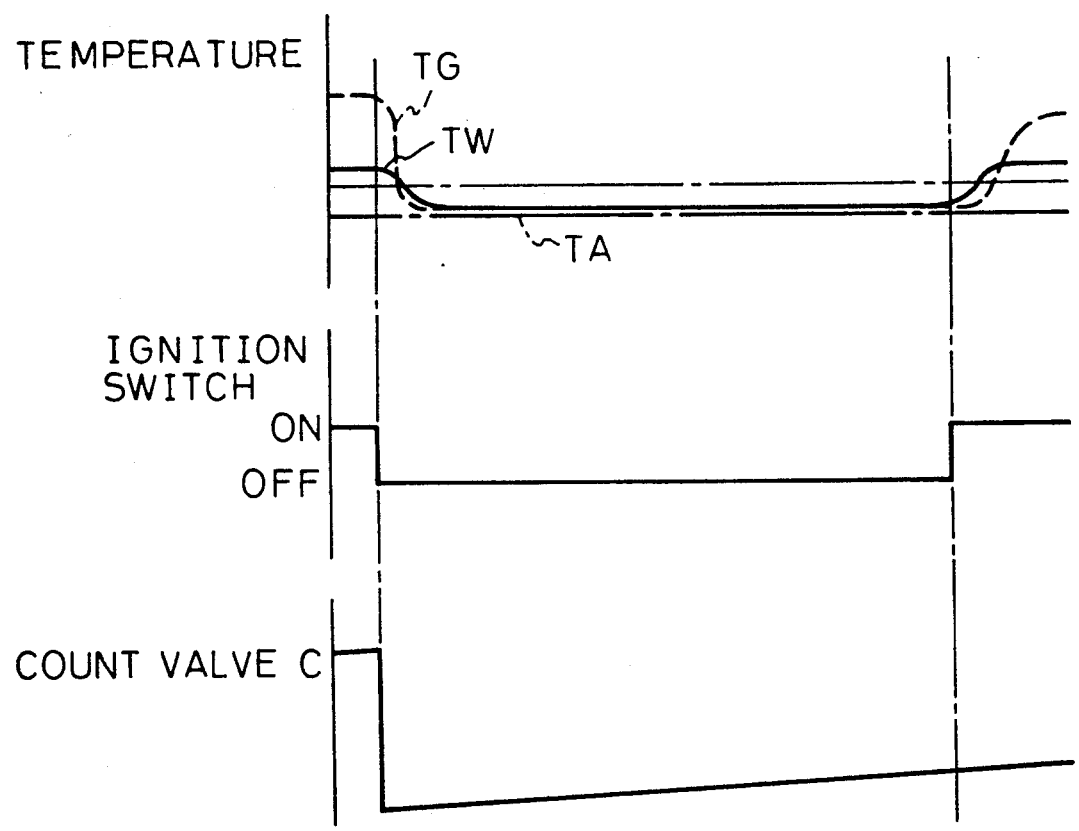
FIG. 31 is a time chart showing changes in the count.

That is, as shown in FIG. 31, when the ignition switch 53 is turned off, the count C is returned to zero, then the count operation is started. The count operation continues even if the ignition switch 53 is turned on. Therefore, it is possible to learn the period in which the engine is stopped from the count C at the time of engine start-up. In this embodiment, the count $C_0$ after the engine is stopped when the temperature TG inside the exhaust gas recirculation passage 12 and the temperature TW of the engine cooling water become substantially the atmospheric temperature TA is found in advance experimentally and a malfunction is diagnosed when the count C exceeds $C_0$ at the time of engine start-up.

Figure 32A:
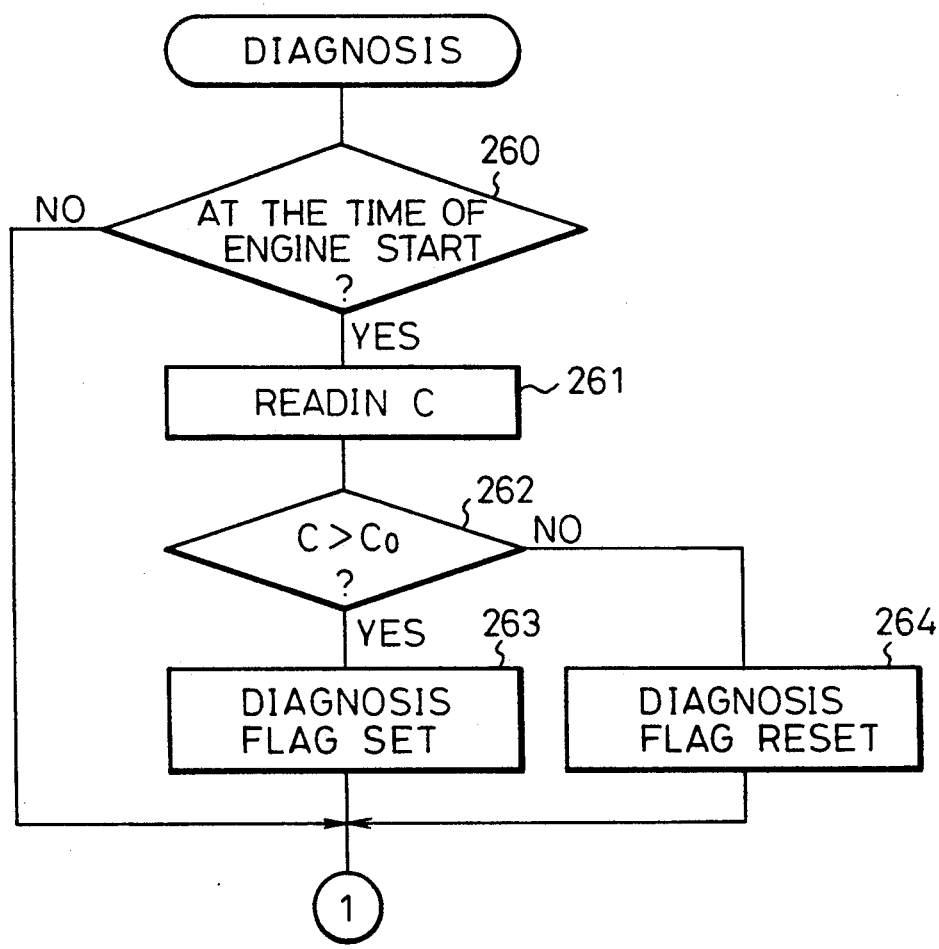
FIGS. 32A and 32B are flow charts for diagnosing malfunctions.
Figure 32B:
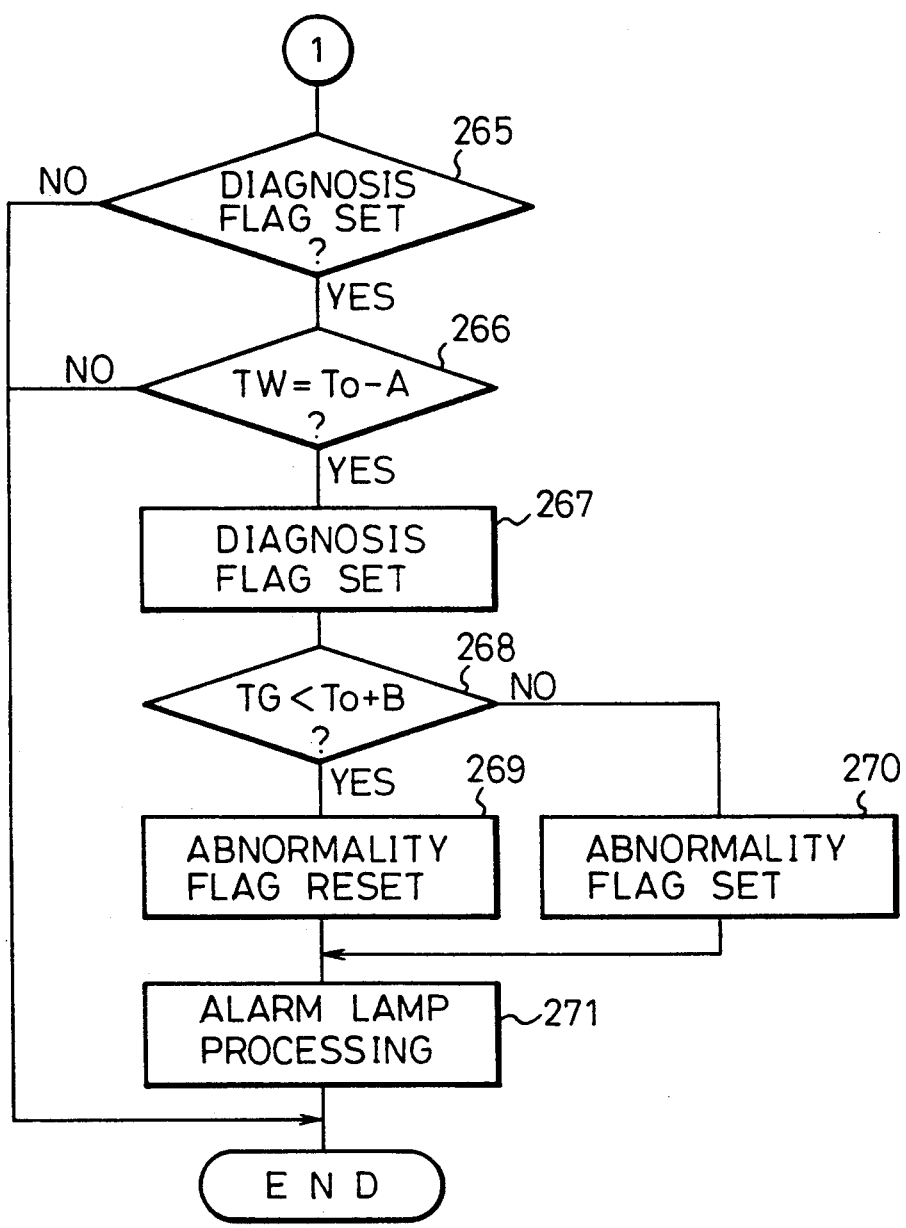

FIG. 32A and FIG. 32B show a routine for diagnosing a malfunction in the exhaust gas recirculation control device 13. This routine is executed, for example, in the main routine.

Referring to FIG. 32A and FIG. 32B, first, at step 260, it is discriminated if the engine is being started up. Whether the engine is being started up is discriminated by whether the starter switch 49 is turned on. When the engine is being started up, the routine proceeds to step 261, where the count C of the counter 57 is read. Next, at step 262, it is discriminated if the count C is larger than $C_0$. When C>$C_0$, the routine proceeds to step 263, where the diagnosis flag is set, then the routine proceeds to step 265. As opposed to this, when C≦$C_0$, the routine proceeds to step 264, where the diagnosis flag is reset, the routine proceeds to step 265.

At step 265, it is discriminated if the diagnosis flag is set. When the diagnosis flag is set, the routine proceeds to step 266, where it is discriminated if the temperature TW of the engine cooling water is the temperature $(T_0-A)$ of the set temperature $T_0$ minus the certain value A of about 1° to 5°, that is, if it is just before the shut-off valve 35 opens. When TW is not equal to $(T_0-A)$, the processing routine is ended, while when TW=$(T_0-A)$, the routine proceeds to step 267, where the diagnosis flag is reset, the routine proceeds to step 268. At step 268, it is discriminated if the temperature TG inside the exhaust gas recirculation passage 12 is lower than the temperature $(T_0+B)$ of the set temperature $T_0$ minus a certain value B. Here, the certain value B is a small positive or negative value. When TG>$T_0$+B, it is judged if a malfunction has occurred in the exhaust gas recirculation control device 13, whereupon the routine proceeds to step 270, where the abnormality flag is set. Next, the routine proceeds to step 271. As opposed to this, when $TG < T_0 + B$, it is judged if the exhaust gas recirculation control device 13 is operating normally, whereupon the routine proceeds to step 269, where the abnormality flag is reset. Next, the routine proceeds to step 271. At step 271, if the abnormality flag is set, the alarm lamp 38 is lit.

As explained up to now, it is possible to judge if the exhaust gas recirculation control device 13 is abnormal or not from the temperature inside the exhaust gas recirculation passage 12 just before the temperature TW of the engine cooling water reaches the set temperature $T_0$, but there are cases where the exhaust gas recirculation control device 13 becomes abnormal due to a malfunction of the exhaust gas recirculation control valve 14 as well and there are cases where it becomes abnormal due to a malfunction of the control system including the shut-off valve 35 and the temperature sensor 36. In such cases, it is desirable to be able to judge which of the exhaust gas recirculation control valve 14 and the control system including the shut-off valve 35 and the temperature sensor 36 has malfunctioned. Next, an explanation will be made of the method for judging which of these has malfunctioned.

Figure 33:
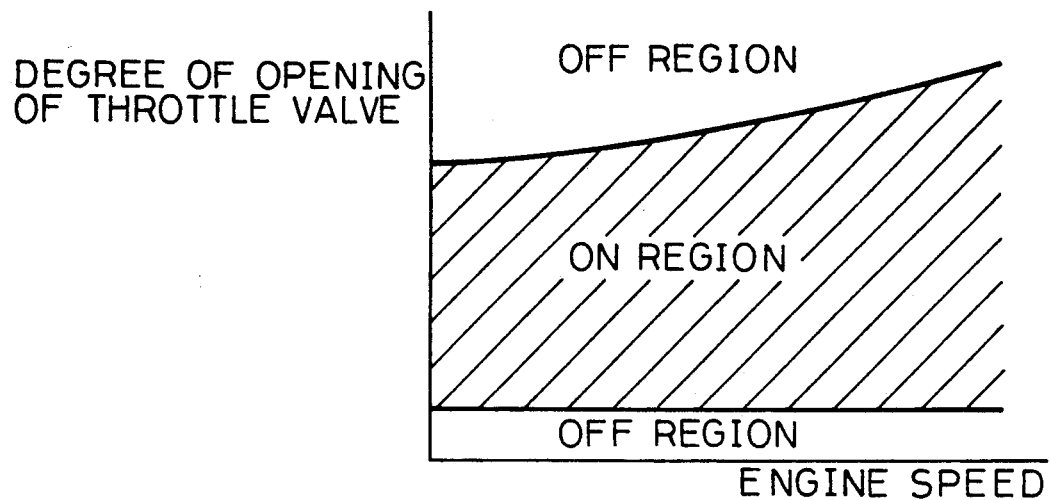
FIG. 33 is a graph showing the region where the exhaust gas recirculation gas should be supplied and the region where the supply of the exhaust gas recirculation gas should be stopped.

FIG. 33 shows the region of supply of the exhaust gas recirculation gas, predetermined in accordance with the operating states of the engine. Note that in FIG. 33, the on region shows the region of engine operation where the exhaust gas recirculation gas should be supplied, while the off region shows the region of engine operation where the supply of the exhaust gas recirculation gas should be stopped. As mentioned earlier, when the exhaust gas recirculation control device 13 is operating normally, if the throttle valve 11 is at the idling opening after the shut-off valve 35 opens, the supply of the exhaust gas recirculation gas is stopped. If the opening of the throttle valve becomes larger, the supply of the exhaust gas recirculation gas is stopped, so the exhaust gas recirculation gas is supplied in the on region shown in FIG. 33. On the other hand, when the exhaust gas recirculation control device 13 is operating normally, if the temperature TW of the engine cooling water is less than the set temperature $T_0$, the shut-off valve 35 opens, so the supply of the exhaust gas recirculation gas is stopped even in the on region shown in FIG. 33.

Next, an explanation will be given of the supply operation of the exhaust gas recirculation gas at normal and abnormal times referring to the following Tables A, B, and C.

TABLE A

| Exhaust gas recirculation | Normal Time | |
|---|---|---|
| | Low water temperature | High water temperature |
| Off region | x | x |
| On region | x | o |

TABLE B

| Abnormality in Opening of Exhaust Gas Recirculation Control Valve | | |
|---|---|---|
| Exhaust gas recirculation | Low water temperature | High water temperature |
| Off region | o | o |
| On region | o | o |

TABLE C

| Abnormality in Opening of Shut-Off Valve | | |
|---|---|---|
| Exhaust gas recirculation | Low water temperature | High water temperature |
| Off region | x | x |
| On region | o | o |

In Tables A, B, and C, as mentioned above, the off region shows the region of engine operation where the supply of the exhaust gas recirculation gas is stopped, while the on region shows the region of engine operation where the exhaust gas recirculation gas should be supplied. Further, in Tables A, B, and C, a low temperature indicates when the temperature TW of the engine cooling water is less than the set temperature $T_0$, while a high temperature indicates when the temperature TW of the engine cooling water is more than the set temperature $T_0$. Further, in Tables A, B, and C, the o marks indicate when the exhaust gas recirculation gas is supplied, and the x marks when the supply of exhaust gas recirculation gas is stopped.

Table A shows when the exhaust gas recirculation control device 13 is operating normally. When the exhaust gas recirculation control device 13 is operating normally, if the temperature TW of the engine cooling water is less than the set temperature $T_0$, the shut-off valve 35 is closed, so when the temperature TW of the engine cooling water is less than the set temperature $T_0$, the supply of exhaust gas recirculation gas is stopped whether in the off region or the on region. As opposed to this, when the temperature TW of the engine cooling water is more than the set temperature $T_0$, the shut-off valve 35 opens, so if in the on region, the exhaust gas recirculation gas is supplied, while if in the off region, the supply of exhaust gas recirculation gas is stopped.

Table B shows a state of an abnormality in the opening where the exhaust gas recirculation control valve 14 is held in the opened state. At this time, despite the temperature TW of the engine cooling water being less than or more than the set temperature $T_0$ and despite the region being the off region or on region, the exhaust gas recirculation gas is supplied at all times once the engine starts to be operated.

Table C shows the state of an abnormality in the opening where the shut-off valve 35 is held in the opened state. The shut-off valve 35 may be held in the opened state due to the shut-off valve 35 itself malfunctioning and the shut-off valve 35 being thus held in the opened state, the temperature sensor 36 malfunctioning and an output signal indicating that the temperature TW of the engine cooling water is higher than the set temperature $T_0$ being continuously output by the temperature sensor 36 and thus the shut-off valve 35 being held in the opened state, or the control system including the shut-off valve 35 and the temperature sensor 36 malfunctioning and other reasons occurring whereby the shut-off valve 35 is held in the opened state. In all cases, at abnormal times when the shut-off valve 35 is held open, regardless of whether the temperature TW of the engine cooling water is above or below the set temperature $T_0$, the exhaust gas recirculation gas is supplied if in the on region, while the supply of exhaust gas recirculation gas is stopped if in the off region.

As will be understood from Tables A, B, and C, exhaust gas recirculation gas is supplied when the temperature TW of the engine cooling water is higher than the set temperature $T_0$ and the region is the on region, whether at normal times, at times of an abnormality in opening of the exhaust gas recirculation control valve 14, or at times of an abnormality in opening of the shut-off valve 35. Therefore, it is not possible to judge if the exhaust gas recirculation control valve 14 suffers from an abnormality in opening or if the shut-off valve 35 suffers from an abnormality in opening in the on region when the temperature TW of the engine cooling water is higher than the set temperature $T_0$.

On the other hand, at normal times, as shown in Table A, in the off region, the supply of the exhaust gas recirculation gas is stopped regardless of the temperature TW of the engine cooling water, while at times of abnormality in opening of the shut-off valve 35, as shown in Table C, the supply of the exhaust gas recirculation gas is stopped in the off region regardless of the temperature TW of the engine cooling water. As opposed to this, at times of abnormality in opening of the exhaust gas recirculation control valve 14, as shown in Table B, the exhaust gas recirculation gas is supplied in the off region regardless of the temperature TW of the engine cooling water. Therefore, it is possible to judge that the exhaust gas recirculation control valve 14 suffers from an abnormality in opening if exhaust gas recirculation gas is supplied in the off region when the temperature TW of the engine cooling water is lower than the set temperature $T_0$ or in the off region when the temperature TW of the engine cooling water is higher than the set temperature $T_0$.

On the other hand, at normal times, as shown in Table A, the supply of exhaust gas recirculation gas is stopped in the on region when the temperature TW of the engine cooling water is lower than the set temperature $T_0$. As opposed to this, at times of abnormality in opening of the exhaust gas recirculation control valve 14, as shown in Table B, the exhaust gas recirculation gas is supplied in the on region when the temperature TW of the engine cooling water is lower than the set temperature $T_0$, while at times of abnormality in opening of the shut-off valve 35, as shown in Table C, the exhaust gas recirculation gas is supplied in the on region when the temperature TW of the engine cooling water is lower than the set temperature $T_0$. Therefore, it is possible to judge that one of the exhaust gas recirculation control valve 14 and the shut-off valve 35 suffers from an abnormality in opening if exhaust gas recirculation gas is supplied in the on region when the temperature TW of the engine cooling water is lower than the set temperature $T_0$.

On the other hand, as mentioned above, at times of abnormality in opening of the exhaust gas recirculation control valve 14, exhaust gas recirculation gas is supplied in the off region regardless of the temperature TW of the engine cooling water, while at times of abnormality in opening of the shut-off valve 35, the supply of exhaust gas recirculation gas is stopped in the off region regardless of the temperature TW of the engine cooling water. Therefore, when judging that one of the exhaust gas recirculation control valve 14 and the shut-off valve 35 suffers from an abnormality in opening, if exhaust gas recirculation gas is supplied in the off region when the temperature TW of the engine cooling water is lower than the set temperature $T_0$ or in the off region when the temperature TW of the engine cooling water is higher than the set temperature $T_0$, it is possible to judge that the exhaust gas recirculation control valve 14 suffers from an abnormality in opening, while if the supply of the exhaust gas recirculation gas is stopped, it is possible to judge that the shut-off valve 35 suffers from an abnormality in opening. In this way, it becomes possible to judge which of the exhaust gas recirculation control valve 14 and the shut-off valve 35 suffers from an abnormality in opening.

In the embodiment of the present invention, however, it is discriminated if the exhaust gas recirculation gas is supplied from the temperature inside the exhaust gas recirculation passage 12. If the temperature inside the exhaust gas recirculation passage 12 is low, it is discriminated that the supply of the exhaust gas recirculation gas has been stopped, while if the temperature inside the exhaust gas recirculation passage 12 is high, it is discriminated that the exhaust gas recirculation gas is being supplied. If, however, for example, it is the on region and the supply of exhaust gas recirculation gas has been started, then the temperature inside the exhaust gas recirculation passage 12 will gradually rise and then when it becomes the off region and the supply of the exhaust gas recirculation gas is stopped, the temperature inside the exhaust gas recirculation passage 12 gradually falls. Therefore, even at times of normal operation, when changing from the on region to the off region, the temperature inside the exhaust gas recirculation passage 12 is high, therefore there will be the mistaken judgement that the exhaust gas recirculation gas is being supplied despite the region being the off region at this time. Similarly, when the off region changes to the on region and the supply of the exhaust gas recirculation gas is started even during normal operation, the temperature inside the exhaust gas recirculation passage 12 remains low and therefore the mistaken judgement is made that the supply of exhaust gas recirculation gas is stopped despite the region being the on region at this time.

To avoid such mistaken judgements, in an embodiment of the present invention, use is made of the count C indicating the change in the temperature inside the exhaust gas recirculation passage 12. Next, an explanation will be made of the count C referring to FIG. 34.

Figure 34:
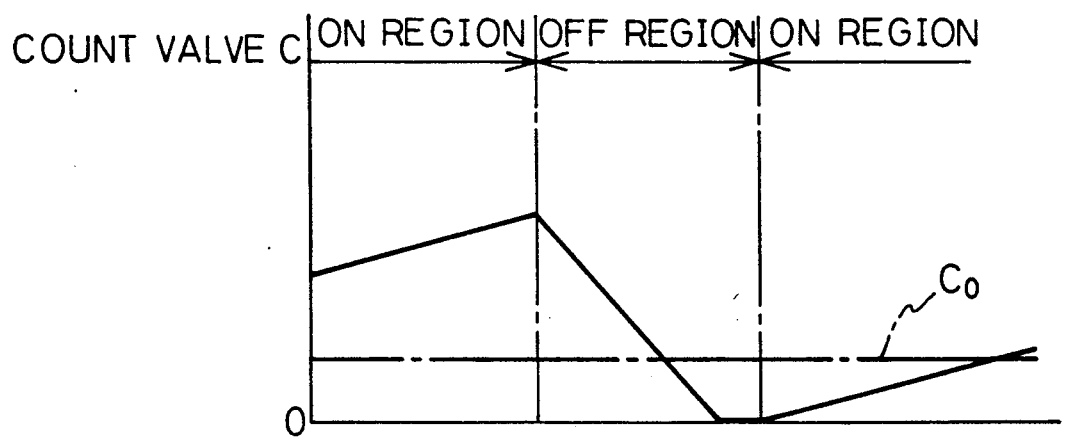
FIG. 34 is a time chart showing changes in the count.

The count C is incremented by 1, for example, at certain time intervals when in the on region and is decremented by 2, for example, at certain time intervals when in the off region. Therefore, the count C, as shown in FIG. 34, increase relatively slowly in the on region and decreases relatively rapidly in the off region. When actually in the on region and when the supply of exhaust gas recirculation gas is started, the temperature inside the exhaust gas recirculation passage 12 increases relatively slowly, while when in the off region and the supply of the exhaust gas recirculation gas is stopped, the temperature inside the exhaust gas recirculation passage 12 decreases relatively rapidly. Therefore, the count C shown in FIG. 34 indicates the change in temperature inside the exhaust gas recirculation passage 12.

As shown in FIG. 34, if the off region continues, the count C becomes less than $C_0$. At this time, if the temperature inside the exhaust gas recirculation passage 12 becomes lower than the temperature corresponding to $C_0$, then in the off region, the supply of the exhaust gas recirculation gas will be stopped, while if the temperature inside the exhaust gas recirculation passage 12 becomes higher than the temperature corresponding to $C_0$, the exhaust gas recirculation gas will be supplied. That is, when using the count C shown in FIG. 34, it becomes possible to judge if exhaust gas recirculation gas has been supplied in the off region or if the supply of exhaust gas recirculation gas has been stopped in the off region from the temperature inside the exhaust gas recirculation passage 12 when the count C becomes less than $C_0$. Note that it is also possible to detect that the exhaust gas recirculation gas is being supplied or the supply of the exhaust gas recirculation gas is being stopped when in the actual on region and off region shown in FIG. 33 without using the count C.

As mentioned above, when the count C becomes less than $C_0$ and the temperature inside the exhaust gas recirculation passage 12 becomes lower than the temperature corresponding to $C_0$, it means the supply of exhaust gas recirculation gas has been stopped in the off region and therefore that the exhaust gas recirculation control device 13 is operating normally. As opposed to this, when the count C becomes less than $C_0$ and the temperature inside the exhaust gas recirculation passage 12 becomes higher than the temperature corresponding to $C_0$, it means that exhaust gas recirculation gas has been supplied in the off region and therefore that an abnormality has occurred in the exhaust gas recirculation control device 13. Next, an explanation will be made of a method for judging if the exhaust gas recirculation control valve 14 or the shut-off valve 35 suffer from an abnormality in opening based on the count C.

The count C shown in FIG. 34 changes in the same way not only when the temperature TW of the engine cooling water is above the set temperature $T_0$, of course, but also when the temperature TW of the engine cooling water is below the set temperature $T_0$. That is, when the temperature TW of the engine cooling water is below the set temperature $T_0$, the count C changes as shown in FIG. 34 regardless as to if the shut-off valve 35 opens or the shut-off valve 35 suffers from an abnormality in opening. At this time, when the shut-off valve 35 suffers from an abnormality in opening, the temperature inside the exhaust gas recirculation passage 12 changes as shown in FIG. 34, so at this time the count C indicates the temperature inside the exhaust gas recirculation passage 12. On the other hand, at this time, if the shut-off valve 35 is closed, since the exhaust gas recirculation gas is not supplied, the temperature inside the exhaust gas recirculation passage 12 is held low and therefore at this time the count C does not indicate the temperature inside the exhaust gas recirculation passage 12.

Next, first, an explanation will be made of the case where the temperature inside the exhaust gas recirculation passage 12 becomes lower than the set temperature $T_0$ when the temperature TW of the engine cooling water reaches the set temperature $T_0$. For example, if the count C corresponding to the set temperature $T_0$ is made $C_0$, then there are cases where the count C becomes larger than $C_0$ when the temperature TW of the engine cooling water reaches the set temperature $T_0$ and cases where the count C becomes smaller than $C_0$.

When the exhaust gas recirculation control valve 14 suffers from an abnormality in opening, as shown by TG' in FIG. 3, the temperature inside the exhaust gas recirculation passage 12 becomes higher than the set temperature $T_0$ when the temperature TW of the engine cooling water reaches the set temperature $T_0$. Therefore, if the temperature inside the exhaust gas recirculation passage 12 is lower than the set temperature $T_0$ when the temperature TW of the engine cooling water reaches the set temperature $T_0$, it means that the exhaust gas recirculation control valve 14 does not suffer from an abnormality in opening.

On the other hand, when the shut-off valve 35 suffers from an abnormality in opening, the temperature inside the 12 changes in accordance with the changes in the count C. Therefore, when the shut-off valve 35 suffers from an abnormality in opening, if the count C when the temperature TW of the engine cooling water reaches the set temperature $T_0$ is larger than $C_0$, the temperature inside the exhaust gas recirculation passage 12 becomes higher than the set temperature $T_0$. Therefore, at this time, if the temperature inside the exhaust gas recirculation passage 12 is lower than the set temperature $T_0$, it means that the shut-off valve 35 does not suffer from an abnormality in opening.

On the other hand, even when the shut-off valve 35 suffers from an abnormality in opening, if the count C when the temperature TW of the engine cooling water reaches the set temperature $T_0$ is smaller than $C_0$, the temperature inside the exhaust gas recirculation passage 12 becomes lower than the set temperature $T_0$. However, as shown by TG in FIG. 3, when the exhaust gas recirculation control valve 14 and the shut-off valve 35 are operating normally, the temperature inside the exhaust gas recirculation passage 12 when the temperature TW of the engine cooling water reaches the set temperature $T_0$ becomes lower than the set temperature $T_0$. Therefore, when the temperature TW of the engine cooling water reaches the set temperature $T_0$, the count C is less than $C_0$. At this time, if the temperature inside the exhaust gas recirculation passage 12 is lower than the set temperature $T_0$, even assuming that the shut-off valve 35 suffers from an abnormality in opening, it cannot be judged that the shut-off valve 35 suffers from an abnormality in opening.

Next, an explanation will be given of the case where the temperature inside the exhaust gas recirculation passage 12 becomes higher than the set temperature $T_0$ when the temperature TW of the engine cooling water reaches the set temperature $T_0$. In this case too, there are cases where the count C becomes larger than $C_0$ when the temperature TW of the engine cooling water reaches the set temperature $T_0$ and cases where the count C becomes smaller than $C_0$.

As mentioned above, even in the case where the shut-off valve 35 suffers from an abnormality in opening, if the count C is less than $C_0$ when the temperature TW of the engine cooling water reaches the set temperature $T_0$, the temperature inside the exhaust gas recirculation passage 12 becomes lower than the set temperature $T_0$. That is, at this time, it is inconceivable that the temperature inside the exhaust gas recirculation passage 12 will become higher than the set temperature $T_0$. As opposed to this, if the exhaust gas recirculation control valve 14 suffers from an abnormality in opening, as shown by TG' in FIG. 3, the temperature inside the exhaust gas recirculation passage 12 when the temperature TW of the engine cooling water reaches the set temperature $T_0$ becomes higher than the set temperature $T_0$. Therefore, the temperature inside the exhaust gas recirculation passage 12 when the temperature TW of the engine cooling water reaches the set temperature $T_0$ becomes higher than the set temperature $T_0$. At this time, if the count C is less than $C_0$, it means that the exhaust gas recirculation control valve 14 suffers from an abnormality in opening.

On the other hand, as mentioned above, when the shut-off valve 35 suffers from an abnormality in opening, if the count C when the temperature TW of the engine cooling water reaches the set temperature $T_0$ is larger than $C_0$, the temperature inside the exhaust gas recirculation passage 12 becomes higher than the set temperature $T_0$. However, even when the exhaust gas recirculation control valve 14 suffers from an abnormality in opening, the temperature inside the exhaust gas recirculation passage 12 when the temperature TW of the engine cooling water reaches the set temperature $T_0$ becomes higher than the set temperature $T_0$. Therefore, the temperature inside the exhaust gas recirculation passage 12 when the temperature TW of the engine cooling water reaches the set temperature $T_0$ becomes higher than the set temperature $T_0$ and if the count C is higher than $C_0$ at this time, it means that one of the exhaust gas recirculation control valve 14 and shut-off valve 35 suffers from an abnormality in opening.

In this case, there are several ways to judge which of the exhaust gas recirculation control valve 14 and the shut-off valve 35 suffers from an abnormality in opening. Two representative methods among these will be explained below.

The first method is to judge if the exhaust gas recirculation control valve 14 suffers from an abnormality in opening after the temperature TW of the engine cooling water becomes larger than the set temperature $T_0$. In this case, when it is judged that the exhaust gas recirculation control valve 14 does not suffer from an abnormality in opening, it means that the shut-off valve 35 suffers from an abnormality in opening.

That is, when both the exhaust gas recirculation control valve 14 and the shut-off valve 35 are operating normally, when the temperature TW of the engine cooling water becomes higher than the set temperature $T_0$ and the count C becomes lower than $C_0$, the temperature inside the exhaust gas recirculation passage 12 falls to below the set value $TG_0$. However, when the exhaust gas recirculation control valve 14 suffers from an abnormality in opening, the temperature inside the exhaust gas recirculation passage 12 at this time becomes higher than the set value $TG_0$. Therefore, when the temperature TW of the engine cooling water becomes higher than the set temperature $T_0$ and the count C becomes lower than $C_0$, if the temperature inside the exhaust gas recirculation passage 12 becomes more than the set value $TG_0$, it is judged that the exhaust gas recirculation control valve 14 suffers from an abnormality in opening, while if the temperature inside the exhaust gas recirculation passage 12 becomes lower than the set value $TG_0$, it is judged that the shut-off valve 35 suffers from an abnormality in opening. Note that the set value $TG_0$ is determined in advance by experiments.

The second method judges if the exhaust gas recirculation control valve 14 is operating normally when the engine is once stopped then the engine is operated subsequently and the temperature TW of the engine cooling water is lower than the set temperature $T_0$. In this case, when it is judged that the exhaust gas recirculation control valve 14 is operating normally, it means that the shut-off valve 35 suffers from an abnormality in opening.

That is, as mentioned earlier, when the exhaust gas recirculation control valve 14 is operating normally, the temperature inside the 12 when the temperature TW of the engine cooling water reaches the set temperature $T_0$ becomes less than the set temperature $T_0$. Therefore, when the temperature inside the exhaust gas recirculation passage 12 when the temperature TW of the engine cooling water reaches the set temperature $T_0$ is lower than the set temperature $T_0$, it means that the exhaust gas recirculation control valve 14 is operating normally, and therefore, it means that the shut-off valve 35 suffers from an abnormality in opening.

Figure 35:
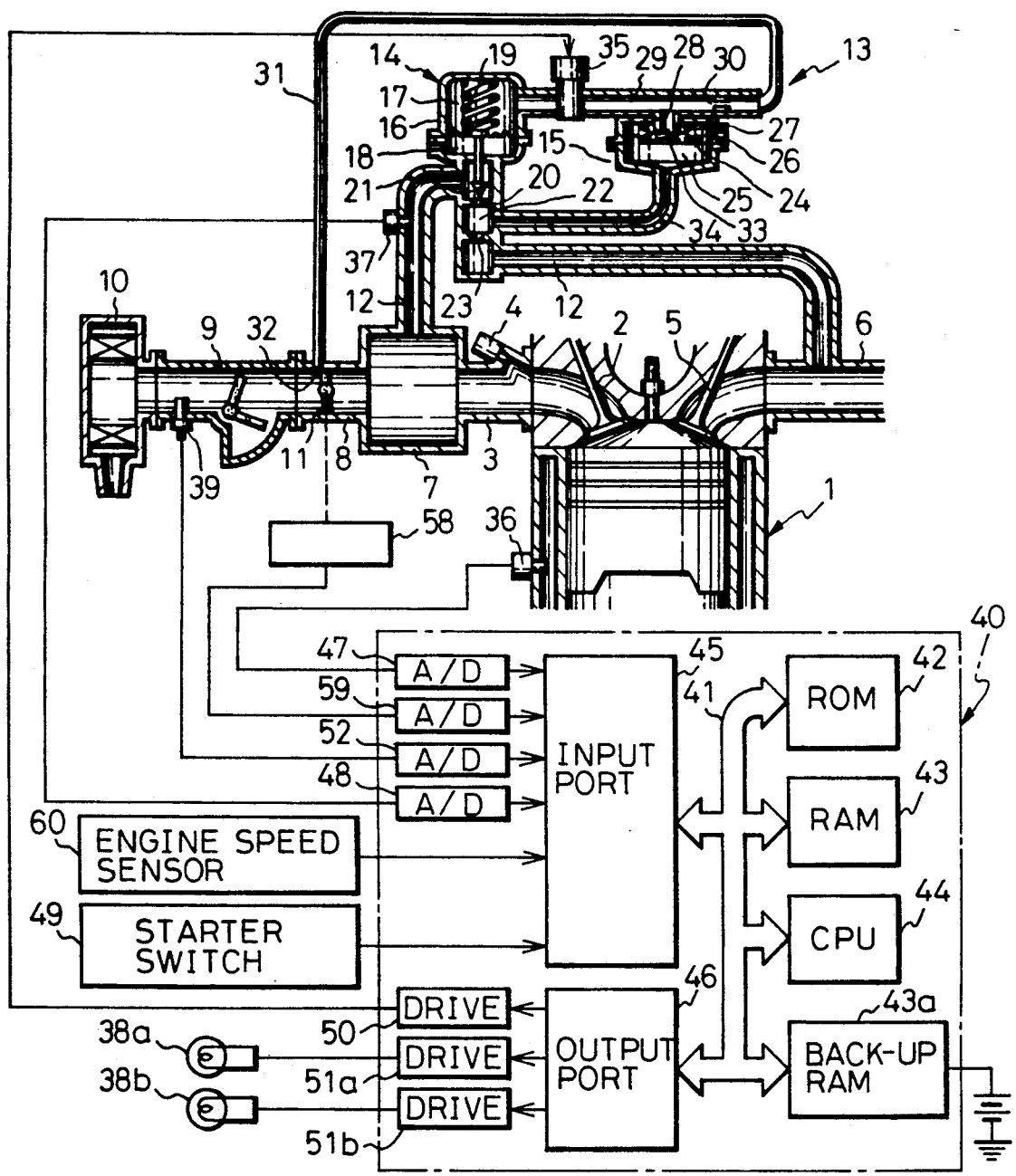
FIG. 35 is an overall view of an internal combustion engine.

FIG. 35 shows an internal combustion engine used for judging which of the exhaust gas recirculation control valve 14 or the shut-off valve 35 is malfunctioning. In this internal combustion engine, provision is made at the throttle valve 11 of a throttle sensor 58 which generates an output voltage proportional to the degree of throttle opening. The output voltage of the throttle sensor 58 is input through an AD converter 59 to the input port 45. Further, the input port 45 has connected to it a rotational speed sensor 60 which generates an output pulse indicating the engine rotational speed. The output port 46, on one hand, has connected to it through a drive circuit 51a a no. 1 alarm lamp 38a which indicates that the exhaust gas recirculation control valve 14 has malfunctioned and, on the other hand, has connected to it through a drive circuit 51b a no. 2 alarm lamp 38b which indicates that the control system including the shut-off valve 35 and a water temperature sensor 36 has malfunctioned. The electronic control unit 40 is provided with a backup RAM 43a connected to a constant power source.

Next, an explanation will be made of the method of diagnosis of a malfunction of the exhaust gas recirculation control valve 14 and the shut-off valve 35 by the first method mentioned above referring to FIG. 36A to FIG. 36D.

Referring to FIG. 36A to FIG. 36D, first, at step 300, it is discriminated if the temperature TW of the engine cooling water is higher than the temperature $(T_0-A)$ of the set temperature $T_0$ minus a certain value A of from 1° to 5°. When $TW \leq T_0 - A$, the routine proceeds to step 301, where it is discriminated if the flag F is set. The flag F is set by the flag processing routine shown in FIG. 37. That is, the flag processing routine shown in FIG. 37 is executed by interruption at certain time intervals, for example, every 1 second, therefore, the flag F is set every certain time interval, i.e., every 1 second, it will be understood. At step 301, when it is discriminated that the flag F has been reset, the routine jumps to step 310, while when it is discriminated that the flag F has been set, the routine proceeds to step 302.

At step 302, the flag F is reset, then the routine proceeds to step 303. At step 303, it is discriminated if the region is the on region shown in FIG. 33 from the throttle opening and the engine rotational speed. When the on region, the routine proceeds to step 304, while when not the on region, the routine proceeds to step 305. At step 304, the count C is incremented by exactly 1, then the routine proceeds to step 306. At step 305, the count C is decremented by exactly 2, then the routine proceeds to step 306. Therefore, the count C changes as shown in FIG. 34. At step 306, it is discriminated if the count C is negative or not. When $C<0$, the routine proceeds to step 307, where C is made zero, then the routine proceeds to step 310. When $C \geq 0$, the routine proceeds to step 308, where it is discriminated if the count C is larger than a predetermined maximum value MAX. When $C > MAX$, the routine proceeds to step 309, where C is made MAX, then the routine proceeds to step 310. When $C \leq MAC$, the routine jumps to step 310.

At step 310, it is discriminated if the temperature TW of the engine cooling water has reached $(T_0-A)$. When TW is not equal to $(T_0-A)$, the routine proceeds to step 315, while when $TW=(T_0-A)$, the routine proceeds to step 311. That is, if the temperature TW of the engine cooling water reaches $(T_0-A)$ after engine start-up, the routine proceeds to step 311. At step 311, it is discriminated if the temperature TG inside the exhaust gas recirculation passage 12 is higher than the temperature $(TW+B)$ of the temperature TW of the engine cooling water plus a certain value B. Here, the certain value B is a small positive or negative value. When $TG>TW+B$, the routine proceeds to step 312, where it is discriminated if the count C is lower than a predetermined set value C1. The set value C1 is the count where the temperature inside the exhaust gas recirculation passage 12 becomes substantially the set temperature $T_0$. When $C<C1$, the routine proceeds to step 313, where the no. 1 abnormality flag is set. That is, when $TW=(T_0-A)$, $TG>TW+B$ and if $C<C1$ at this time, it means that exhaust gas recirculation gas is being supplied in the off region, so it means that the exhaust gas recirculation control valve 14 suffers from an abnormality in opening. Therefore, at this time, the no. 1 abnormality flag indicating that the exhaust gas recirculation control valve 14 suffers from an abnormality in opening is set. Next, the routine proceeds to step 315.

On the other hand, when it is discriminated at step 312 that $C \geq C1$, the routine proceeds to step 314, where the rediagnosis flag is set. That is, when $TW=(T_0-A)$, $TG>TW+B$ and at this time if $C>C1$, one of the exhaust gas recirculation control valve 14 or the shut-off valve 35 suffers from an abnormality in opening, so at this time the rediagnosis flag indicating that which of the exhaust gas recirculation control valve 14 or the shut-off valve 35 suffers from an abnormality in opening should be rediagnosed is set. Next, the routine proceeds to step 315.

On the other hand, when $TW=(T_0-A)$ and $TG \leq TW+B$, the routine proceeds from step 311 to step 316, where it is discriminated if the count C is smaller than the predetermined set value C2. The set value C2 is the count C when the temperature inside the exhaust gas recirculation passage 12 becomes substantially the set temperature $T_0$. When $C<C2$, the routine proceeds to step 315. As opposed to this, when $C \geq C2$, the routine proceeds to step 317, where the no. 1 and the no. 2 abnormality flags are reset, then the routine proceeds to step 315. At step 315, if the no. 1 or the no. 2 abnormality flag is set, the corresponding alarm lamp no. 1 or no. 2 is lit.

Figure 36A:
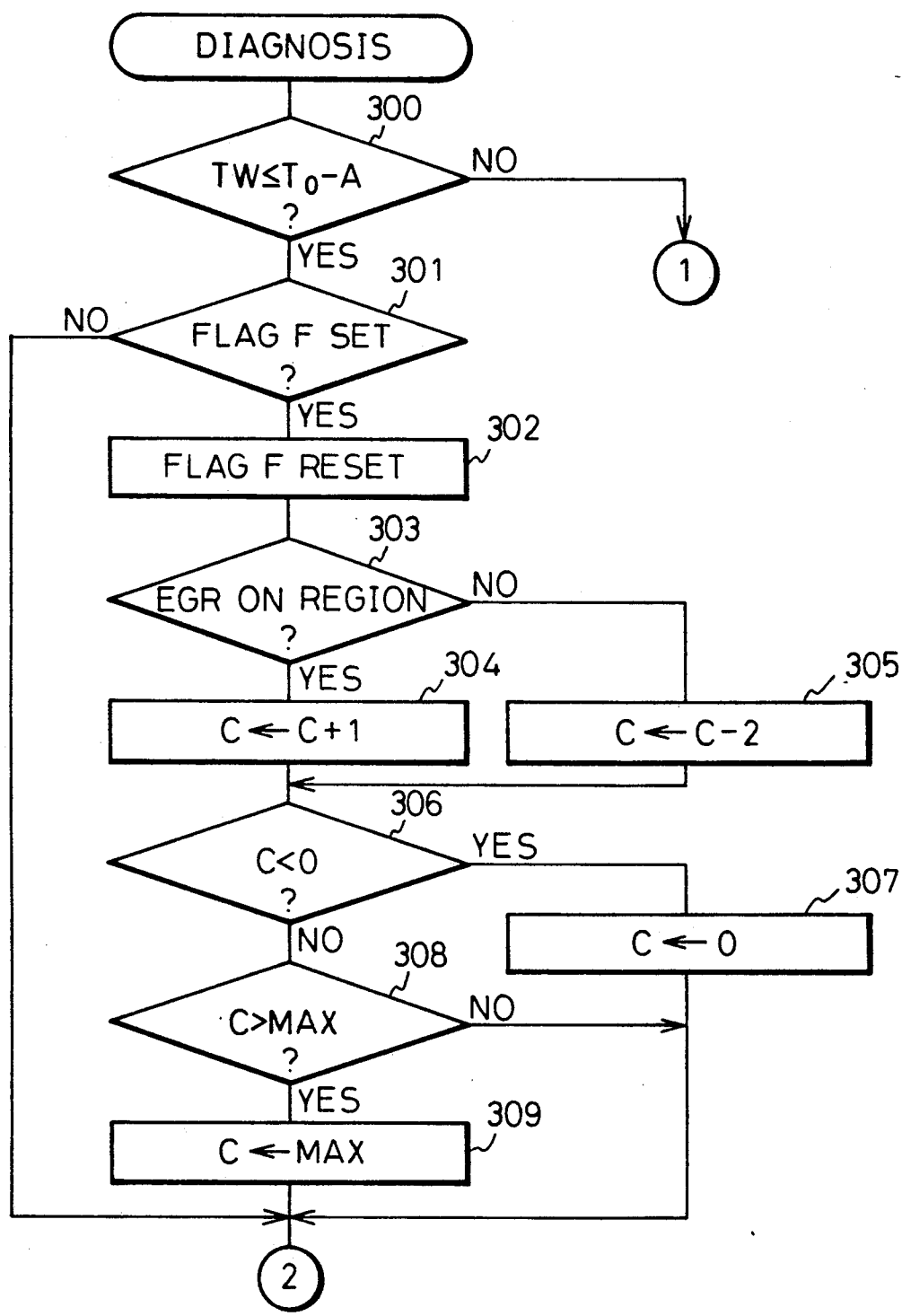
FIGS. 36A, 36B, 36C, and 36D are flow charts for diagnosing malfunctions.
Figure 36B:
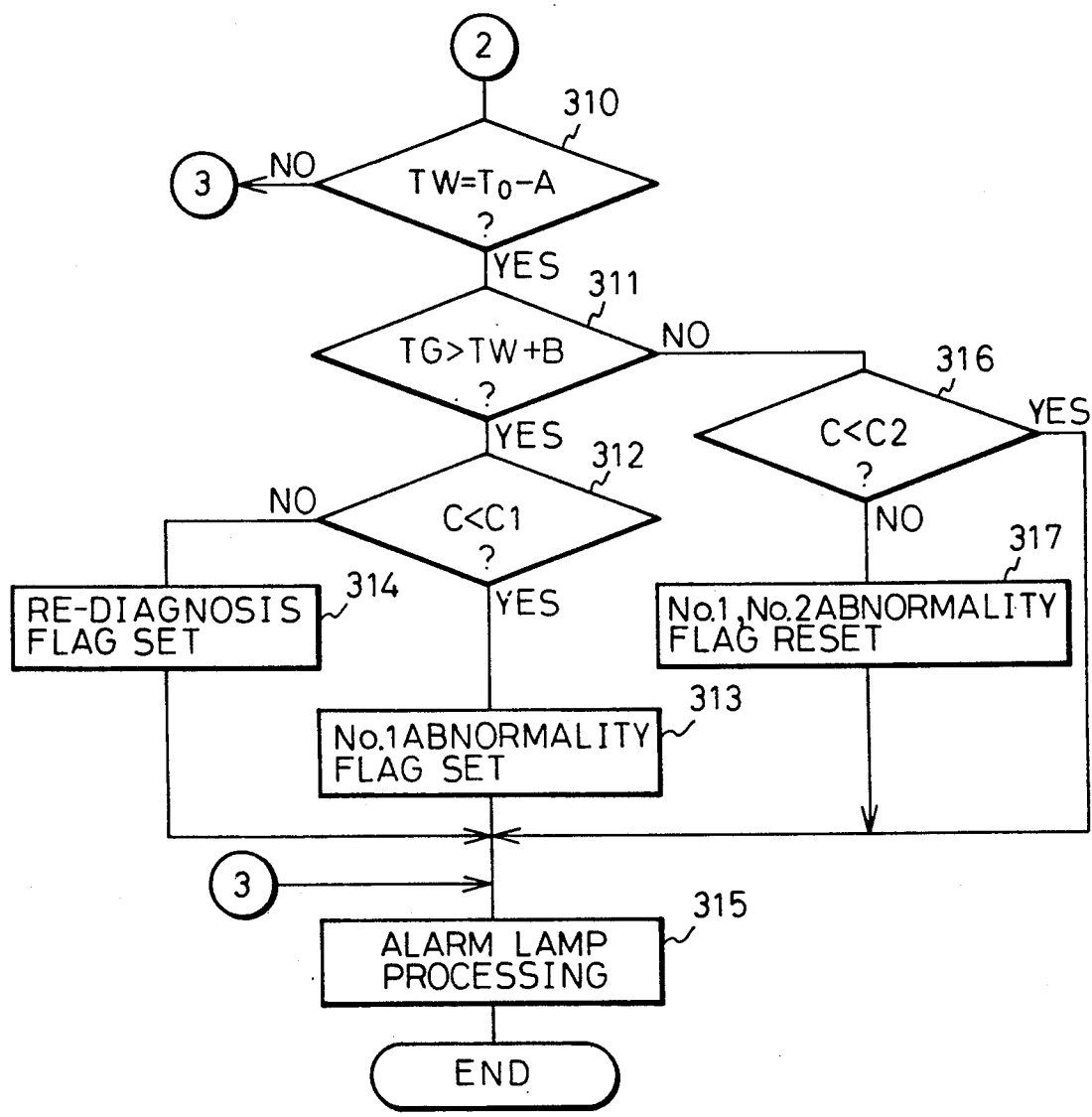
Figure 36C:
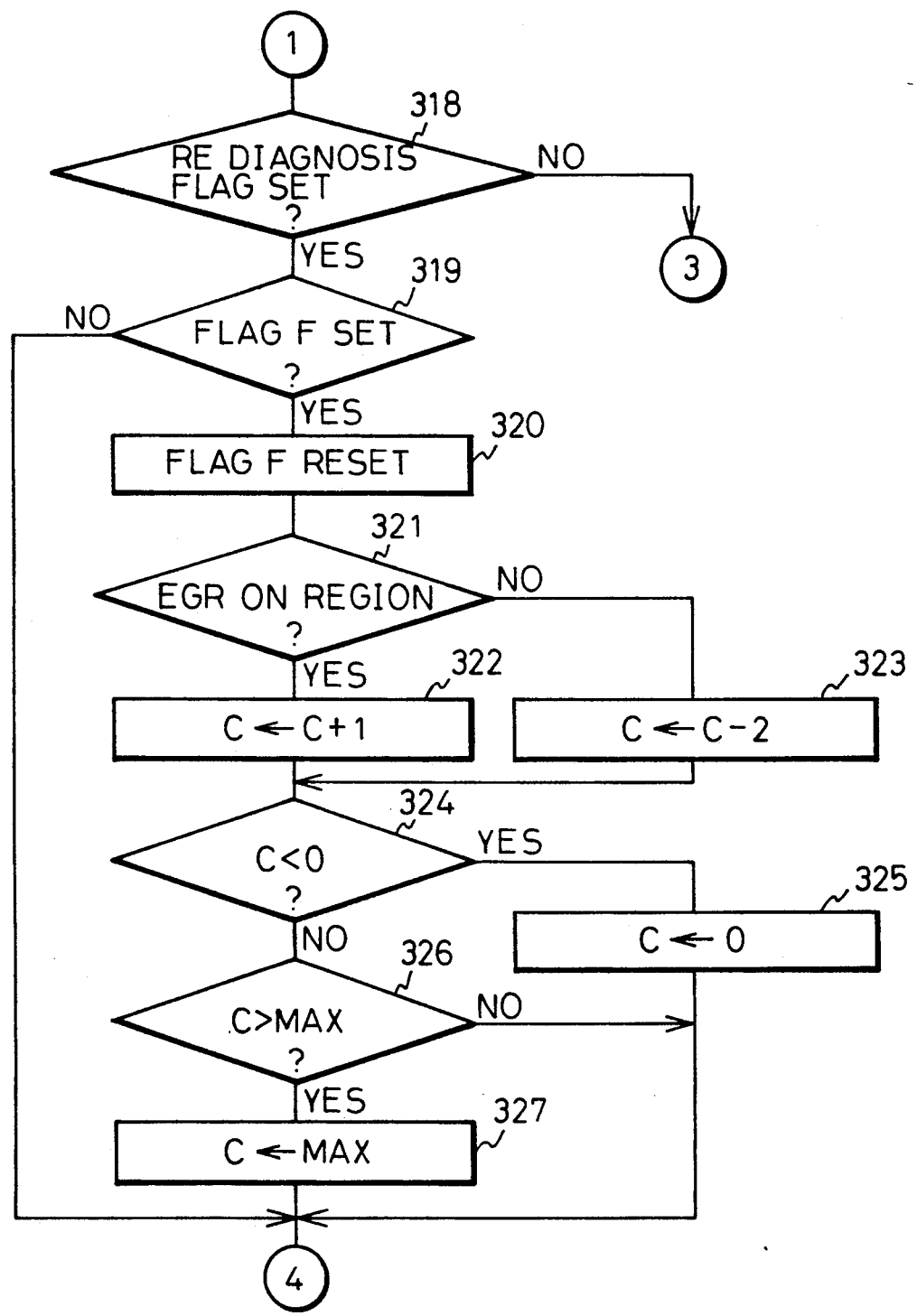
Figure 36D:
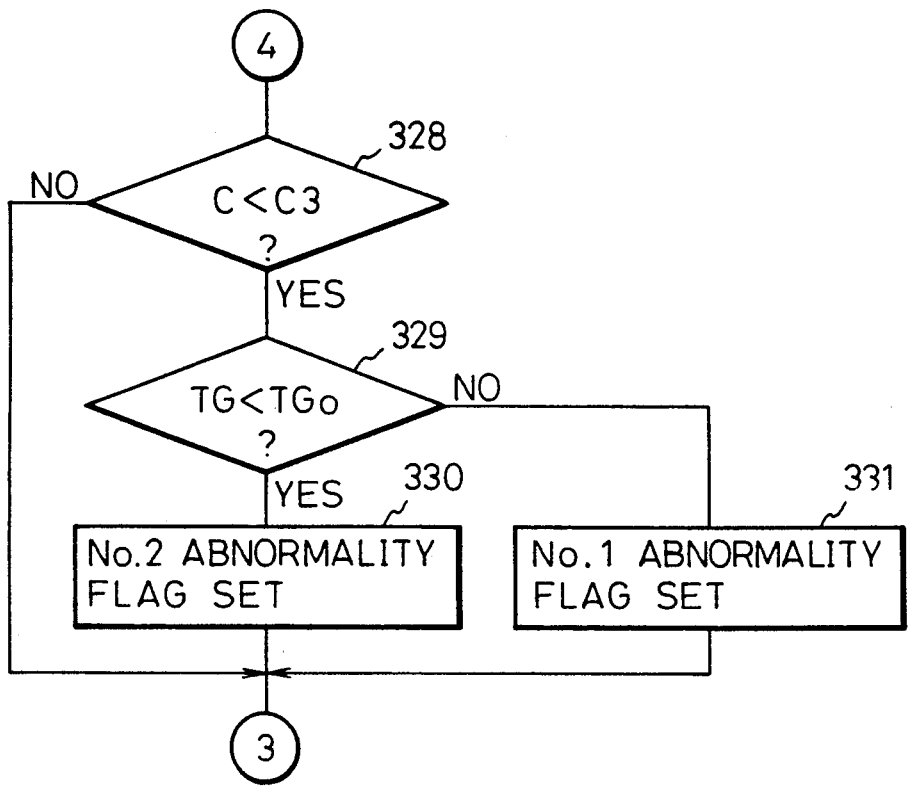
Figure 37:
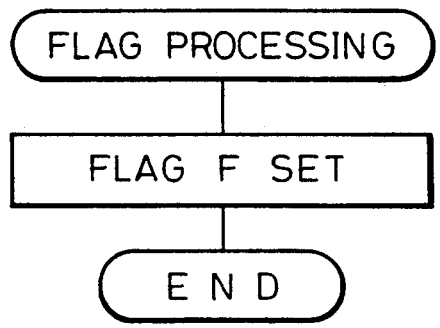
FIG. 37 is a flow chart for setting the flag F.

Returning again to FIG. 36A, at step 300, when it is discriminated if $TW>T_0-A$, the routine proceeds to step 318 in FIG. 36c, where it is discriminated if the rediagnosis flag is set. When the rediagnosis flag is not set, the routine jumps to step 315. As opposed to this, when the rediagnosis flag is set, the routine proceeds to step 319, where it is discriminated if the flag F set at certain intervals is set. When the flag F is reset, the routine jumps to step 328, while when the flag F is set, the routine proceeds to step 320.

At step 320, the flag F is reset, then the routine proceeds to step 321. At step 321, it is discriminated if the region is the on region shown in FIG. 33 from the throttle opening degree and the engine rotational speed. When the on region, the routine proceeds to step 322, while when not the on region, the routine proceeds to step 323. At step 322, the count C is incremented by exactly 1, then the routine proceeds to step 324. At step 323, the count C is decremented by exactly 2, then the routine proceeds to step 324. Therefore, the count C changes as shown in FIG. 34. At step 324, it is discriminated if the count C is negative or not. When $C<0$, the routine proceeds to step 325, where C is made zero, then the routine proceeds to step 328. When $C \geq 0$, the routine proceeds to step 326, where it is discriminated if the count C is larger than a predetermined maximum value MAX. When $C>MAX$, the routine proceeds to step 327, where C is made MAX, then the routine proceeds to step 328. When $C \leq MAX$, the routine jumps to step 328.

At step 328, it is discriminated if the count C is smaller than a predetermined set value C3. When $C \geq C3$, the routine jumps to step 315. As opposed to this, when $C<C3$, the routine proceeds to step 329, where it is discriminated if the temperature inside the exhaust gas recirculation passage 12 is lower than a predetermined set value $TG_0$. Note that the set value C3 and the set value $TG_0$ are determined so that when the count C becomes C3, if the device is normal, the temperature inside the exhaust gas recirculation passage 12 becomes lower than $TG_0$, while if the exhaust gas recirculation control valve 14 suffers from an abnormality in opening, the temperature inside the exhaust gas recirculation passage 12 becomes higher than $TG_0$.

When it is discriminated that $TG>TG_0$ at step 329, it means that the exhaust gas recirculation control valve 14 is operating normally. Therefore, at this time, it means that the shut-off valve 35 suffers from an abnormality in opening and therefore the routine proceeds to step 330 and the no. 2 abnormality flag indicating that the shut-off valve 35 suffers from an abnormality in opening is set. Next, the routine proceeds to step 315. On the other hand, when $TG>TG_0$, it means that the exhaust gas recirculation control valve 14 suffers from an abnormality in opening. Therefore, at this time, the routine proceeds to step 331, where the no. 1 abnormality flag is set, then the routine proceeds to step 315.

Next, an explanation will be made of the method of diagnosis of malfunction in the exhaust gas recirculation control valve 14 and the shut-off valve 35 by the above-mentioned second method referring to FIG. 38A and FIG. 38B.

Figure 38A:
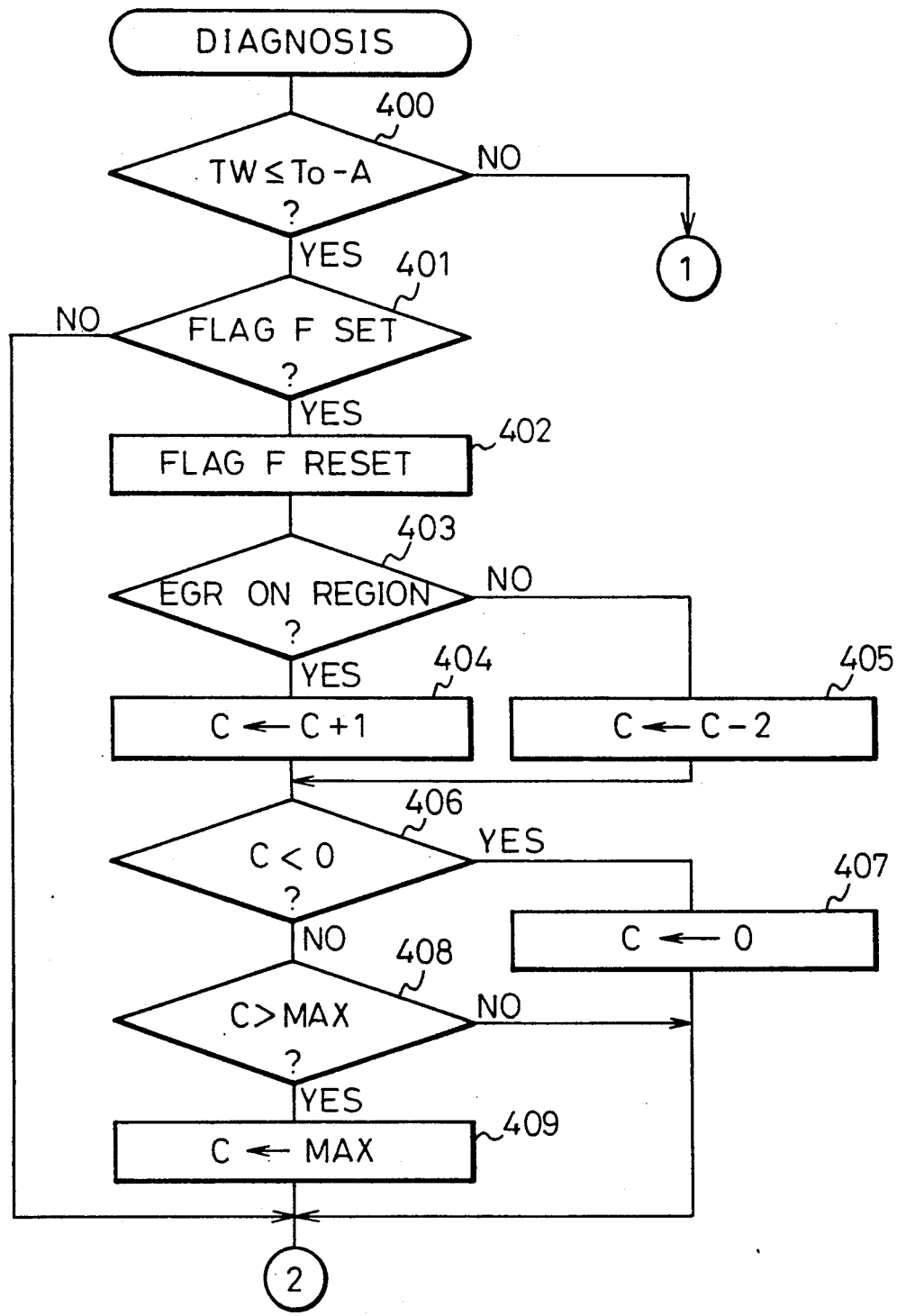
FIGS. 38A and 38B are flow charts for diagnosing malfunctions.
Figure 38B:
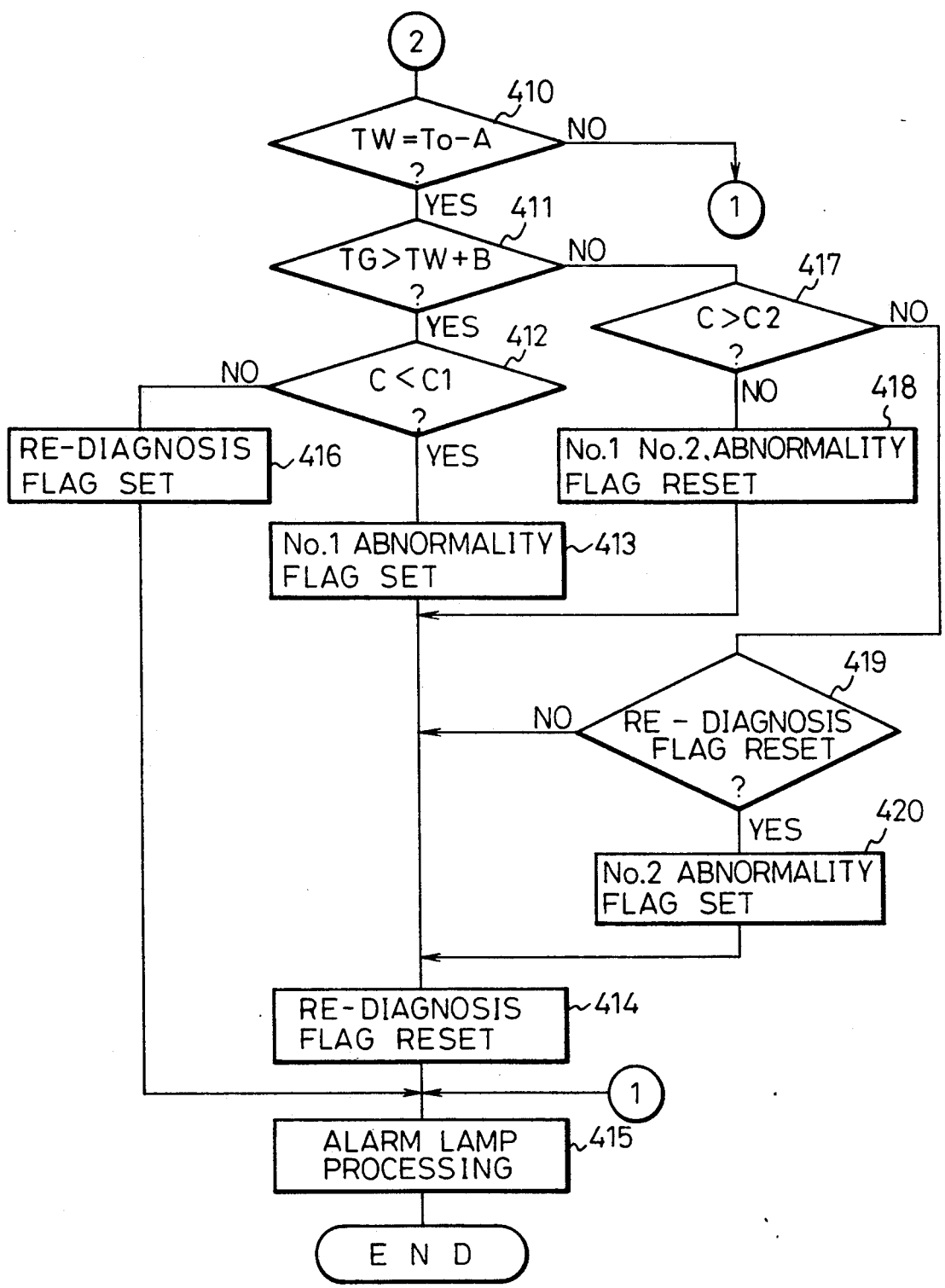

Referring to FIG. 38A and FIG. 38B, first, at step 400, it is discriminated if the temperature TW of the engine cooling water has not become higher than the temperature $(T_0-A)$ of the set temperature $T_0$ minus a certain value A of from 1° to 5°. When $TW \leq_0 -A$, the routine proceeds to step 401, where it is discriminated if the flag F is set. The flag F is set at certain time intervals by the flag processing routine shown in FIG. 37. At step 401, when it is discriminated that the flag F is reset, the routine jumps to step 410, while when it is discriminated that the flag F is set, the routine proceeds to step 402.

At step 402, the flag F is reset and then the routine proceeds to step 403. At step 403, it is discriminated if the region is the on region shown in FIG. 33 from the throttle opening degree and the engine rotational speed. When not the on region, the routine proceeds to step 405. At step 404, the count C is incremented by exactly 1, then the routine proceeds to step 406. At step 405, the count C is decremented by exactly 2, then the routine proceeds to step 406. Therefore, the count C changes as shown in FIG. 34. At step 406, it is discriminated if the count C is negative. When $C<0$, the routine proceeds to step 407, where C is made zero, the routine proceeds to step 410. When $C \leq 0$, the routine proceeds to step 408, where it is discriminated if the count C is larger than a predetermined maximum value MAX. When C>MAX, the routine proceeds to step 409, where C is made MAX, then the routine proceeds to step 410. When C≦MAX, the routine jumps to step 410.

At step 410, it is discriminated if the temperature TW of the engine cooling water has reached $(T_0-A)$. When TW is not equal to $(T_0-A)$, the routine proceeds to step 415, while when TW=$(T_0-A)$, the routine proceeds to step 411. That is, when the temperature TW of the engine cooling water after engine start-up reaches $(T_0-A)$, the routine proceeds to step 411. At step 411, it is discriminated if the temperature TG inside the exhaust gas recirculation passage 12 is higher than the temperature (TW+B) of the temperature TW of the engine cooling water plus a certain value B. Here, the certain value B is a small positive or negative value. When TG>TW+B, the routine proceeds to step 412, where it is discriminated if the count C is lower than a predetermined set value C1. The set value C1 is the count when the temperature inside the exhaust gas recirculation passage 12 becomes substantially the set temperature $T_0$. When C<C1, the routine proceeds to step 413, where the no. 1 abnormality flag is set. That is, when TW=$(T_0-A)$, TG>TW+B. At this time, if C<C1, it means that exhaust gas recirculation gas is being supplied when in the off region, so it means that the exhaust gas recirculation control valve 14 suffers from an abnormality in opening. Therefore, at this time, the no. 1 abnormality flag indicating that the exhaust gas recirculation control valve 14 suffers from an abnormality in opening is set. Next, at step 414, the rediagnosis flag is reset, then the routine proceeds to step 415.

On the other hand, when it is discriminated at step 412 that C≧C1, the routine proceeds to step 416, where the rediagnosis flag is set. That is, when TW=$(T_0-A)$, TG>TW+B. At this time, if C≧C1, one of the exhaust gas recirculation control valve 14 or the shut-off valve 35 suffers from an abnormality in opening, so at this time the rediagnosis flag indicating that rediagnosis should be made as to which of the exhaust gas recirculation control valve 14 of the shut-off valve 35 suffers from an abnormality in opening is set. Whether or not the rediagnosis flag is set is stored in the backup RAM 43a, then the routine proceeds to step 415.

On the other hand, when the vehicle is operated, then the engine stopped and then subsequently the engine is started again, if TG≦TW+B is assumed when TW=$T_0-A$, then at this time the routine proceeds to step 417, where it is discriminated if the count C is larger than a predetermined set value C2. The set value C2 is the count when the temperature inside the exhaust gas recirculation passage 12 becomes substantially the set temperature $T_0$. When C>C2, the routine proceeds to step 418, where the no. 1 and no. 2 abnormality flags are reset. As opposed to this, when C≦C2, the routine proceeds to step 419, where it is discriminated if the rediagnosis flag is set. When TW=$T_0-A$, if TG≦TW+B, the exhaust gas recirculation control valve 14 is operating normally and therefore if the rediagnosis flag is set, it means that the shut-off valve 35 suffers from an abnormality in opening. Therefore, if the rediagnosis flag is set, the routine proceeds from step 419 to step 420, where the no. 2 abnormality flag is set, then the routine proceeds to step 414. If the rediagnosis flag is not set, the routine proceeds from step 419 to step 414. At step 415, if the no. 1 or the no. 2 abnormality flag is set, the corresponding no. 1 or no. 2 alarm lamp 38a or 38b is lit.

As mentioned above, however, if the engine is made to stop, as shown in FIG. 3, the temperature TG inside the exhaust gas recirculation passage 12 falls to substantially the atmospheric temperature TA, which is lower than the set temperature $T_0$, and the temperature TW of the engine cooling water falls to substantially the atmospheric temperature TA as well. Next, if the engine is started, if the exhaust gas recirculation control device 13 is operating normally, the temperature inside the exhaust gas recirculation passage 12 rises from the substantially atmospheric temperature TA in accordance with the normal pattern TG, wile if there is an abnormality in the exhaust gas recirculation control device 13, the temperature inside the exhaust gas recirculation passage 12 rises from the substantially atmospheric temperature TA in accordance with the abnormal pattern TG'.

Figure 39A:
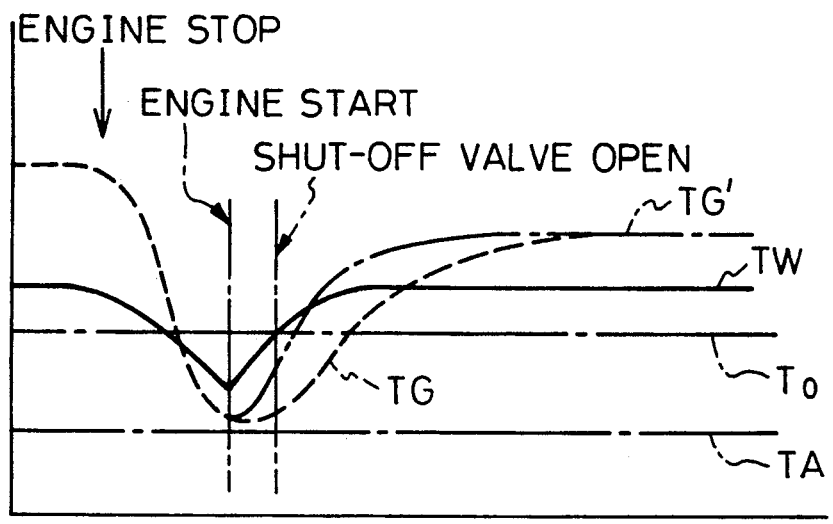
FIGS. 39A and 39B are time charts showing the changes in the temperature of the engine cooling water and the temperature in the exhaust gas recirculation passage.
Figure 39B:
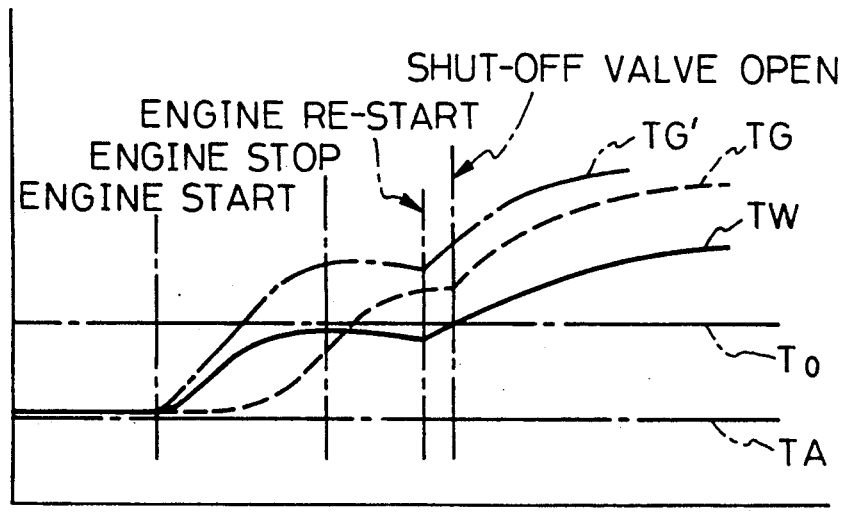

The normal pattern TG and the abnormal pattern TG', however, deviate from the patterns shown in FIG. 3, as mentioned earlier, when affected by the operating state of the engine before engine stopping. For example, as shown in FIG. 39A, if the engine is stopped, then a short time later the engine is started up again, the normal pattern TG and the abnormal pattern TG' after the engine start-up become different from the patterns shown in FIG. 3. Further, as shown in FIG. 39B, if the engine is started, then the engine is stopped a short time later, then a short time after the engine is stopped, the engine is started once more, the normal pattern TG and the abnormal pattern TG' after the restart of the engine become different from the patterns shown in FIG. 3. In this way, when the normal pattern TG and the abnormal pattern TG' deviate from the patterns shown in FIG. 3 due to the influence of the operating state of the engine before the engine stopping, the possibility rises of a mistaken judgement diagnosing a malfunction of the exhaust gas recirculation control device 13 from the pattern of change of the temperature inside the exhaust gas recirculation passage 12.

That is, in the case shown in FIG. 39A, both the TG and the TG' are lower than the set temperature $T_0$ when the temperature TW of the engine cooling water reaches the set temperature $T_0$, while in the case shown in FIG. 39B, both the TG and the TG' become higher than the set temperature $T_0$ when the temperature TW of the engine cooling water reaches the set temperature $T_0$. Therefore, in both cases, there is a possibility of a mistaken judgement. Therefore, to accurately judge if a malfunction has occurred in the exhaust gas recirculation control device 13, it is necessary to judge a malfunction when the normal pattern TG and the abnormal pattern TG' are not affected by the operating state of the engine before the engine stopping.

As will be understood from a comparison of FIG. 3 and FIGS. 39A and 39B, if the effect of the operating state of the engine before engine stopping is felt, then the temperature inside the exhaust gas recirculation passage 12 and the temperature TW of the engine cooling water at the time of engine start-up becomes higher than the atmospheric temperature TA, while when the effect of the operating state of the engine before engine stopping is not felt, the temperature inside the exhaust gas recirculation passage 12 and the temperature TW of the engine cooling water both become substantially the same as the atmospheric temperature TA. Therefore, if the temperature inside the exhaust gas recirculation passage 12 and the temperature TW of the engine cooling water are both substantially equal to the atmospheric temperature TA, there is no longer a mistaken judgement when diagnosing a malfunction.

Figure 40A:
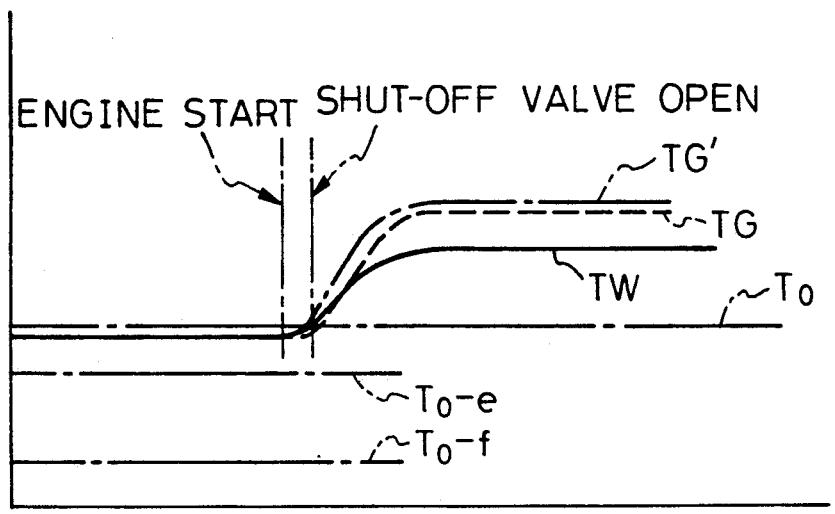
FIGS. 40A and 40B are time charts showing the changes in the temperature of the engine cooling water and the temperature in the exhaust gas recirculation passage.

Even when the temperature inside the exhaust gas recirculation passage 12 and the temperature TW of the engine cooling water at the time of engine start-up are substantially equal to the atmospheric temperature TA, if the temperature inside the exhaust gas recirculation passage 12 and the temperature TW of the engine cooling water at the time of engine start-up are just slightly lower than the set temperature $T_0$ or are considerably lower than the same, the temperature difference between the temperature inside the 12 when the temperature TW of the engine cooling water reaches the set temperature $T_0$ and the temperature TW of the engine cooling water becomes smaller and the normal pattern TG and the abnormal pattern TG' deviate from the patterns shown in FIG. 3. For example, as shown in FIG. 40A, when the temperature TW of the engine cooling water at the time of engine start-up and the temperature TG inside the exhaust gas recirculation passage 12 are just slightly lower than the set temperature $T_0$, the temperature difference between the temperature inside the exhaust gas recirculation passage 12 when the temperature TW of the engine cooling water reaches the set temperature $T_0$ and the temperature TW of the engine cooling water becomes considerably small. At this time, the normal pattern TG and the abnormal pattern TG' become substantially the same patterns of change. That is, it becomes impossible to differentiate the normal pattern TG and the abnormal pattern TG'.

Figure 40B:
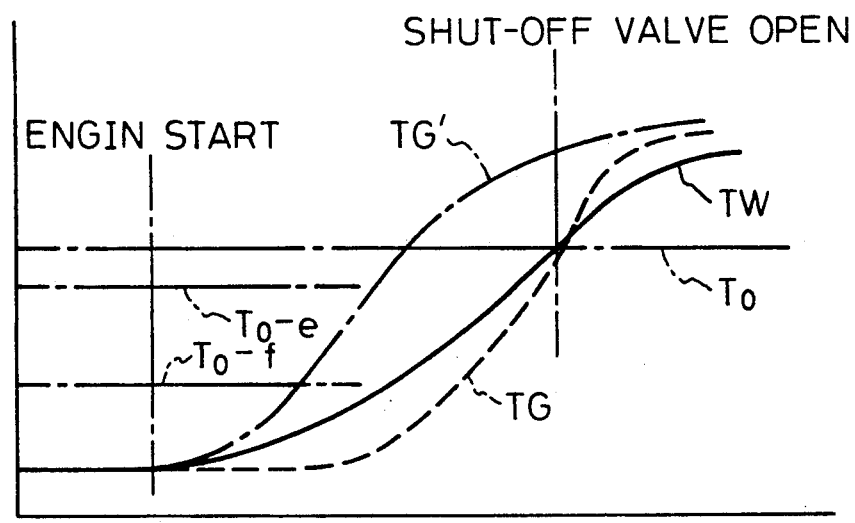

On the other hand, as shown in FIG. 40B, even when the temperature TW of the engine cooling water and the temperature TG inside the exhaust gas recirculation passage 12 at the time of engine start-up are considerably lower than the set temperature $T_0$, the temperature difference between the temperature inside the exhaust gas recirculation passage 12 when the temperature TW of the engine cooling water reaches the set temperature $T_0$ and the temperature TW of the engine cooling water becomes considerably smaller. That is, the lower the temperature TW of the engine cooling water at the time of engine start-up, the longer the time for the temperature TW of the engine cooling water to reach the set temperature $T_0$. If the time until the temperature TW of the engine cooling water reaches the set temperature $T_0$ becomes longer, the exhaust gas recirculation passage 12 and the temperature sensor 37 are heated by the transfer action from the exhaust manifold 6 and the temperature TG inside the exhaust gas recirculation passage 12 detected by the temperature sensor 37 rises along with the elapse of time as shown by FIG. 40B. As a result, the temperature difference between the temperature inside the exhaust gas recirculation passage 12 when the temperature TW of the engine cooling water reaches the set temperature $T_0$ and the temperature TW of the engine cooling water becomes considerably smaller.

In this way, there is a possibility of a mistaken judgement diagnosing a malfunction when the temperature difference between the temperature inside the exhaust gas recirculation passage 12 and the temperature TW of the engine cooling water when the temperature TW of the engine cooling water reaches the set temperature $T_0$ becomes smaller. However, in FIG. 40A and FIG. 40B, if the temperature inside the exhaust gas recirculation passage 12 and the temperature TW of the engine cooling water are within a certain range at engine start-up, for example, between $(T_0-f)$ and $(T_0-e)$, the temperature inside the exhaust gas recirculation passage 12 and the temperature TW of the engine cooling water when the temperature TW of the engine cooling water reaches the set temperature $T_0$ will change as shown in FIG. 3 and therefore there will no longer be any mistaken judgements in this case.

Figure 41:
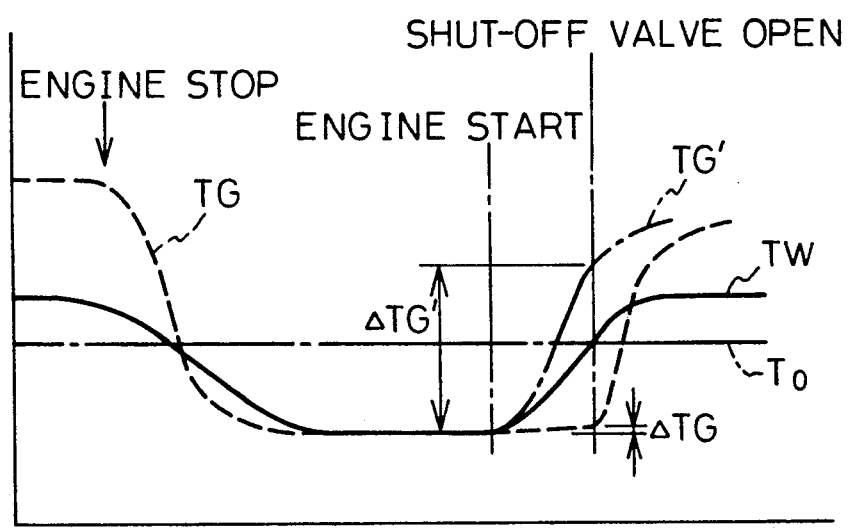
FIG. 41 is a time chart showing the changes in the temperature of the engine cooling water and the temperature in the exhaust gas recirculation passage.

FIG. 41 shows the second method for judging which of the patterns, a normal pattern TG or an abnormal pattern TG', is corresponded to, that is, which pattern is corresponded to from the amount of change of the temperature inside the exhaust gas recirculation passage 12.

As shown in FIG. 41, the amount $\Delta TG$ of change of the temperature inside the exhaust gas recirculation passage 12 when the temperature changes in accordance with the normal pattern TG in the period of engine operation from start-up of the engine to when the temperature TW of the engine cooling water reaches the set temperature $T_0$ becomes considerably smaller than the amount $\Delta TG'$ of change of the temperature inside the exhaust gas recirculation passage 12 when the temperature changes in accordance with the abnormal pattern TG'. Therefore, if the amount of change of the temperature inside the exhaust gas recirculation passage 12 during the period of the engine operation from the start-up of the engine to when the temperature TW of the engine cooling water reaches the set temperature $T_0$, it can be judged that the device is normal, while when it is small, it can be judged that the device is abnormal.

Figure 42A:
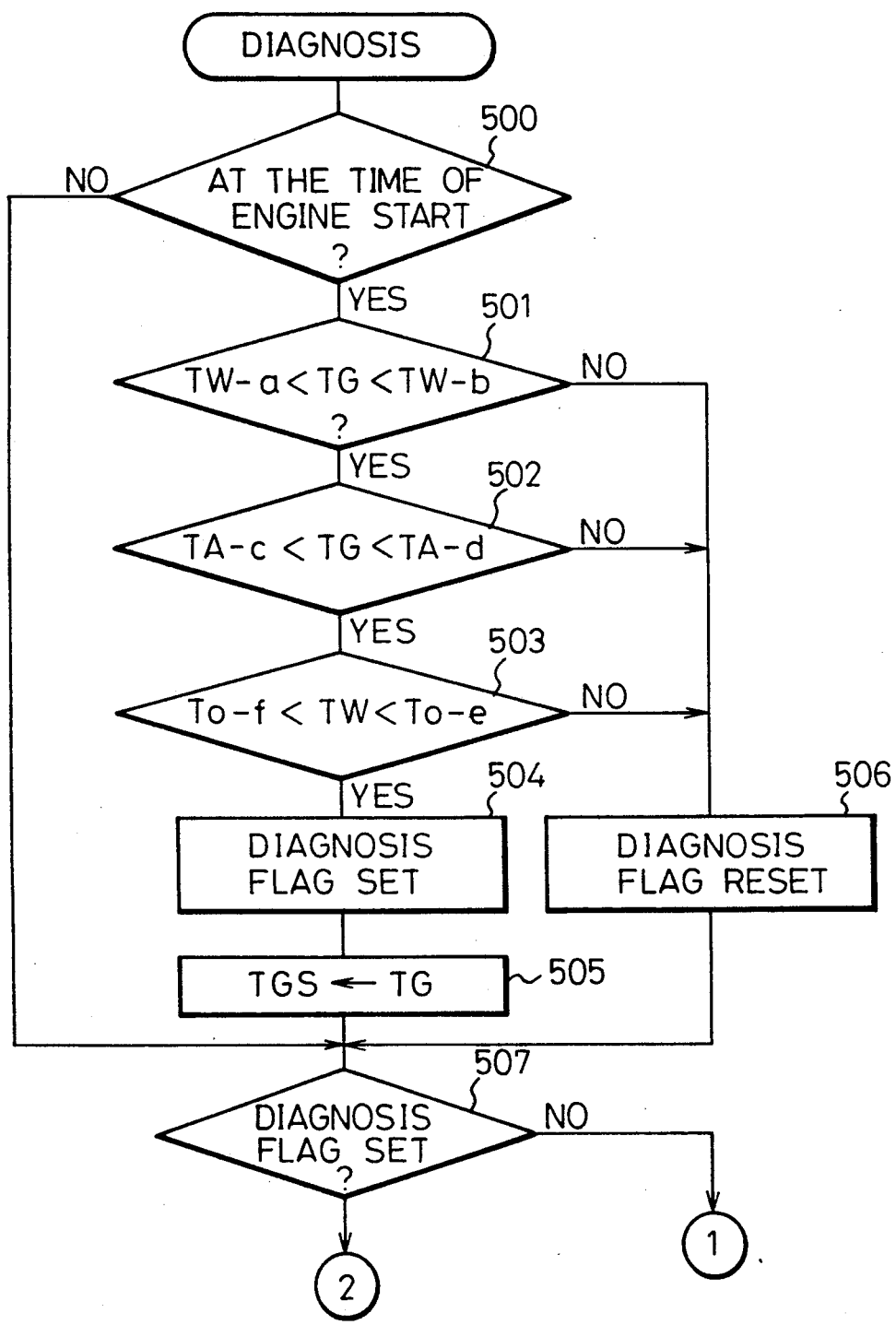
FIGS. 42A, 42B, and 42C are flow charts for diagnosing malfunctions.
Figure 42B:
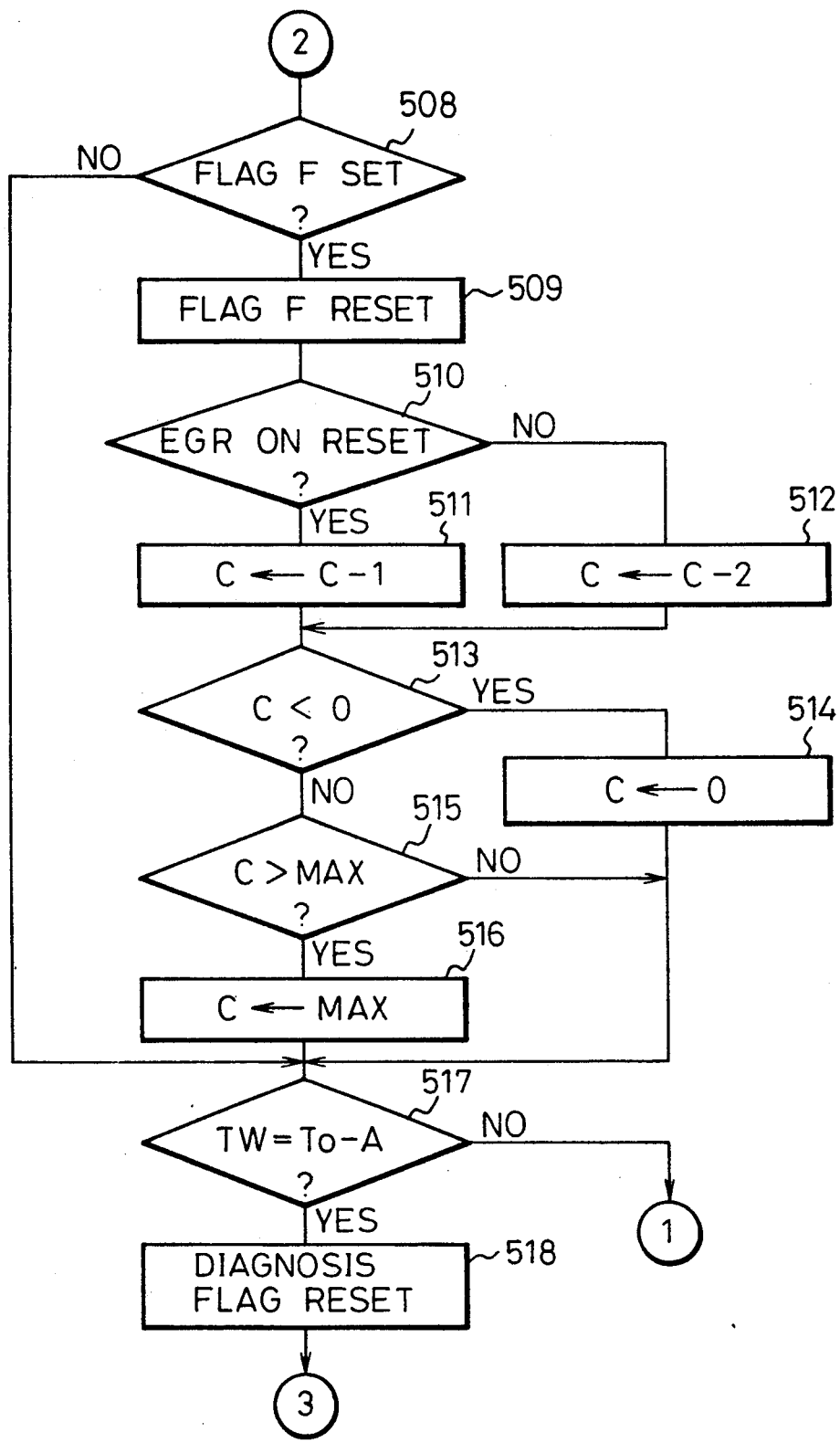
Figure 42C:
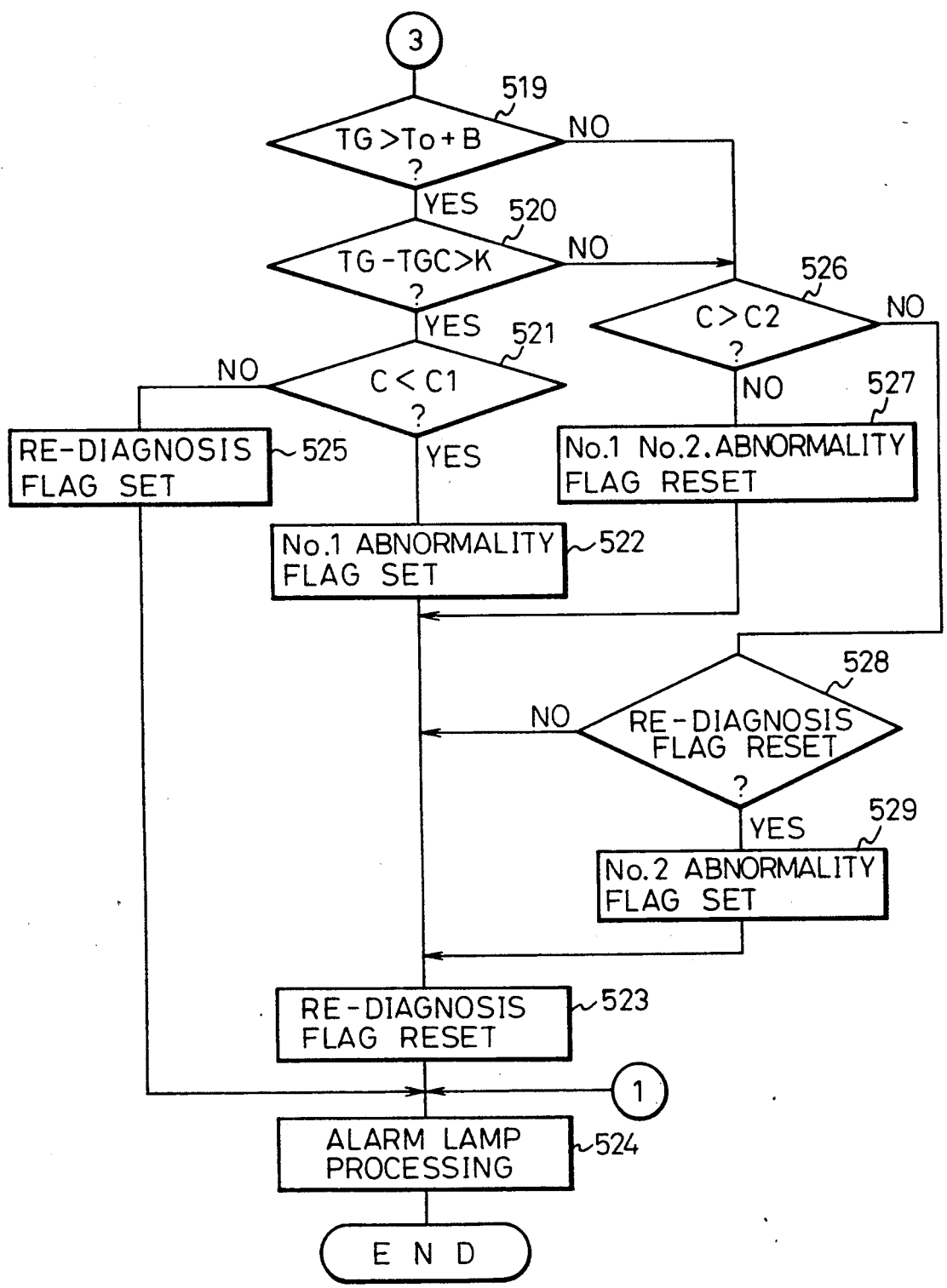

FIG. 42A and FIG. 42C show a method of diagnosis of a malfunction in the exhaust gas recirculation control valve 14 and the shut-off valve 35 to which the various erroneous judgement prevention items are added.

Referring to FIG. 42A to FIG. 42C, first, at step 500, it is discriminated if the engine is being started. Whether the engine is being started is discriminated, for example, by whether a starter switch 49 has been turned on. When the engine is being started up, the routine proceeds to step 501, where it is discriminated if TG is between $(TW-a)$ and $(TW+b)$ (where a and b are certain values), that is, if the temperature TG inside the exhaust gas recirculation passage 12 is substantially equal to the temperature TW of the engine cooling water. When $TW-a<TG<TW+b$, the routine proceeds to step 502, where it is discriminated if TG is between $(TA-c)$ and $(TA+d)$, that is, if the temperature TG inside the exhaust gas recirculation passage 12 is substantially equal to the atmospheric temperature TA. When $TA-c<TG<TA+d$, the routine proceeds to step 503. That is, the routine proceeds to step 503 when the temperature TG inside the exhaust gas recirculation passage 12 and the temperature TW of the engine cooling water are substantially equal to the atmospheric temperature TA. When these TG, TW, and TA are not substantially equal, the routine proceeds to step 506, where the diagnosis flag is reset, the routine proceeds to step 507.

At step 503, it is discriminated if the temperature TW of the engine cooling water is between the $(T_0-f)$ and $(T_0-e)$ shown in FIG. 40A and FIG. 40B (e and f are certain values). When TW is not between $(T_0-f)$ and $(T_0-e)$, the routine proceeds to step 506. As opposed to this, when $T_0-f<TW<T_0-e$, the routine proceeds to step 504, where the diagnosis flag is set. Next, the routine proceeds to step 505, where the temperature inside the exhaust gas recirculation passage 12 is made the starting temperature TGS, then the routine proceeds to step 507. At step 507, it is discriminated if the diagnosis flag has been set. If the diagnosis flag has not been set, the routine jumps to step 524. As opposed to this, if the diagnosis flag has been set, the routine proceeds to step 508.

At step 508, it is discriminated if the flag F is set. The flag F is set at certain time intervals by the flag processing routine shown in FIG. 37. When it is discriminated at step 508 that the flag F has been reset, the routine jumps to step 517, while when it is discriminated that the flag F is set, the routine proceeds to step 509.

At step 509, the flag F is reset and the routine proceeds to step 510. At step 510, it is discriminated if the region is the on region shown in FIG. 33 from the throttle opening degree and the engine rotational speed. When the on region, the routine proceeds to step 411, while when not the on region, the routine proceeds to step 512. At step 511, the count C is incremented by exactly 1, then the routine proceeds to step 513. At step 512, the count C is decremented by exactly 2, then the routine proceeds to step 513. Therefore, the count C changes as shown in FIG. 34. At step 513, it is discriminated if the count C is negative or not. When $C<0$, the routine proceeds to step 514, where C is made zero, then the routine proceeds to step 517. When $C \geq 0$, the routine proceeds to step 515, where it is discriminated if the count C is larger than a predetermined maximum value MAX. When $C>$MAX, the routine proceeds to step 516, where C is made MAX, then the routine proceeds to step 517. When $C \leq$MAX, the routine jumps to step 517.

At step 517, it is discriminated if temperature TW of the engine cooling water has reached the temperature $(T_0-A)$ of the set temperature $T_0$ minus a certain value A of from 1° to 5°. When TW is not equal to $(T_0-A)$, the routine proceeds to step 524, while when $TW=(T_0-A)$, the routine proceeds to step 518, where the diagnosis flag is reset, then the routine proceeds to step 519. That is, if the temperature TW of the engine cooling water reaches $(T_0-A)$ after the engine start-up, the routine proceeds to step 519. At step 519, it is discriminated if the temperature TG inside the exhaust gas recirculation passage 12 is higher than the temperature $(T_0+B)$ of the temperature TW of the engine cooling water plus a certain value B. Here, the certain value B is a small positive or negative value. When $TG>TW+B$, the routine proceeds to step 520.

At step 520, it is judge if the temperature difference $(TG-TGS)$ of the current temperature TW of the engine cooling water and the starting temperature TGS, that is, the temperature difference $\Delta TG$ shown in FIG. 41, is larger than a predetermined set value K. When $TG-TGS>K$, the routine proceeds to step 521. That is, the routine proceeds to step 521 when $TG>T_0+B$ and $TG-TGS>K$.

At step 521, 1 it is discriminated if the count C is lower than a predetermined set value C1. This set value C1 is the count when the temperature inside the exhaust gas recirculation passage 12 becomes substantially the set temperature $T_0$. When $C<C1$, the routine proceeds to step 522, where the no. 1 abnormality flag is set. That is, when $TW=(T_0-A)$, $TG>TW+B$ and $TG-TGS>K$. At this time, if $C<C1$, when in the off region, it means the exhaust gas recirculation gas has been supplied, so the exhaust gas recirculation control valve 14 is suffering from an abnormality in opening. Therefore, at this time, the no. 1 abnormality flag showing that the exhaust gas recirculation control valve 14 suffers from an abnormality in opening is set. Next, at step 523, the rediagnosis flag is reset, then the routine proceeds to step 524.

On the other hand, when if it is discriminated that $C \geq C1$ at step 521, the routine proceeds to step 525, where the rediagnosis flag is set. That is, when $TW=(T_0-A)$, $TG>TW+B$ and $TG-TGS>K$. At this time, if $C \geq C1$, one of the exhaust gas recirculation control valve 14 and the shut-off valve 35 is suffering from an abnormality in opening, so a rediagnosis flag is set showing that rediagnosis should be performed as to which of the exhaust gas recirculation control valve 14 or the shut-off valve 35 is suffering from an abnormality in opening at this time. Whether or not the rediagnosis flag is set is stored in a backup RAM 43a. Next, the routine proceeds to step 524.

On the other hand, when the engine is stopped after operation of the vehicle and then the engine is again started and $TW=T_0-A$, when deciding that $TG \leq TW+B$ or $TG-TGS \leq K$, the routine proceeds to step 526, where it is discriminated if the count C is larger than a predetermined set value C2. The set value C2 is the count where the temperature inside the exhaust gas recirculation passage 12 becomes substantially the set temperature $T_0$. When $C>C2$, the routine proceeds to step 527, where the no. 1 and the no. 1 abnormality flags are reset. As opposed to this, when $C \leq C2$, the routine proceeds to step 528, where if it is discriminated that the rediagnosis flag is set. When $TW=T_0-A$, when $TG \leq TW+B$ or $TG-TGS \leq K$, the exhaust gas recirculation control valve 14 is operating normally and therefore when the rediagnosis flag is set, the shut-off valve 35 suffers from an abnormality in opening. Therefore, when the rediagnosis flag is set, the routine proceeds from step 528 to step 529, where the no. 2 abnormality flag is set, then the routine proceeds to step 523. When the rediagnosis flag is not set, the routine proceeds from step 528 to step 523. At step 524, if the no. 1 or the no 2 abnormality flag has been set, the corresponding no. 1 or no. 2 alarm lamp 38a or 38b is lit.

While the invention has been described by reference to specific embodiments chosen for purposes of illustration it should be apparent that numerous modifications could be made thereto by those skilled in the art without departing from the basic concept and scope of the invention.

I claim:

1. An engine having an exhaust gas recirculation passage connecting an exhaust passage to an intake passage, the engine comprising:

temperature detecting means arranged in the exhaust gas recirculation passage for detecting a temperature of an exhaust gas in the exhaust gas recirculation passage;

an exhaust gas recirculation device arranged in the exhaust gas recirculation passage for permitting the passage of the exhaust gas when an engine temperature during a warm-up of the engine exceeds a predetermined set temperature;

discriminating means for discriminating whether a pattern of change in a temperature inside the exhaust gas recirculation passage detected by said temperature detecting means is a normal pattern or an abnormal pattern, wherein the temperature inside said exhaust gas recirculation passage changes abruptly during warm-up at the predetermined set temperature in said normal pattern and the temperature inside said exhaust gas recirculation passage changes gradually during warm-up in said abnormal pattern; and abnormality judgement means for judging that operation of said exhaust gas recirculation device is abnormal when the pattern of change in the temperature inside the exhaust gas recirculation passage during the warm-up is said abnormal pattern.

2. An engine as set forth in claim 1, wherein:

said discriminating means discriminates if the temperature inside the exhaust gas recirculation passage, at a predetermined engine temperature during a predetermined period of engine operation during a warm-up operation, is in accordance with said abnormal pattern;

said abnormality judgment means judges that there is an abnormality in the exhaust gas recirculation device when the temperature inside the exhaust gas recirculation passage is in accordance with said abnormal pattern; and during said predetermined period, a temperature difference between the temperature inside the exhaust gas recirculation passage when the temperature changes in accordance with said normal pattern and the temperature inside the exhaust gas recirculation passage when the temperature changes in accordance with said abnormal pattern, is increased.

3. An engine as set forth in claim 1, wherein:

said discriminating means discriminates if a temperature change inside the exhaust gas recirculation passage during a predetermined period of engine operation during a warm-up operation, is in accordance with said abnormal pattern;

said abnormality judgment means judges that there is an abnormality in the exhaust gas recirculation device when the temperature change inside the exhaust gas recirculation passage is in accordance with said abnormal pattern; and during said predetermined period, a difference between the temperature change inside said exhaust gas recirculation passage when the temperature changes in accordance with said normal pattern, and the temperature change inside the exhaust gas recirculation passage when the temperature changes in accordance with said abnormal pattern, increases.

4. An engine as set forth in claim 2, wherein said predetermined engine temperature is slightly lower than said predetermined set temperature.

5. An engine as set forth in claim 4, wherein said discriminating means discriminates if the temperature inside the exhaust gas recirculation passage is substantially higher than the predetermined set temperature; and the abnormality judgement means judges that there is an abnormality in the exhaust gas recirculation device when the temperature inside the exhaust gas recirculation passage is substantially higher than the predetermined set temperature.

6. An engine as set forth in claim 5, further comprising:

temperature range discriminating means which discriminates if the temperature inside the exhaust gas recirculation passage when the engine temperature has reached said predetermined engine temperature is within a predetermined temperature range centered on said predetermined set temperature; and prohibiting means which prohibits judgement by said abnormality judgement means when said temperature range discriminating means discriminates that the temperature inside the exhaust gas recirculation passage is within said temperature range.

7. An engine as set forth in claim 6, wherein an extent of said temperature range changes in inverse proportion to the engine temperature at a time of engine start-up.

8. An engine as set forth in claim 3, wherein the temperature change inside the exhaust gas recirculation passage is a temperature difference between the temperature inside the exhaust gas recirculation passage at a time of engine start-up and the temperature inside the exhaust gas recirculation passage when the engine temperature has reached a predetermined engine temperature;

said discriminating means discriminates if the temperature difference is higher than a predetermined set value; and said abnormality judgement means judges that there is an abnormality in the exhaust gas recirculation device when said temperature difference is higher than said predetermined set value.

9. An engine as set forth in claim 8, wherein said predetermined engine temperature is slightly lower than said predetermined set temperature.

10. An engine as set forth in claim 8, further comprising temperature range discriminating means which discriminates if the temperature inside the exhaust gas recirculation passage when the engine temperature has reached said predetermined engine temperature is within a predetermined temperature range centered on said predetermined set temperature; and prohibiting means which prohibits judgement by said abnormality judgement means when said temperature range discriminating means discriminates that the temperature inside the exhaust gas recirculation passage is within said predetermined temperature range.

11. An engine as set forth in claim 10, wherein an extent of said temperature range changes in inverse proportion to the engine temperature at the time of engine start-up.

12. An engine as set forth in claim 3, wherein the temperature change inside the exhaust gas recirculation passage is $1/M$ of a temperature difference between the temperature inside a exhaust gas recirculation passage at a time of engine start-up and the temperature inside the exhaust gas recirculation passage when the engine temperature has reached a predetermined engine temperature wherein M is a coefficient based on an engine cooling water temperature, said discriminating means discriminates if $1/M$ of said temperature difference is higher than a predetermined set value, and said abnormality judgement means judges that there is an abnormality in the exhaust gas recirculation device when $1/M$ of said temperature difference is higher than said predetermined set value, where M becomes larger as the engine temperature at the time of engine start-up becomes lower.

13. An engine as set forth in claim 3, wherein the temperature change inside the exhaust gas recirculation passage is a temperature difference between the temperature inside the exhaust gas recirculation passage when the engine temperature is substantially the same as the predetermined set temperature and the temperature inside the exhaust gas recirculation passage when the engine temperature is a temperature higher than said predetermined set temperature;

said discriminating means discriminates if said temperature difference is lower than a predetermined set value; and said abnormality judgement means judges there is an abnormality in the exhaust gas recirculation device when said temperature difference is lower than said predetermined set value.

14. An engine as set forth in claim 13, further comprising prohibiting means which prohibits judgement by said abnormality judgement means when the engine temperature at a time of engine start-up is substantially higher than the predetermined set temperature.

15. An engine as set forth in claim 3, wherein the temperature change inside the exhaust gas recirculation passage is a change per unit time of the temperature inside said exhaust gas recirculation passage during said predetermined period of engine operation;

said discriminating means discriminates if the change per unit time is lower than a predetermined set value; and said abnormality judgement means judges there is an abnormality in the exhaust gas recirculation device when the change per unit time is lower than said predetermined set value.

16. An engine as set forth in claim 15, wherein said predetermined period of engine operation is a period in which the engine temperature is within a temperature range, wherein said temperature range includes said predetermined set temperature.

17. An engine as set forth in claim 3, wherein the temperature change inside the exhaust gas recirculation passage is a change per unit time of the temperature inside the said exhaust gas recirculation passage;

said discriminating means discriminates a frequency by which the change per unit time becomes larger than a predetermined set frequency value; and said abnormality judgement means judges there is an abnormality in the exhaust gas recirculation device when said frequency is smaller than said predetermined set frequency value.

18. An engine as set forth in claim 3, wherein the temperature change in the temperature inside the exhaust gas recirculation passage is a rate of change of a change per unit time of the temperature inside said exhaust gas recirculation passage during said predetermined period of engine operation;

said discriminating means discriminates if the rate of change of the change per unit time is lower than a predetermined set value; and said abnormality judgement means judges there is an abnormality in the exhaust gas recirculation device when the rate of change of the change per unit time is lower than said predetermined set value.

19. An engine as set forth in claim 18, wherein said predetermined period of engine operation is a period in which the engine temperature is within a temperature range, wherein said temperature range includes said predetermined set temperature.

20. An engine as set forth in claim 1, further comprising:

temperature range discriminating means which discriminates if the engine temperature at a time of engine start-up is within a predetermined temperature range, wherein said predetermined temperature range is lower than said predetermined set temperature; and prohibiting means which prohibits judgement by said abnormality judgement means when said temperature range discriminating means discriminates that the temperature inside the exhaust gas recirculation passage is within said predetermined temperature range.

21. An engine as set forth in claim 1, further comprising:

means for calculating a time elapsed from when the engine is started up to when the engine temperature reaches substantially said predetermined set temperature;

time range discriminating means which discriminates if said elapsed time is within a predetermined time range; and prohibiting means which prohibits judgement by said abnormality judgement means when said time range discriminating means discriminates that the elapsed time is not within said predetermined time range.

22. An engine as set forth in claim 1, further comprising:

temperature discriminating means which discriminates if the temperature inside the exhaust gas recirculation passage at a time of engine start-up and the engine temperature are substantially equal to an atmospheric temperature; and prohibiting means which prohibits the judgement by said abnormality judgement means when said temperature discriminating means discriminates that the temperature inside the exhaust gas recirculation passage and the engine temperature are not substantially equal to the atmospheric temperature.

23. An engine as set forth in claim 1, further comprising:

engine stopping period calculating means for calculating a period in which the engine is stopped;

period discriminating means which discriminates if the period where the engine is stopped is longer than a predetermined period; and prohibiting means which prohibits judgement by said abnormality judgement means when said period discriminating means discriminates if the period where the engine is stopped is shorter than said predetermined period.

24. An engine as set forth in claim 23, wherein said engine stopping period calculating means is provided with a counter which starts a count up operation when an ignition switch is turned on and wherein said engine stopping period calculating means calculates the period of engine stopping based on a count of said counter.

25. An engine as set forth in claim 1, wherein said exhaust gas recirculation device is provided with an exhaust gas recirculation control valve having a vacuum chamber controlled by a vacuum in a vacuum chamber and a shut-off valve provided between said vacuum chamber and a vacuum source, wherein when the engine temperature becomes higher than said predetermined set temperature, the shut-off valve opens and the vacuum chamber is connected to said vacuum source and, at times of normal operation, when the said shut-off valve opens, the exhaust gas recirculation control valve opens in a predetermined exhaust gas supply region and closes in a predetermined exhaust gas supply stopping region.

26. An engine as set forth in claim 25, wherein said vacuum source is in an intake passage downstream of a throttle valve, a vacuum port is provided in said intake passage, said vacuum port opens inside the intake passage upstream of the throttle valve when the throttle valve is in an idling position and said vacuum port opens in the intake passage downstream of the throttle valve when the throttle valve is opened, and said vacuum port is connected to said vacuum chamber through said shut-off valve.

27. An engine as set forth in claim 25, further comprising a temperature sensor for detecting the engine temperature, wherein said shut-off valve is controlled based on the engine temperature detected by said temperature sensor.

28. An engine as set forth in claim 25, further comprising:
  counter means for changing a count, wherein said count corresponds to changes in the temperature in the exhaust gas recirculation passage; and
  malfunction diagnosis means which judges there is an abnormality in either of said exhaust gas recirculation control valve and said shut-off valve based on the temperature inside said exhaust gas recirculation passage and said count.

29. An engine as set forth in claim 28, wherein said count increases when the engine is in said predetermined exhaust gas supply region and said count decreases when the engine is in said predetermined exhaust gas supply stopping region.

30. An engine as set forth in claim 28, wherein said malfunction diagnosis means is provided with:
  a first discriminating means which discriminates if the temperature inside said exhaust gas recirculation passage when the engine temperature has reached substantially the predetermined set temperature is substantially higher than said predetermined set temperature;
  a second discriminating means which discriminates if the count is less than a first predetermined set count value when the temperature inside said exhaust gas recirculation passage is substantially higher than the predetermined set temperature; and
  judgement means which judges that there is an abnormality in said exhaust gas recirculation control valve when the count is smaller than said first predetermined set count value.

31. An engine as set forth in claim 30, wherein said malfunction diagnosis means is provided with:
  third discriminating means which discriminates if said count is less than a second predetermined set count value when said first discriminating means discriminates that the temperature inside said exhaust gas recirculation passage is substantially lower than said predetermined set temperature; and
  judgement means which judges that both said exhaust gas recirculation control valve and said shut-off valve are operating normally when said count is greater than said second predetermined set count value.

32. An engine as set forth in claim 30, wherein said malfunction diagnosis means is provided with:
  decision means for deciding that rediagnosis should be performed when said second discriminating means discriminates that said count is greater than said first predetermined set count value;
  third discriminating means which discriminates if said count is less than a second predetermined set count value when the engine temperature becomes substantially higher than said predetermined set temperature when said decision means decides that rediagnosis should be performed;
  fourth discriminating means which discriminates if the temperature inside said exhaust gas recirculation passage is lower than a reference temperature corresponding to said second predetermined set count value when said count is less than said second predetermined set count value; and
  judgement means which judges that there is an abnormality in said shut-off valve when the temperature inside said exhaust gas recirculation passage is less than said reference temperature and judges that there is an abnormality in said exhaust gas recirculation control valve when the temperature inside said exhaust gas recirculation passage is higher than said reference temperature.

33. An engine as set forth in claim 30, wherein said malfunction diagnosis means is provided with:
  decision means for deciding that rediagnosis should be performed when said second discriminating means discriminates that said count is greater than said first predetermined set count value;
  third discriminating means which discriminates if said count is less than a second predetermined set count value when said first discriminating means discriminates that the temperature inside the exhaust gas recirculation passage is substantially lower than said predetermined set temperature; and
  judgement means which judges that there is an abnormality in said shut-off valve when said count is less than said second predetermined set count value when said decision means decides that rediagnosis should be performed.

34. An engine as set forth in claim 1, wherein the engine temperature is an engine cooling water temperature.

* * * * *